(12) United States Patent
Miwa et al.

(10) Patent No.: US 7,352,388 B2
(45) Date of Patent: Apr. 1, 2008

(54) CAMERA CALIBRATING APPARATUS

(75) Inventors: Michio Miwa, Urayasu (JP); Ryuichi Mato, Sagamihara (JP); Masaki Sato, Yokohama (JP); Satoru Masuda, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 473 days.

(21) Appl. No.: 10/512,039

(22) PCT Filed: Apr. 21, 2003

(86) PCT No.: PCT/JP03/05033

§ 371 (c)(1),
(2), (4) Date: Oct. 20, 2004

(87) PCT Pub. No.: WO03/089874

PCT Pub. Date: Oct. 30, 2003

(65) Prior Publication Data

US 2005/0179801 A1    Aug. 18, 2005

(30) Foreign Application Priority Data

Apr. 22, 2002  (JP) .............................. 2002-119692
Apr. 16, 2003  (JP) .............................. 2003-111432

(51) Int. Cl.
*H04N 17/00*  (2006.01)
*H04N 17/02*  (2006.01)
*H04N 9/47*   (2006.01)

(52) U.S. Cl. ...................................... 348/187; 348/148

(58) Field of Classification Search ................ 348/148, 348/187

See application file for complete search history.

(56) References Cited

U.S. PATENT DOCUMENTS 6,201,882 B1 *  3/2001  Tanaka ........................ 382/106

FOREIGN PATENT DOCUMENTS

| JP | 11-239989 A | 9/1999 |
| JP | 2000-024973 | 1/2000 |
| JP | 2001-116515 A | 4/2001 |

* cited by examiner

*Primary Examiner*—Ngoo-Yen Vu
*Assistant Examiner*—James A Meyers
(74) *Attorney, Agent, or Firm*—Pearne & Gordon LLP

(57) ABSTRACT

Herein disclosed is a camera calibrating apparatus for calibrating an optical parameter of a camera mounted on an automotive vehicle, comprising: a first housing position information storing section (115) for storing first housing position information, a second housing position information storing section (116) for storing second housing position information, a first optical position information producing section (117) for producing first optical position information, a first optical position information storing section (118) for storing the first optical position information, a second optical position information producing section (120) for producing second optical position information, a second optical position information storing section (130) for storing the second optical position information, and a calibrating section (160) for calibrating the second optical position information stored in the second optical position information storing section (130) on the basis of image information obtained by a camera (110) in a second coordination system (102).

17 Claims, 41 Drawing Sheets

FIG.22
(a)
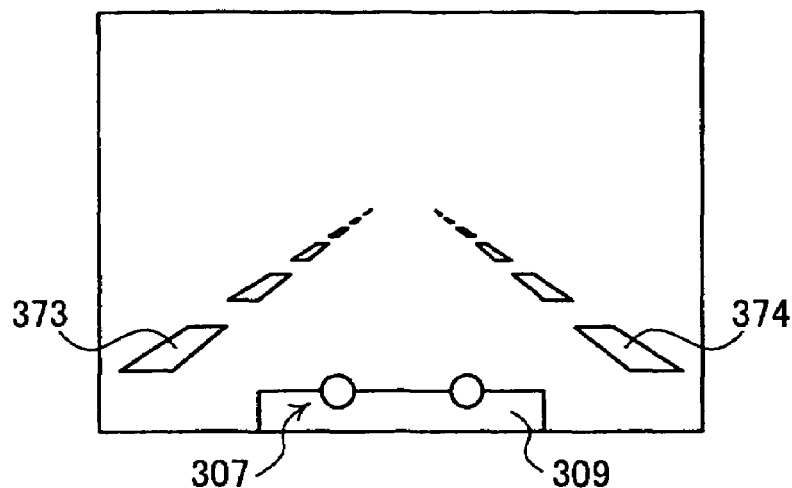
(b)
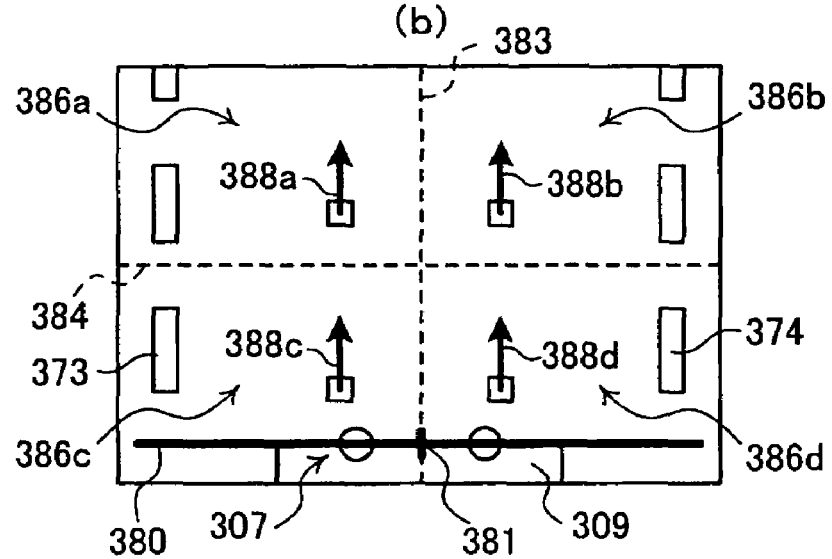
(c)
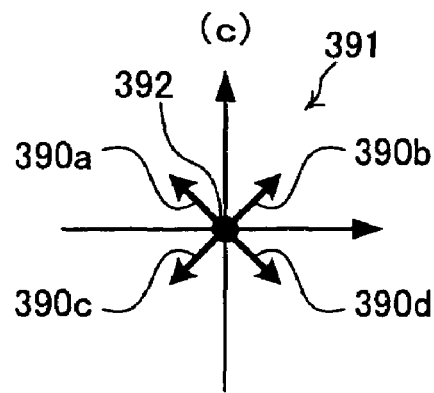

FIG.25
(a)
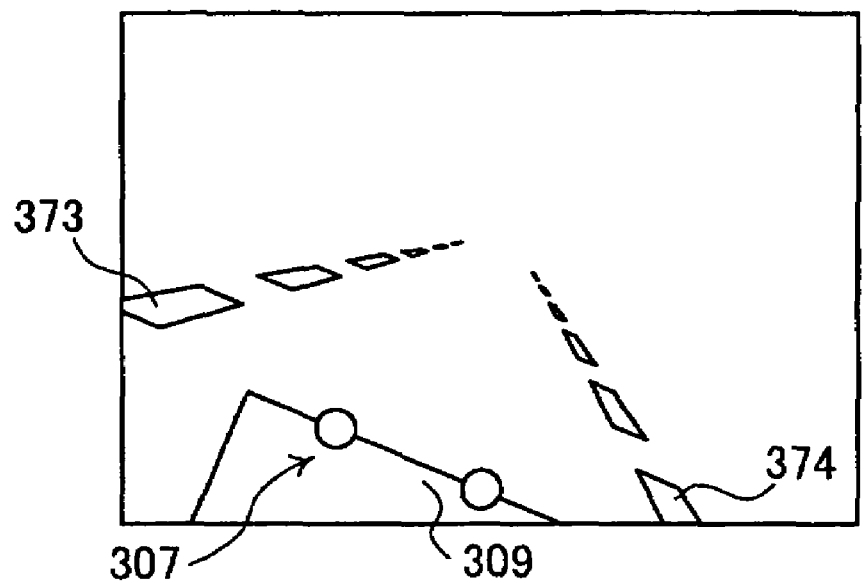
(b)
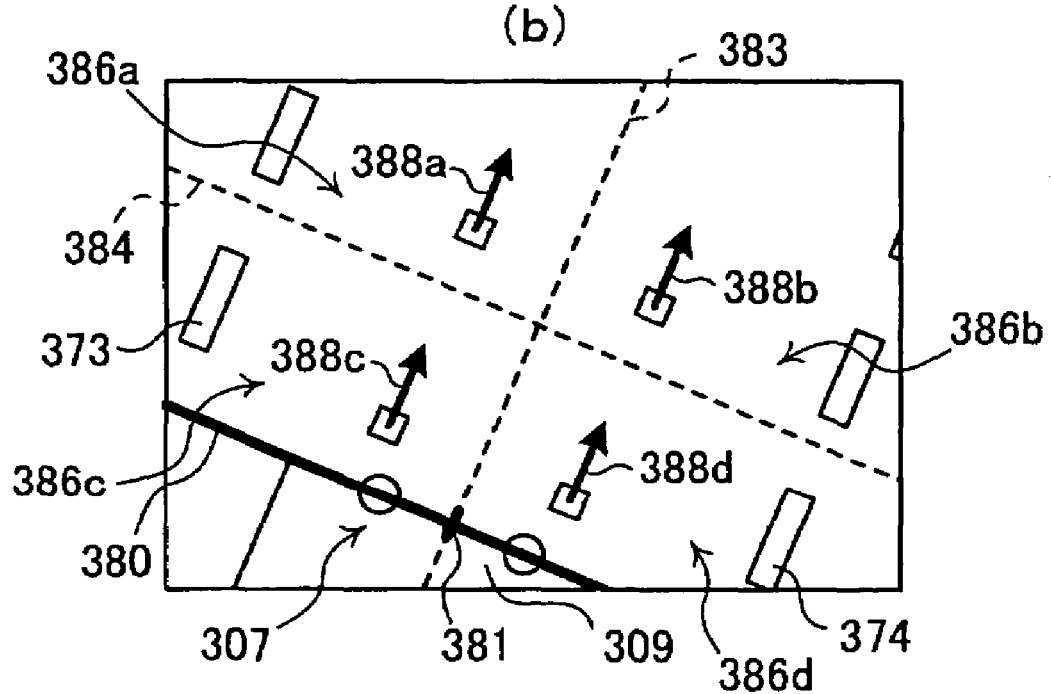

CAMERA CALIBRATING APPARATUS

TECHNICAL FIELD OF THE INVENTION

The present invention relates to a camera calibrating apparatus, and more particularly to a camera calibrating apparatus for calibrating a camera mounted on an automotive vehicle or the like.

DESCRIPTION OF THE RELATED ART

In recent years, there has been developed an imaging controlling apparatus, for example an electronic control unit (herein after simply referred to as "ECU"), which is used to be electrically connected to a camera mounted on an exterior surface of an automotive vehicle to detect the position occupied by an object located on a road, in particular, in the vicinity of the automotive vehicle on the basis of image information obtained by the camera. When, in general, the camera is mounted on the automotive vehicle in combination with the imaging controlling apparatus of this type, the calibration of the camera is performed by a camera calibrating apparatus in order to specify optical parameters of the camera.

Up until now, there have been proposed a wide variety of camera calibrating apparatuses of this type, all of which are classified into two different types including a first type to calibrate the camera before that camera is mounted on the automotive vehicle, and a second type to calibrate the camera after that camera is mounted on the automotive vehicle. For the purpose of facilitating an assembly work of the camera to the automotive vehicle, there is a growing demand for the camera calibrating apparatus for calibrating the camera mounted on the automotive vehicle in recent years.

As shown in FIGS. 39 to 41, the conventional camera calibrating apparatus 500 is electrically connected to the camera 510 as an imaging device. The camera 510 includes a housing unit 511 and an optical section 512 supported by the housing unit 511 to obtain image information through the optical section 512.

The conventional camera calibrating apparatus 500 comprises a first housing position information storing section 515 for storing first housing position information of the housing unit 551 obtained on the basis of the first coordinate system 501 defined in a camera producing plant, and a second housing position information storing section 516 for storing second housing position information of the housing unit 551 obtained on the basis of the second coordinate system 502 defined in an automotive vehicle producing plant.

The camera calibrating apparatus 500 is adapted to revise the camera 510 in the camera producing plant by using a revising marker 505 located in the first coordinate system 501. Here, the term "the calibration of the camera 510" is intended to indicate the calculation of the accurate position of the optical section 512 of the camera 510 mounted on the automotive vehicle 508.

The conventional camera calibrating apparatus 500 further comprises a first optical position information producing section 517 for producing first optical position information indicative of the position of the optical section 512 in the first coordinate system 501, and a first optical position information storing section 518 for storing the first optical position information produced by the first optical position information producing section 517. The first optical position information producing section 517 is adapted to produce optical position information indicative of the position of the optical section 512 in the first coordinate system 501 on the basis of the image information of the revising marker 505 obtained by the camera 510.

The conventional camera calibrating apparatus 500 further comprises a second optical position information producing section 520 for producing second optical information indicative of the position of the optical section 512 in the second coordinate system 502, and a second optical position information storing section 530 for storing the second optical position information produced by the second optical position information producing section 520.

The second optical position information producing section 520 is adapted to produce optical position information indicative of the position of the optical section 512 in the second coordinate system 502 from the second housing position information stored in the second housing position information storing section 516 on the basis of the first housing position information stored in the first housing position information storing section 515 and the first optical position information stored in the first optical position information storing section 518.

The conventional camera calibrating apparatus 500 thus constructed as previously mentioned is adapted to revise the camera in the camera producing plant by calculating the position of the optical section 512 in the second coordinate system 502, while the image controlling apparatus is adapted to detect the position occupied by an object located on the road through the image information obtained by the camera 510 mounted on the automotive vehicle 508.

The conventional camera calibrating apparatus as previously mentioned, however, encounters such a problem that the second optical position information stored in the second optical position information storing section is not calibrated. This leads to the fact that the position of the object located on the road cannot be accurately detected by the image controlling apparatus if the camera is mounted on an inaccurate position of the automotive vehicle.

It is, therefore, an object of the present invention to provide a camera calibrating apparatus which can calibrate optical parameters of the optical section of the camera mounted on the automotive vehicle or the like.

DISCLOSURE OF THE INVENTION

In accordance with the present invention, there is provided a camera calibrating apparatus to be operative in combination with an imaging device which includes a housing unit and an optical section supported by the housing unit to obtain image information thorough the optical section, and adapted to calibrate position information of the optical section, comprising: first housing position information storing means for storing first housing position information indicative of the position of the housing unit in the first coordinate system; second housing position information storing means for storing second housing position information indicative of the position of the housing unit in the second coordinate system; first optical position information producing means for producing first optical position information indicative of the position of the optical section in the first coordinate system on the basis of the image information obtained by the imaging device in the first coordinate system; first optical position information storing means for storing the first optical position information produced by the first optical position information producing means; second optical position information producing means for producing second optical position information indicative of the position of the optical section in the second coordinate system from the second housing position information stored by the second housing position information storing means on the basis of the first housing position information stored by the first housing position information storing means and the first optical position information stored by the first optical position information storing means; second optical position information storing means for storing the second optical position information produced by the second optical position information producing means; and calibrating means for calibrating the second optical position information stored by the second optical position information storing means on the basis of the image information obtained by the imaging device in the second coordinate system. The camera calibrating apparatus according to the present invention thus constructed as previously mentioned can calibrate parameters of the optical section mounted on an automotive vehicle or the like.

In accordance with the present invention, there is provided a camera calibrating apparatus to be operative in combination with an imaging device which includes a housing unit and an optical section supported by the housing unit to obtain image information thorough the optical section, and adapted to calibrate optical position information about the position of the optical section, comprising: optical position information storing means for storing optical position information indicative of the position of the optical section to a predetermined coordinate system; and calibrating means for calibrating the optical position information stored by the optical position information storing means on the basis of the image information obtained by the imaging device on the predetermined coordinate system. The camera calibrating apparatus according to the present invention thus constructed as previously mentioned can calibrate parameters of the optical section mounted on an automotive vehicle or the like.

In accordance with the present invention, there is provided a camera calibrating apparatus to be operative in combination with an imaging device which includes a housing unit and an optical section supported by the housing unit to obtain image information thorough the optical section, and adapted to calibrate optical position information about the position of the optical section, comprising: first housing position information storing means for storing first housing position information indicative of the position of the housing unit in the first coordinate system in which a revising marker is located; second housing position information storing means for storing second housing position information indicative of the position of the housing unit in the second coordinate system in which a calibrating marker is located; first optical position information producing means for producing first optical position information indicative of the position of the optical section in the first coordinate system on the basis of the image information of the revising marker obtained by the imaging device; first optical position information storing means for storing the first optical position information produced by the first optical position information producing means; second optical position information producing means for producing second optical position information indicative of the position of the optical section in the second coordinate system from the second housing position information stored by the second housing position information storing means on the basis of the first housing position information stored by the first housing position information storing means and the first optical position information stored by the first optical position information storing means; estimated location information producing means for producing estimated location information indicative of the position of the calibrating marker to an image coordinate system of the imaging device on the basis of the second optical position information produced by the second optical position information producing means; second optical position information storing means for storing the second optical position information produced by the second optical position information producing means; estimated location information storing means for storing the estimated location information produced by the estimated location information estimating means; and calibrating means for calibrating the second optical position information stored by the second optical position information storing means on the basis of the image information of the calibrating marker obtained by the imaging device and the estimated location information stored by the estimated location information storing means. The camera calibrating apparatus according to the present invention thus constructed as previously mentioned can calibrate the second optical position information by using a simple calibrating marker.

In the camera calibrating apparatus according to the present invention, the calibrating means includes: image location information extracting means for extracting an image location information indicative of an image location of the calibrating marker to the image coordinate system of the imaging device on the basis of the image information of the calibrating marker obtained by the imaging device; calibration value calculating means for calculating a calibration value of the second optical position information stored by the second optical position information storing means on the basis of the image location information extracted by the image location information extracting means and the estimated location information stored by the estimated location information storing means; and optical position information calibrating means for calibrating the second optical position information stored by the second optical position information storing means on the basis of the calibration value calculated by the calibration value calculating means. The camera calibrating apparatus according to the present invention thus constructed as previously mentioned can calculate calibration value of the second optical position information by using a simple calibrating marker.

In the camera calibrating apparatus according to the present invention, the calibrating means is adapted to calibrate a deviation of a rotational component of the second optical position information. The camera calibrating apparatus according to the present invention thus constructed as previously mentioned can calibrate the second optical position information by using a simple calibrating marker without taking into account parallel shift component of the second optical position information.

In the camera calibrating apparatus according to the present invention, the image location information extracting means includes: image displaying means for displaying an image of the calibrating marker obtained by the imaging device, and image location specifying means for specifying the image location of the calibrating marker on the image of the calibrating marker displayed by the image displaying means and to ensure that the image location information is extracted. The camera calibrating apparatus according to the present invention thus constructed as previously mentioned can specify the image location of the calibrating marker to ensure that the image location information of the calibrating marker is extracted.

In the camera calibrating apparatus according to the present invention, the image location information extracting means includes: estimated area information storing means for storing estimated area information indicative of the calibrating marker to the image coordinate system of the imaging device; and image location searching means for searching the image location of the calibrating marker from the image information of the calibrating marker obtained by the imaging device on the basis of the estimated area information stored by the estimated area information storing means and the estimated location information stored by the estimated location information storing means to ensure that the image location information is extracted. The camera calibrating apparatus according to the present invention thus constructed as previously mentioned can search the image location of the calibrating marker to ensure that the image location information of the calibrating marker is easily extracted.

In accordance with the present invention, there is provided a camera calibrating apparatus to be operative in combination with an imaging device which includes a housing unit and an optical section supported by the housing unit to obtain image information thorough the optical section, and adapted to calibrate optical position information about the position of the optical section, comprising: first housing position information storing means for storing first housing position information indicative of the position of the housing unit in the first coordinate system in which a revising marker is located; second housing position information storing means for storing second housing position information indicative of the position of the housing unit in the second coordinate system; first optical position information producing means for producing first optical position information indicative of the position of the optical section in the first coordinate system on the basis of the image information obtained by the imaging device and indicative of the revising marker; first optical position information storing means for storing the first optical position information produced by the first optical position information producing means; second optical position information producing means for producing second optical position information indicative of the position of the optical section in the second coordinate system from the second housing position information stored by the second housing position information storing means on the basis of the first housing position information stored by the first housing position information storing means and the first optical position information stored by the first optical position information storing means; second optical position information storing means for storing the second optical position information produced by the second optical position information producing means; and calibrating means for calibrating the second optical position information stored by the second optical position information storing means on the basis of a motion vector of the image information obtained by the imaging device in the second coordinate system. The camera calibrating apparatus according to the present invention thus constructed as previously mentioned can calibrate the second optical position information by using the motion vector.

In the camera calibrating apparatus according to the present invention, the calibrating means includes: plane-projected image producing means for producing a plane-projected image from the image information obtained by the imaging device in the second coordinate system; plane-projected image dividing means for dividing the plane-projected image produced by the plane-projected image producing means into a plurality of image segments; motion vector extracting means for extracting the motion vector from the image segments divided by the plane-projected image dividing means; calibration value calculating means for calculating a calibration value of the second optical position information stored by the second optical position information storing means on the basis of the motion vector extracted by the motion vector extracting means; and optical position information calibrating means for calibrating the second optical position information stored by the second optical position information storing means on the basis of the calibration value calculated by the calibration value calculating means. The camera calibrating apparatus according to the present invention thus constructed as previously mentioned can easily extract the motion vector from the image segments.

In the camera calibrating apparatus according to the present invention, a dividing marker located in the second coordinate system in a predetermined relationship with the position of the housing unit represented by the second position information stored by the second position information storing means. The plane-projected image dividing means is adapted to divide the plane-projected image produced by the plane-projected image producing means into a plurality of image segments on the basis of the image information of the dividing marker obtained by the imaging device. The camera calibrating apparatus according to the present invention thus constructed as previously mentioned can accurately divide the plane-projected image by using the dividing marker.

In accordance with the present invention, there is provided a camera calibrating apparatus to be operative in combination with an imaging device which includes a housing unit and an optical section supported by the housing unit to obtain image information thorough the optical section, and adapted to calibrate position information of the optical section, comprising: first housing position information storing means for storing first housing position information indicative of the position of the housing unit in the first coordinate system in which a revising marker is located; second housing position information storing means for storing second housing position information indicative of the position of the housing unit in the second coordinate system in which an automotive vehicle is located; first optical position information producing means for producing first optical position information indicative of the position of the optical section in the first coordinate system on the basis of the image information of the revising marker obtained by the imaging device; first optical position information storing means for storing the first optical position information produced by the first optical position information producing means; second optical position information producing means for producing second optical position information indicative of the position of the optical section in the second coordinate system from the second housing position information stored by the second housing position information storing means on the basis of the first housing position information stored by the first housing position information storing means and the first optical position information stored by the first optical position information storing means; estimated location information producing means for producing estimated location information indicative of the position of the automotive vehicle to an image coordinate system of the imaging device on the basis of the second optical position information produced by the second optical position information producing means; second optical position information storing means for storing the second optical position information produced by the second optical position information producing means; estimated location information storing means for storing the estimated location information produced by the estimated location information estimating means; and calibrating means for calibrating the second optical position information stored by the second optical position information storing means on the basis of the image information of the automotive vehicle obtained by the imaging device and the estimated location information stored by the estimated location information storing means. The camera calibrating apparatus according to the present invention thus constructed as previously mentioned can calibrate the second optical position information by using a portion of the automotive vehicle.

In the camera calibrating apparatus according to the present invention, the calibrating means includes: image location information extracting means for extracting an image location information indicative of an image location of the automotive vehicle in the image coordinate system of the imaging device on the basis of the image information of the automotive vehicle obtained by the imaging device; calibration value calculating means for calculating a calibration value of the second optical position information stored by the second optical position information storing means on the basis of the image location information extracted by the image location information extracting means and the estimated location information stored by the estimated location information storing means; and optical position information calibrating means for calibrating the second optical position information stored by the second optical position information storing means on the basis of the calibration value calculated by the calibration value calculating means. The camera calibrating apparatus according to the present invention thus constructed as previously mentioned can calculate the calibration value of the second optical position information by using a portion of the automotive vehicle.

In the camera calibrating apparatus according to the present invention, the calibration value calculating means includes: superimposing means for superimposing a profile line of the automotive vehicle represented by the image location information on a profile line of the automotive vehicle represented by the estimated location information; extracting means for extracting a plurality of points from the overlapped profile lines of the automotive vehicle superimposed by the superimposing means, and calculating means for calculating a calibration value of the second optical position information by comparing the points of the image location information with the points of the estimated location information. The camera calibrating apparatus according to the present invention thus constructed as previously mentioned can extract the points from the profile line of the automotive vehicle to ensure that the second optical position information is extracted.

In the camera calibrating apparatus according to the present invention, the imaging device is mounted on an automotive vehicle. The camera calibrating apparatus according to the present invention thus constructed as previously mentioned can calibrate parameters of the optical section to accurately detect the position of an object located on the road even if the housing unit is mounted on the inaccurate position of the automotive vehicle.

In accordance with the present invention, there is provided an imaging system comprises a camera calibrating apparatus. The imaging system according to the present invention thus constructed as previously mentioned can calibrate parameters of the optical section mounted on an automotive vehicle or the like.

In accordance with the present invention, there is provided an imaging control system comprises a camera calibrating apparatus. The imaging control system according to the present invention thus constructed as previously mentioned can calibrate parameters of the optical section mounted on an automotive vehicle or the like.

In accordance with the present invention, there is provided a camera calibrating method of calibrating the position of an optical section supported by a housing unit of a camera for obtaining image information through the optical section, comprising: a first housing position information storing step of storing first housing position information indicative of the position of the housing unit in the first coordinate system; a second housing position information storing step of storing second housing position information indicative of the position of the housing unit in the second coordinate system; a first optical position information producing step of producing first optical position information indicative of the position of the optical section in the first coordinate system on the basis of the image information obtained by the imaging device in the first coordinate system; a first optical position information storing step of storing the first optical position information produced in the first optical position information producing step; a second optical position information producing step of producing second optical position information indicative of the position of the optical section in the second coordinate system from the second housing position information stored in the second housing position information storing step on the basis of the first housing position information stored in the first housing position information storing step and the first optical position information stored in the first optical position information storing step; a second optical position information storing step of storing the second optical position information produced in the second optical position information producing step; and a calibrating step of calibrating the second optical position information stored in the second optical position information storing step on the basis of the image information obtained by the imaging device in the second coordinate system. The camera calibrating method according to the present invention thus constructed as previously mentioned can calibrate parameters of the optical section mounted on an automotive vehicle or the like to accurately detect the position of an object located on the road.

In accordance with the present invention, there is provided a camera calibrating method of calibrating the position of an optical section supported by a housing unit of a camera for obtaining image information through the optical section, comprising: an optical position information storing step of storing optical position information indicative of the position of the optical section to a predetermined coordinate system; and a calibrating step of calibrating the optical position information stored in the optical position information storing step on the basis of the image information obtained by the imaging device on the predetermined coordinate system. The camera calibrating method according to the present invention thus constructed as previously mentioned can calibrate parameters of the optical section mounted on an automotive vehicle or the like to accurately detect the position of an object located on the road.

In accordance with the present invention, there is provided a camera calibrating method of calibrating the position of an optical section supported by a housing unit of a camera for obtaining image information through the optical section, comprising: a first housing position information storing step of storing first housing position information indicative of the position of the housing unit in the first coordinate system in which a revising marker is located; a second housing position information storing step of storing second housing position information indicative of the position of the housing unit in the second coordinate system in which a calibrating marker is located; a first optical position information producing step of producing first optical position information indicative of the position of the optical section in the first coordinate system on the basis of the image information of the revising marker obtained by the imaging device; a first optical position information storing step of storing the first optical position information produced in the first optical position information producing step; a second optical position information producing step of producing second optical position information indicative of the position of the optical section in the second coordinate system from the second housing position information stored in the second housing position information storing step on the basis of the first housing position information stored in the first housing position information storing step and the first optical position information stored in the first optical position information storing step; an estimated location information producing step of producing estimated location information indicative of the position of the calibrating marker to an image coordinate system of the imaging device on the basis of the second optical position information produced in the second optical position information producing step; a second optical position information storing step of storing the second optical position information produced in the second optical position information producing step; an estimated location information storing step of storing the estimated location information produced in the estimated location information estimating step; and a calibrating step of calibrating the second optical position information stored in the second optical position information storing step on the basis of the image information of the calibrating marker obtained by the imaging device and the estimated location information stored in the estimated location information storing step. The camera calibrating method according to the present invention thus constructed as previously mentioned can calibrate the second optical position information by using the simple calibrating marker.

In accordance with the present invention, there is provided a camera calibrating method of calibrating the position of an optical section supported by a housing unit of a camera for obtaining image information through the optical section, comprising: a first housing position information storing step of storing first housing position information indicative of the position of the housing unit in the first coordinate system in which a revising marker is located; a second housing position information storing step of storing second housing position information indicative of the position of the housing unit in the second coordinate system; a first optical position information producing step of producing first optical position information indicative of the position of the optical section in the first coordinate system on the basis of the image information obtained by the imaging device and indicative of the revising marker; a first optical position information storing step of storing the first optical position information produced in the first optical position information producing step; a second optical position information producing step of producing second optical position information indicative of the position of the optical section in the second coordinate system from the second housing position information stored in the second housing position information storing step on the basis of the first housing position information stored in the first housing position information storing step and the first optical position information stored in the first optical position information storing step; a second optical position information storing step of storing the second optical position information produced in the second optical position information producing step; and a calibrating step of calibrating the second optical position information stored in the second optical position information storing step on the basis of a motion vector of the image information obtained by the imaging device in the second coordinate system. The camera calibrating method according to the present invention thus constructed as previously mentioned can calibrate the second optical position information by using the motion vector.

In accordance with the present invention, there is provided a camera calibrating method of calibrating the position of an optical section supported by a housing unit of a camera for obtaining image information through the optical section, comprising: a first housing position information storing step of storing first housing position information indicative of the position of the housing unit in the first coordinate system in which a revising marker is located; a second housing position information storing step of storing second housing position information indicative of the position of the housing unit in the second coordinate system in which an automotive vehicle is located; a first optical position information producing step of producing first optical position information indicative of the position of the optical section in the first coordinate system on the basis of the image information of the revising marker obtained by the imaging device; a first optical position information storing step of storing the first optical position information produced in the first optical position information producing step; a second optical position information producing step of producing second optical position information indicative of the position of the optical section in the second coordinate system from the second housing position information stored in the second housing position information storing step on the basis of the first housing position information stored in the first housing position information storing step and the first optical position information stored in the first optical position information storing step; an estimated location information producing step of producing estimated location information indicative of the position of the automotive vehicle to an image coordinate system of the imaging device on the basis of the second optical position information produced in the second optical position information producing step; a second optical position information storing step of storing the second optical position information produced in the second optical position information producing step; an estimated location information storing step of storing the estimated location information produced in the estimated location information estimating step; and a calibrating step of calibrating the second optical position information stored in the second optical position information storing step on the basis of the image information of the automotive vehicle obtained by the imaging device and the estimated location information stored in the estimated location information storing step. The camera calibrating method according to the present invention thus constructed as previously mentioned can calibrate the second optical position information by using a portion of the automotive vehicle.

In the camera calibrating apparatus according to the present invention, the imaging device is mounted on an automotive vehicle. The camera calibrating method according to the present invention thus constructed as previously mentioned can calibrate parameters of the optical section mounted on an automotive vehicle or the like to accurately detect the position of an object located on the road even if the housing unit is mounted on the inaccurate position of the automotive vehicle.

In accordance with the present invention, there is provided a camera calibrating program of calibrating the position of an optical section supported by a housing unit of a camera for obtaining image information through the optical section, and allowing a computer to execute: a first housing position information storing step of storing first housing position information indicative of the position of the housing unit in the first coordinate system; a second housing position information storing step of storing second housing position information indicative of the position of the housing unit in the second coordinate system; a first optical position information producing step of producing first optical position information indicative of the position of the optical section in the first coordinate system on the basis of the image information obtained by the imaging device in the first coordinate system; a first optical position information storing step of storing the first optical position information produced in the first optical position information producing step; a second optical position information producing step of producing second optical position information indicative of the position of the optical section in the second coordinate system from the second housing position information stored in the second housing position information storing step on the basis of the first housing position information stored in the first housing position information storing step and the first optical position information stored in the first optical position information storing step; a second optical position information storing step of storing the second optical position information produced in the second optical position information producing step; and a calibrating step of calibrating the second optical position information stored in the second optical position information storing step on the basis of the image information obtained by the imaging device in the second coordinate system. The camera calibrating program according to the present invention thus constructed as previously mentioned can calibrate parameters of the optical section mounted on an automotive vehicle or the like to accurately detect the position of an object located on the road.

In accordance with the present invention, there is provided a camera calibrating program of calibrating the position of an optical section supported by a housing unit of a camera for obtaining image information through the optical section, and allowing a computer to execute: an optical position information storing step of storing optical position information indicative of the position of the optical section to a predetermined coordinate system; and a calibrating step of calibrating the optical position information stored in the optical position information storing step on the basis of the image information obtained by the imaging device on the predetermined coordinate system. The camera calibrating program according to the present invention thus constructed as previously mentioned can calibrate parameters of the optical section mounted on an automotive vehicle or the like to accurately detect the position of an object located on the road.

In accordance with the present invention, there is provided a camera calibrating program of calibrating the position of an optical section supported by a housing unit of a camera for obtaining image information through the optical section, and allowing a computer to execute: a first housing position information storing step of storing first housing position information indicative of the position of the housing unit in the first coordinate system in which a revising marker is located; a second housing position information storing step of storing second housing position information indicative of the position of the housing unit in the second coordinate system in which a calibrating marker is located; a first optical position information producing step of producing first optical position information indicative of the position of the optical section in the first coordinate system on the basis of the image information of the revising marker obtained by the imaging device; a first optical position information storing step of storing the first optical position information produced in the first optical position information producing step; a second optical position information producing step of producing second optical position information indicative of the position of the optical section in the second coordinate system from the second housing position information stored in the second housing position information storing step on the basis of the first housing position information stored in the first housing position information storing step and the first optical position information stored in the first optical position information storing step; an estimated location information producing step of producing estimated location information indicative of the position of the calibrating marker to an image coordinate system of the imaging device on the basis of the second optical position information produced in the second optical position information producing step; a second optical position information storing step of storing the second optical position information produced in the second optical position information producing step; an estimated location information storing step of storing the estimated location information produced in the estimated location information estimating step; and a calibrating step of calibrating the second optical position information stored in the second optical position information storing step on the basis of the image information of the calibrating marker obtained by the imaging device and the estimated location information stored in the estimated location information storing step. The camera calibrating program according to the present invention thus constructed as previously mentioned can calibrate the second optical position information by using the simple calibrating marker.

In accordance with the present invention, there is provided a camera calibrating program of calibrating the position of an optical section supported by a housing unit of a camera for obtaining image information through the optical section, and allowing a computer to execute: a first housing position information storing step of storing first housing position information indicative of the position of the housing unit in the first coordinate system in which a revising marker is located; a second housing position information storing step of storing second housing position information indicative of the position of the housing unit in the second coordinate system; a first optical position information producing step of producing first optical position information indicative of the position of the optical section in the first coordinate system on the basis of the image information obtained by the imaging device and indicative of the revising marker; a first optical position information storing step of storing the first optical position information produced in the first optical position information producing step; a second optical position information producing step of producing second optical position information indicative of the position of the optical section in the second coordinate system from the second housing position information stored in the second housing position information storing step on the basis of the first housing position information stored in the first housing position information storing step and the first optical position information stored in the first optical position information storing step; a second optical position information storing step of storing the second optical position information produced in the second optical position information producing step; and a calibrating step of calibrating the second optical position information stored in the second optical position information storing step on the basis of a motion vector of the image information obtained by the imaging device in the second coordinate system. The camera calibrating program according to the present invention thus constructed as previously mentioned can calibrate the second optical position information by using the motion vector.

In accordance with the present invention, there is provided a camera calibrating program of calibrating the position of an optical section supported by a housing unit of a camera for obtaining image information through the optical section, and allowing a computer to execute: a first housing position information storing step of storing first housing position information indicative of the position of the housing unit in the first coordinate system in which a revising marker is located; a second housing position information storing step of storing second housing position information indicative of the position of the housing unit in the second coordinate system in which an automotive vehicle is located; a first optical position information producing step of producing first optical position information indicative of the position of the optical section in the first coordinate system on the basis of the image information of the revising marker obtained by the imaging device; a first optical position information storing step of storing the first optical position information produced in the first optical position information producing step; a second optical position information producing step of producing second optical position information indicative of the position of the optical section in the second coordinate system from the second housing position information stored in the second housing position information storing step on the basis of the first housing position information stored in the first housing position information storing step and the first optical position information stored in the first optical position information storing step; an estimated location information producing step of producing estimated location information indicative of the position of the automotive vehicle to an image coordinate system of the imaging device on the basis of the second optical position information produced in the second optical position information producing step; a second optical position information storing step of storing the second optical position information produced in the second optical position information producing step; an estimated location information storing step of storing the estimated location information produced in the estimated location information estimating step; and a calibrating step of calibrating the second optical position information stored in the second optical position information storing step on the optical section basis of the image information of the automotive vehicle obtained by the imaging device and the estimated location information stored in the estimated location information storing step. The camera calibrating program according to the present invention thus constructed as previously mentioned can calibrate the second optical position information by using a portion of the automotive vehicle.

BRIEF DESCRIPTION OF THE DRAWINGS

The features and advantages of a camera calibrating apparatus according to the present invention will be more clearly understood from the following description taken in conjunction with the accompanying drawings:

FIG. 22 is a schematic view showing an operation of the calibrating section of the camera calibrating apparatus shown in FIG. 17;

FIG. 25 is a schematic view showing an operation of the calibrating section of the camera calibrating apparatus shown in FIG. 17;

DESCRIPTION OF THE PREFERRED EMBODIMENTS

Figure 1:
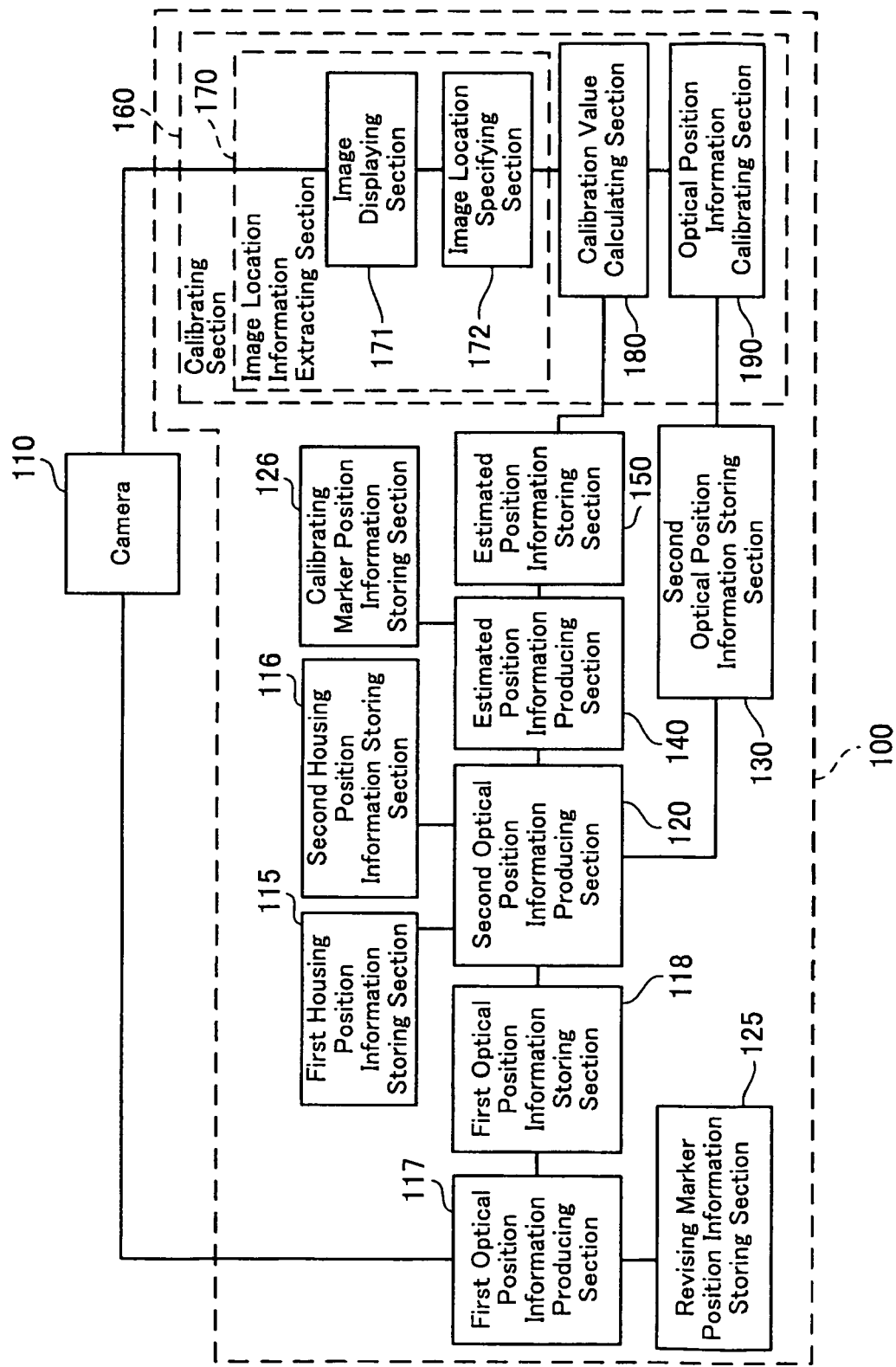
FIG. 1 is a block diagram showing a camera calibrating apparatus according to the first embodiment of the present invention and a camera exemplified as an imaging device.

The embodiments of the camera calibrating apparatus according to the present invention will now be described in detail in accordance with accompanying drawings.

First Embodiment

Referring now to the drawings, in particular to FIGS. 1 to 13, there is shown a first embodiment of a camera calibrating apparatus according to the present invention.

Figure 2:
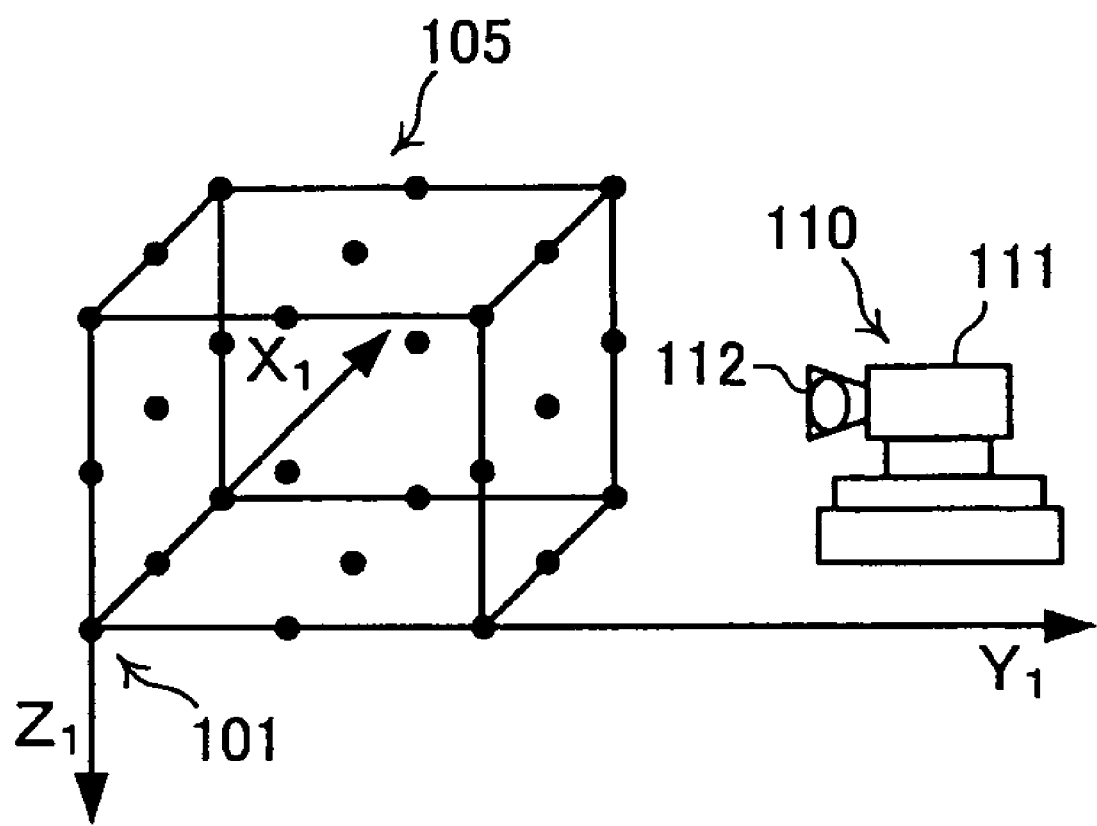
FIG. 2 is a perspective view showing the first coordinate system in which the camera shown in FIG. 1 is located.
Figure 3:
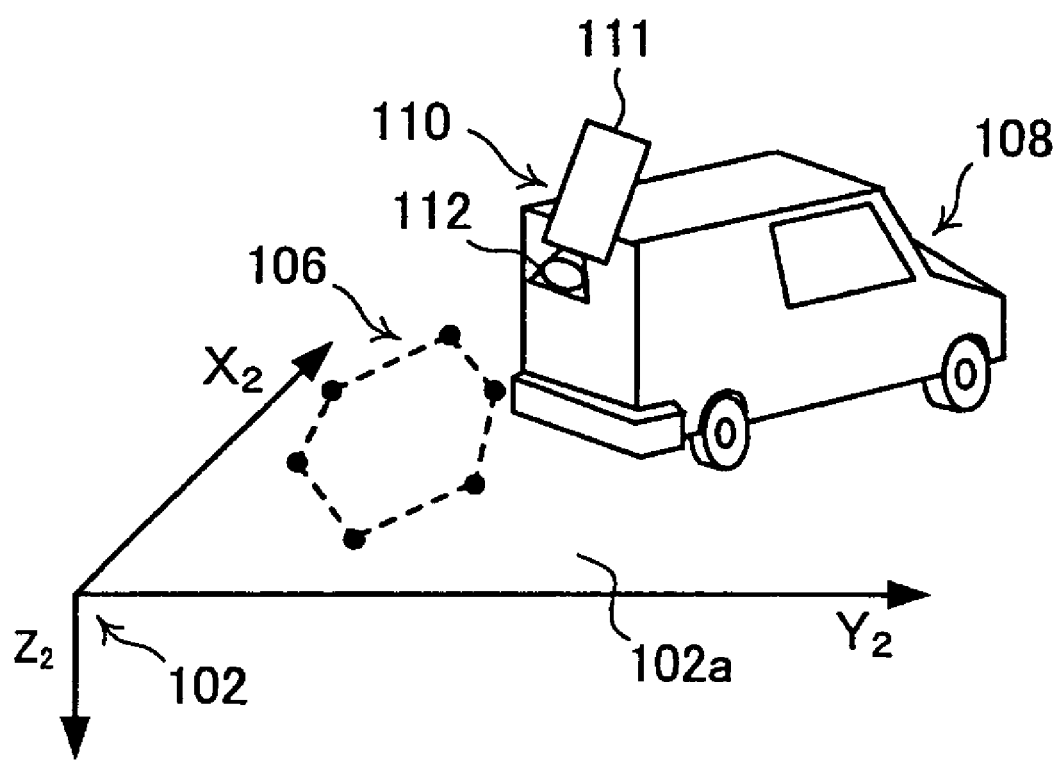
FIG. 3 is a perspective view showing the second coordinate system in which the camera shown in FIG. 1 is located.

The construction of the first embodiment of the camera calibrating apparatus according to the present invention will now be described hereinafter. As shown in FIGS. 1 to 3, the camera calibrating apparatus 100 is electrically connected to a camera 110 exemplified as an imaging device. The camera 110 includes a housing unit 111 and an optical section 112 supported by the housing unit 111 to obtain image information through the optical section 112.

The camera calibrating apparatus 100 comprises a first housing position information storing section 115 for storing first housing position information indicative of the position of the housing unit 111 in the first coordinate system 101, a second housing position information storing section 116 for storing second housing position information indicative of the position of the housing unit 111 in the second coordinate system 102, a revising marker position information storing section 125 for storing revising marker position information indicative of the position of a revising marker 105 in the first coordinate system 101, and a calibrating marker position information storing section 126 for storing calibrating marker position information indicative of the position of a calibrating marker 106 in the second coordinate system 102.

The first coordinate system 101 is defined in a first working space such as a camera production plant to have $X_1$-axis, $Y_1$-axis, and $Z_1$-axis, while the revising marker 105 laid out in the first working space causes the camera calibrating apparatus 100 to revise the camera 110 located in the first working space. The revising marker 105 is constituted by a plurality of marking objects which are respectively located in predetermined positions on the first coordinate system 101, and which are within a viewing field of the camera 110 located in the first working space.

The second coordinate system 102 is defined in a second working space such as an automotive vehicle production plant to have $X_2$-axis, $Y_2$-axis, and $Z_2$-axis, while $X_2$-axis and $Y_2$-axis collectively define $X_2$-$Y_2$ plane which is represented by a road surface 102a on which an automotive vehicle 108 is located. The calibrating marker 106 is constituted by two or more marking objects which are respectively located at predetermined positions of the road surface 102a in the second coordinate system 102.

The camera calibrating apparatus 100 is adapted to revise the camera 110 in the first working space. The camera 110 is located at a predetermined position on the first coordinate system 101, while the first housing position information storing section 115 is adapted to store first housing position information indicative of the position of the housing unit 111. Here, the term "the calibration of the camera 110" is intended to indicate the calculation of the accurate position of the optical section 112 of the camera 110 mounted on the automotive vehicle 108.

The camera 110 revised by the camera calibrating apparatus 100 is mounted on the automotive vehicle 108 to be located at a predetermined position on the second coordinate system 102 in the second working space, while the second housing position information storing section 116 is adapted to store second housing position information indicative of the position of the housing unit 111. Here, the second housing position information indicates an accurate position in which the housing unit 111 of the camera 110 is located when the camera 110 is mounted on the automotive vehicle 108.

The camera calibrating apparatus 100 further comprises a first optical position information producing section 117 for producing first optical position information indicative of the position of the optical section 112 in the first coordinate system 101, and a first optical position information storing section 118 for storing the first optical position information produced by the first optical position information producing section 117.

The first optical position information producing section 117 is adapted to calculate the position of the optical section 112 in the first coordinate system 101 from the calibrating marker position information stored in the calibrating marker position information storing section 125 on the basis of the image information of the calibrating marker 105 obtained by the camera 110. Here, the term "the position of the optical section 112" is intended to indicate an optical center of the optical section 112 and the position of an optical axis, and other optical coordinate parameters. The calculation of the position of the optical section 112 in the first coordinate system 101 is performed on the basis of a method disclosed in the document 1 (R. Tsai, A versatile camera calibration technique for high-accuracy 3D machine vision metrology using off-the-shelf TV cameras and lenses, IEEE Journal of Robotics and Automation, RA-3 (4): 323-344, 1987).

The camera calibrating apparatus 100 further comprises a second optical position information producing section 120 for producing second optical information indicative of the position of the optical section 112 in the second coordinate system 102, and a second optical position information storing section 130 for storing the second optical position information produced by the second optical position information producing section 120.

The second optical position information producing section 120 is adapted to produce second optical position information indicative of the position of the optical section 112 in the second coordinate system 102 from the second housing position information stored in the second housing position information storing section 116 on the basis of the first housing position information stored by the first housing position information storing section 115 and the first optical position information stored in the first optical position information storing section 118.

The second optical position information producing section 120 is adapted to calculate the position of the optical section 112 in the second coordinate system 102 on the basis of a following method.

The method is of comparing the position of the housing unit 111 to the first coordinate system 101 with the position of the optical section 112 in the first coordination system 101 to obtain positional information between the housing unit 111 and the optical section 112, and to calculate information indicative of the position of the optical section 112 in the second coordinate system 102 from the position of the housing unit 111 in the second coordinate system 102 on the basis of the positional information between the housing unit 111 and the optical section 112. Consequently, the second optical position information indicates the position of the optical section 112 under the condition that the housing unit 111 is located at an accurate position of the automotive vehicle 108.

Figure 4:
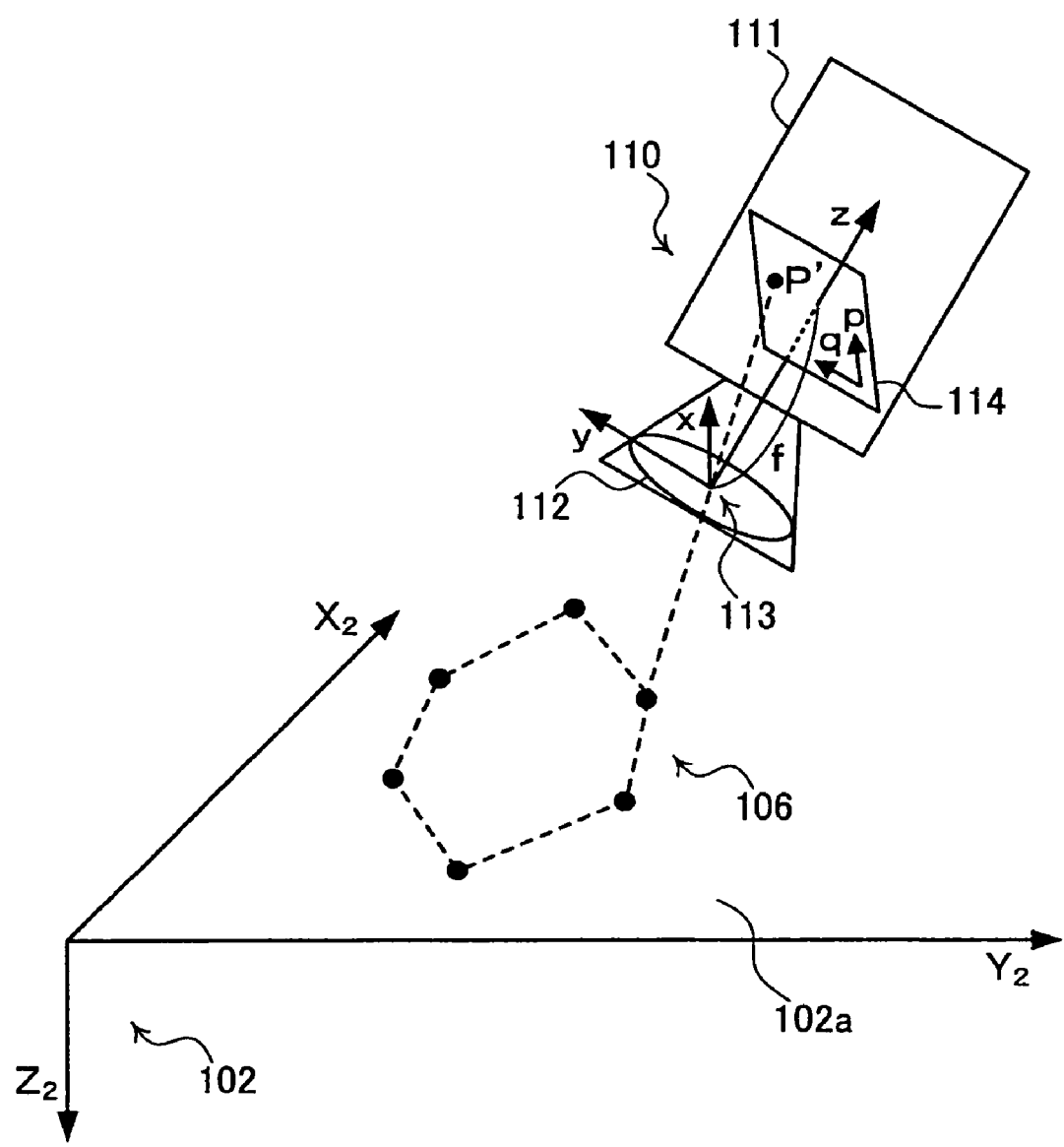
FIG. 4 is a perspective view showing a coordinate system of the camera shown in FIG. 1.

As shown in FIG. 4, the camera 110 mounted on the automotive vehicle 108 in the second working space defines a camera coordinate system 113 having x-axis, y-axis, and z-axis on the basis of the second optical position information. The origin point of the camera coordinate system 113 is in register with the optical center of the optical section 112. The x-axis of the camera coordinate system 113 extends in a horizontal direction of the camera 110. The y-axis of the camera coordinate system 113 extends in a vertical direction of the camera 110. The z-axis of the camera coordinate system 113 is in axial alignment with the optical axis of the optical section 112.

The image coordinate system 114 is defined on a plane spaced apart from the origin point of the camera coordinate system 113 with a focal length "f" in the direction of the z-axis of the camera coordinate system 113. The image coordination system 114 has p-axis and q-axis. The camera 110 is adapted to obtain, as image information, an optical image focused on the image coordinate system 114 through the optical section 112.

The camera calibrating apparatus 100 further comprises an estimated position information producing section 140 for producing estimated position information of the calibrating marker 106 to the image coordinate system 114 of the camera 110, and an estimated position information storing section 150 for storing the estimated position information produced by the estimated position information producing section 140.

The estimated position information producing section 140 is adapted to produce estimated position information of the calibrating marker 106 to the image coordinate system 114 of the camera 110 from the position information of the calibrating marker 106 stored in the calibrating marker position information storing section 126 on the basis of the second optical position information produced by the second optical position information producing section 120. The calculation of the estimated location of the calibrating marker 106 to the image coordinate system 114 of the camera 110 is performed on the basis of the above mentioned document 1.

Figure 5:
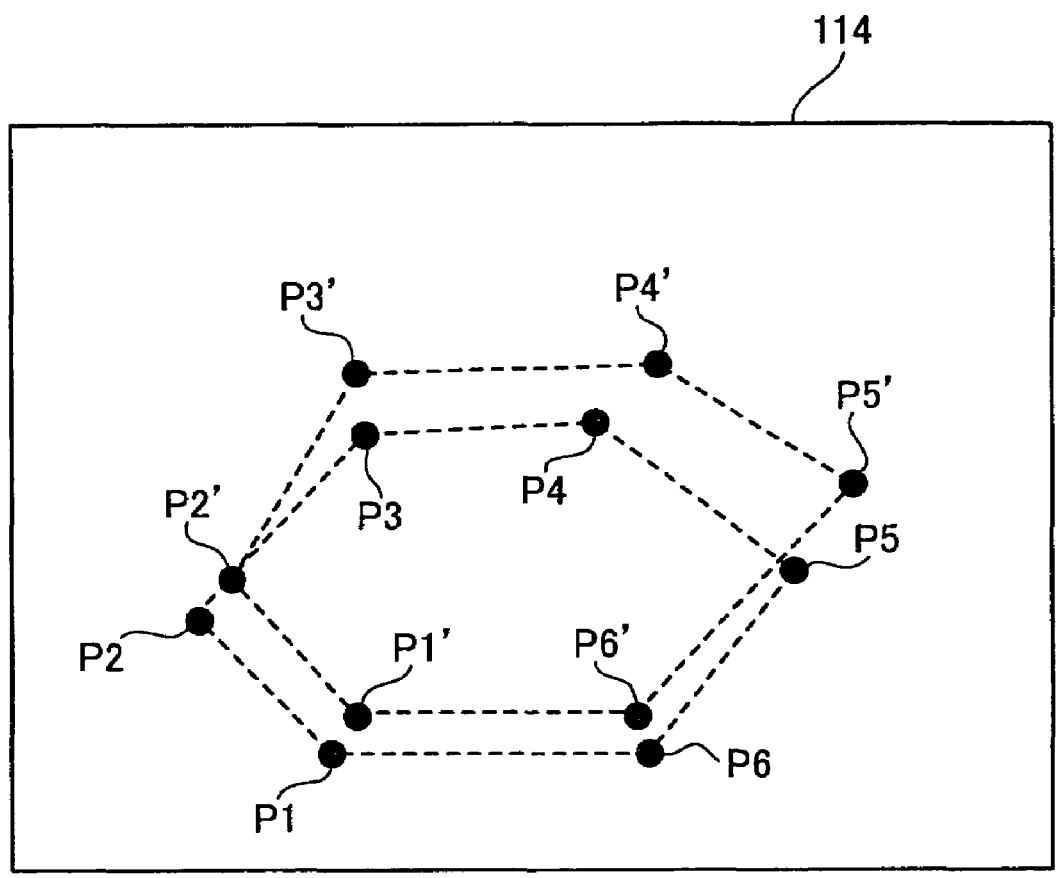
FIG. 5 is a plan view showing an image coordinate system of the camera shown in FIG. 1.
Figure 6:
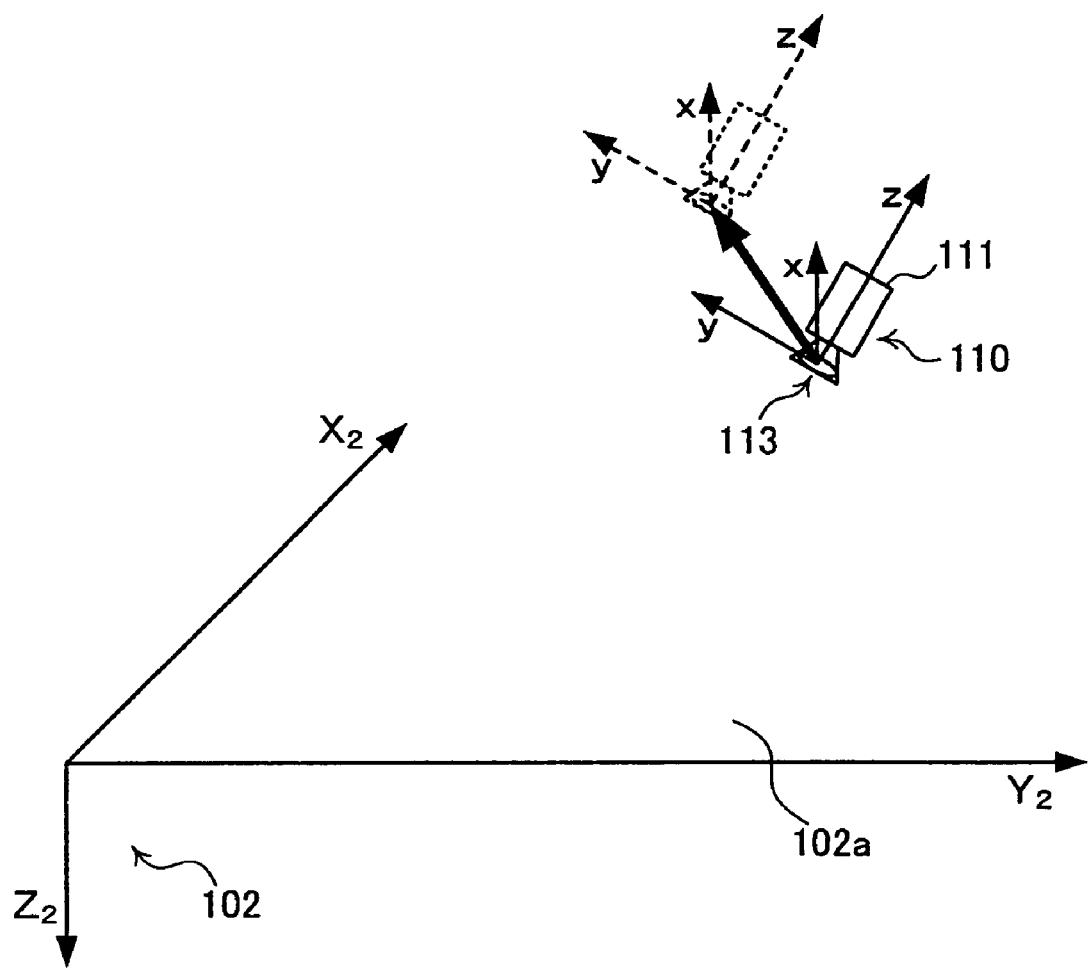
FIG. 6 is a perspective view showing a parallel translation of the camera shown in FIG. 1.
Figure 7:
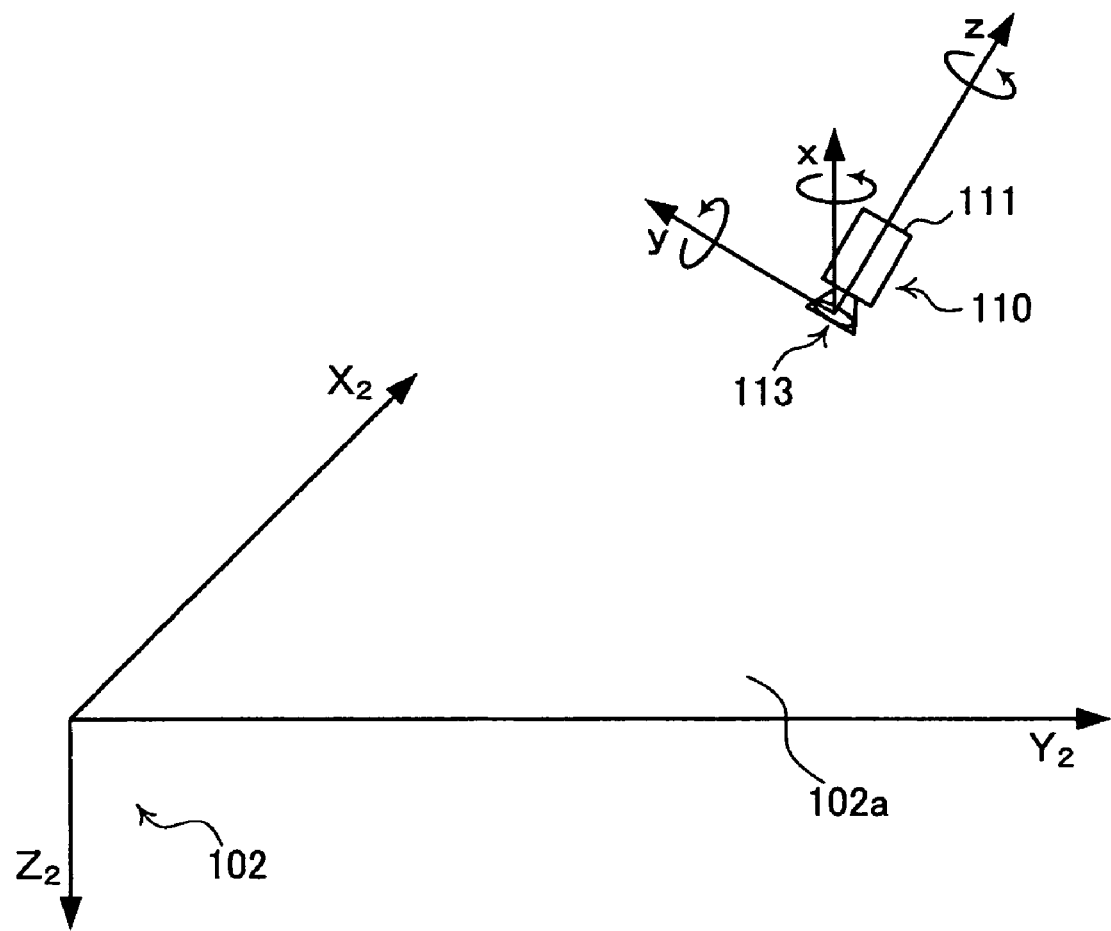
FIG. 7 is a perspective view showing a rotational motion of the camera shown in FIG. 1.

As shown in FIG. 5, the calibrating marker 106 located in the second coordinate system 102 is focused on the image location Pn' (n=1, 2, 3, 4, 5, 6) of the image coordinate system 114 through the optical section 112. Here, the image location Pn' is in register with the estimated image location Pn (n=1, 2, 3, 4, 5, 6) calculated by the estimated image location calculating section 140 under the condition that the housing unit 111 is located at an accurate position of the automotive vehicle 108, more specifically, the housing unit 111 is located at the position represented by the second housing position information with no deviation to the accurate position. However, the housing unit 111, in general, is located at an inaccurate position with deviation to the accurate position. This leads to the fact that the second optical position information is produced with deviation to the accurate position. As a result, the estimated location Pn is spaced apart from the image location Pn' of the image coordinate system 114.

The second optical position information includes six parameters indicative of a parallel displacement and a rotational motion of the camera coordinate system 113 to the second coordinate system 102. The six parameters are constituted by the parallel displacement components of the $X_2$-axis, the $Y_2$-axis, and the $Z_2$-axis shown in FIG. 6 and the rotational motion of the x-axis, the y-axis, and the z-axis shown in FIG. 7. The deviation of the second optical position information includes components of the parallel displacement and rotational motion. The housing unit 111 is, in general, located on the automotive vehicle with the parallel displacement which is within the range of a few centimeters, and the rotational motion which is within the range of a few degrees.

The following description will be directed to the case that the image information of the road surface 102a obtained by the camera 110 is displayed in conjunction with an additional line when the automotive vehicle 108 is operated by an operator. Here, the housing unit 111 is located at the position of the automotive vehicle 108 which is spaced apart from the road surface 302a, while the additional line is located at the position spaced apart from a rear portion of the automotive vehicle 108. The height of the housing unit 111 to the road surface 302a is equal to 1,000 millimeters, while the distance of the additional line to the rear portion is equal to 3000 millimeters.

Figure 8:
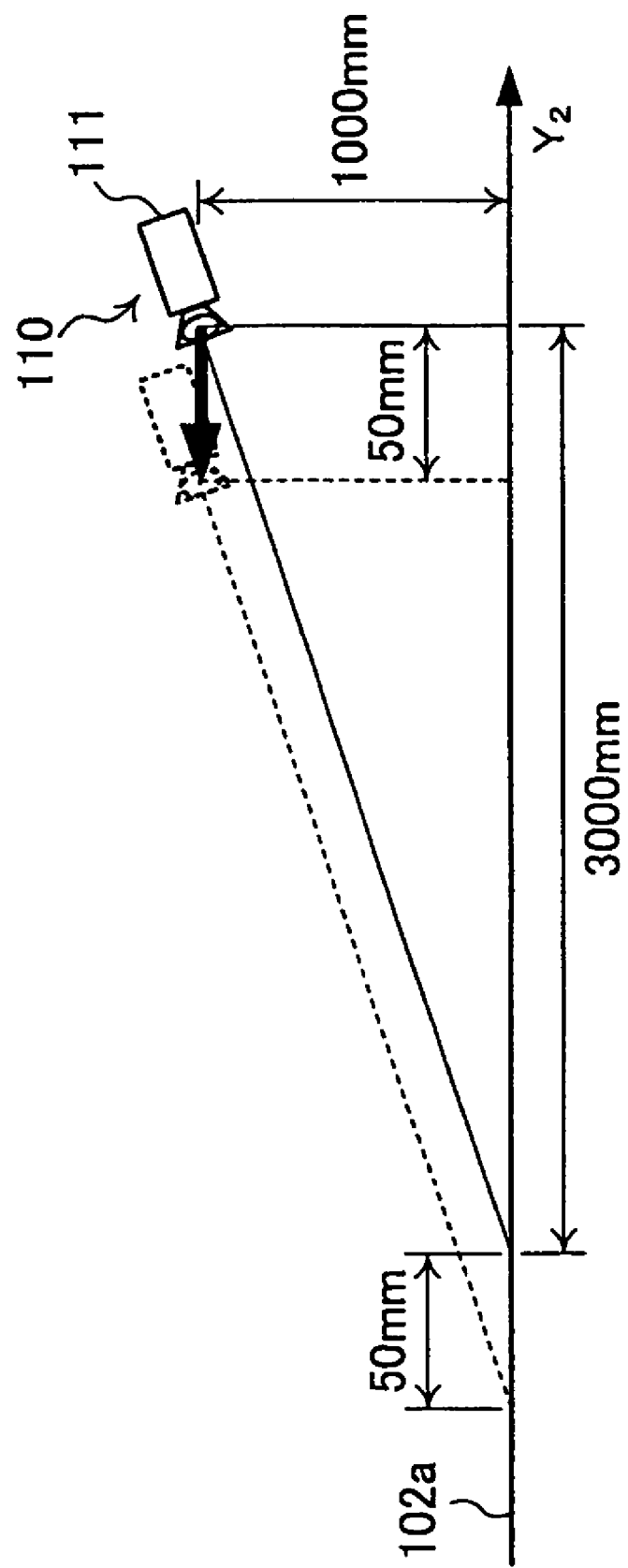
FIG. 8 is a side view showing a parallel translation of the camera shown in FIG. 1.

When the housing unit 111 is located at the position spaced apart from a design position of the automotive vehicle 108 in the Y-axis direction, more specifically, the parallel shift displacement of the housing unit 111 to the design position is equal to 50 millimeters as shown in FIG. 8, the displacement of the additional line is equal to 50 millimeters in $Y_2$-axis direction. In this case, the elongation value of the image location Pn' to the estimated location Pn on the image coordinate system 114 shown in FIG. 5 can be negligible.

Figure 9:
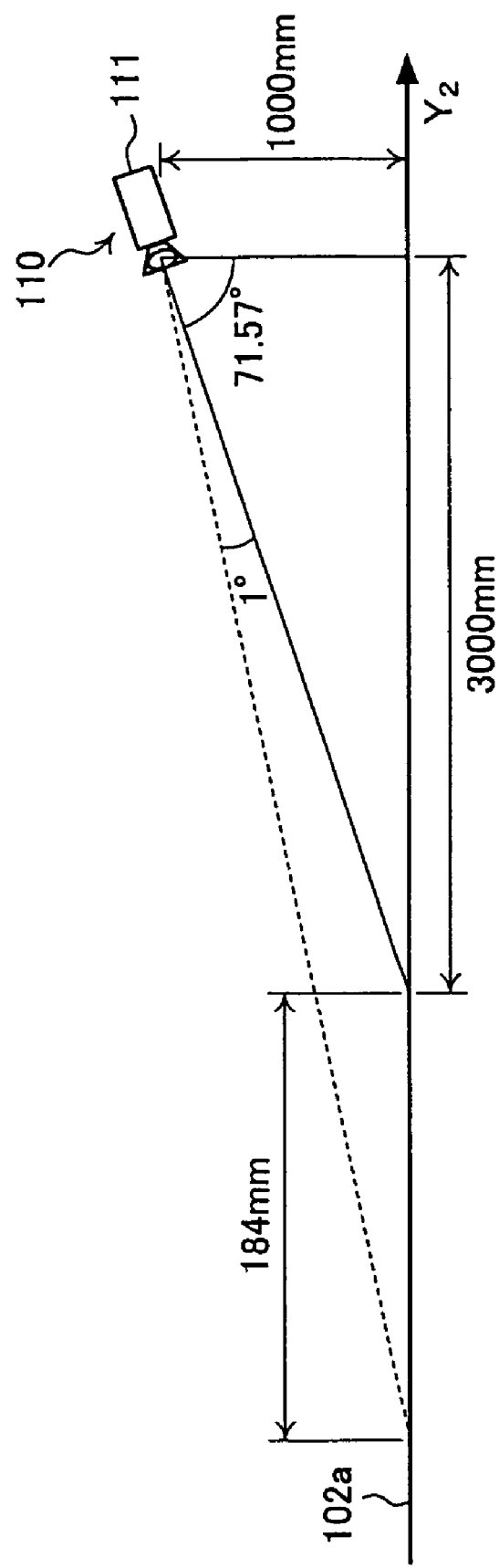
FIG. 9 is a side view showing a rotational motion of the camera shown in FIG. 1.

When, on the other hand, the housing unit 111 is mounted on the automotive vehicle 108 with a rotational displacement of the housing unit 111 to the $X_2$-axis direction, more specifically, the rotational displacement of the housing unit 111 to the $X_2$-axis direction is equal to one degree as shown in FIG. 9, the additional line is located with a displacement of 184 millimeters in the $Y_2$-axis direction. In this case, the elongation value of the image location Pn' to the estimated location Pn on the image coordinate system 114 shown in FIG. 5 cannot be negligible.

As will be seen from the above description, the second optical position information may be calibrated in consideration with only the rotational displacement of the optical section 112.

The camera calibrating apparatus 100 further comprises a calibrating section 160 for calibrating the second optical position information stored in the second optical position information storing section 130 to order to calibrate the above mentioned deviation of the second optical position information.

The calibrating section 160 is adapted to calibrate the second optical position information stored in the second optical position information storing section 130 on the basis of the image information of the calibrating marker 106 obtained by the camera 110 and the estimated position information stored in the estimated position information storing section 150.

The calibrating section 160 includes an image location information extracting section 170 for extracting image location information indicative of an image location of the calibrating marker 106 to the image coordinate system 114 of the camera 110 on the basis of the image information of the calibrating marker 106 obtained by the camera 110, a calibration value calculating section 180 for calculating a calibration value of the second optical position information stored in the second optical position information storing section 130 on the basis of the image location information extracted by the image location information extracting section 170 and the estimated position information stored in the estimated position information storing section 150, and an optical position information calibrating section 190 for calibrating the second optical position information stored in the second optical position information storing section 130 on the basis of the calibration value calculated by the calibration value calculating section 180.

The image location information extracting section 170 includes an image displaying section 171 for displaying an image of the calibrating marker 106 obtained by the camera 110, and an image location specifying section 172 for specifying the image location Pn' of the calibrating marker 106 in the image of the calibrating marker 106 displayed by the image displaying means 171 in order to extract the image location information from the image information.

Figure 10:
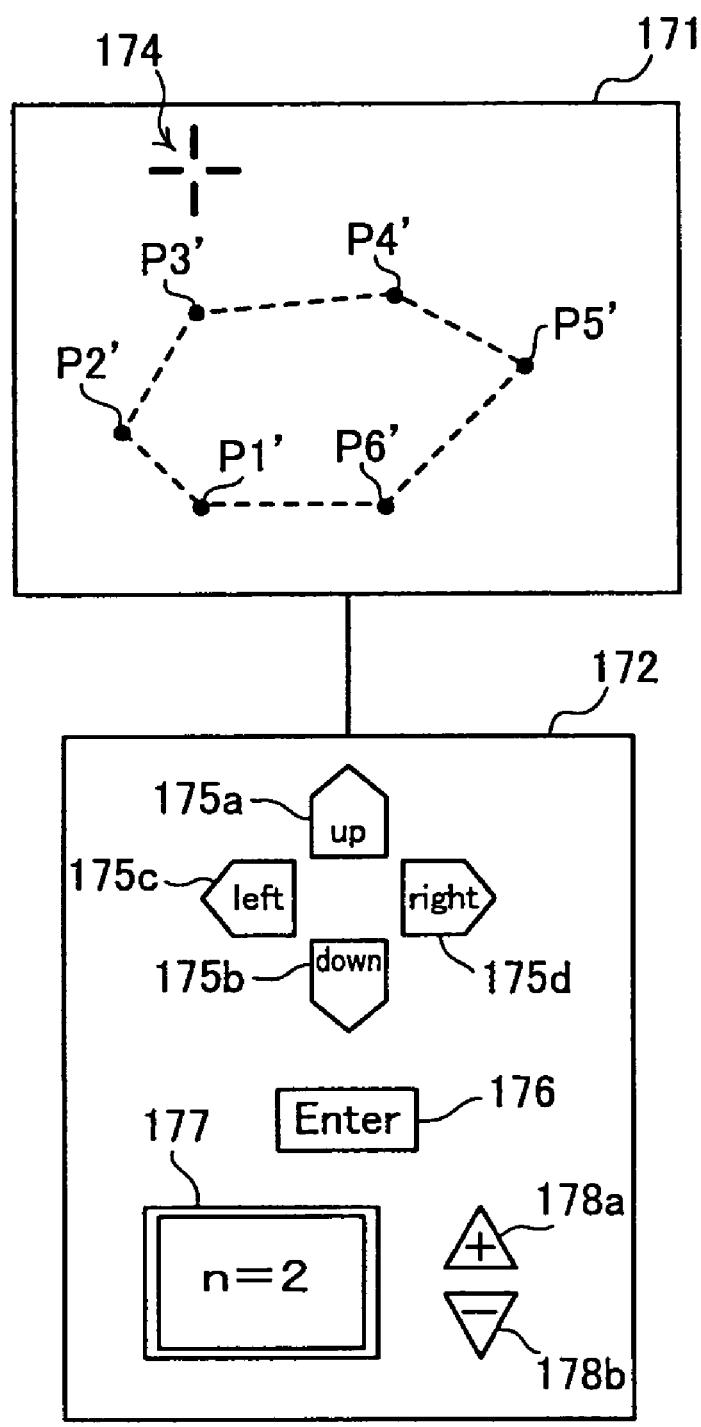
FIG. 10 is a block diagram showing an image location information extracting section of the camera calibrating apparatus shown in FIG. 1.

As shown in FIG. 10, the image displaying section 171 is adapted to display both the image of the calibrating marker 106 obtained by the camera 110 and a cursor 174 for specifying the image location Pn' of the calibrating marker 106.

The image location specifying section 172 includes an up-arrow key 175*a*, a down-arrow key 175*b*, a left-arrow key 175*c*, and a right-arrow key 175*d*, all of which are capable of allowing the cursor 174 displayed on the image information displaying section 171 to be moved in the respective directions, an enter key 176 for deciding the position of the cursor 174 as the image location Pn' of the calibrating marker 106, and a number displaying section 177 for displaying number "n" of the marking object of the calibrating marker 106, and an increment key 178*a* and a decrement key 178*b* each for changing the number "n" displayed on the number displaying section 177.

The calibration value calculating section 180 is adapted to calculate the calibration value of the second optical position information on the basis of the following method.

The following direction will be directed to the case that the deviation of the rotational component of the second optical position information is considered as an overall deviation of the second optical position information.

$$J = \sum_{n=1}^{N} \left[ \begin{array}{l} (p'_n(R_{13}p_n + R_{23}q_n + R_{33}f) - f(R_{11}p + R_{21}q + R_{31}f))^2 + \\ (q'_n(R_{13}p + R_{23}q_n + R_{33}f) - f(R_{12}p + R_{22}q + R_{32}f))^2 \end{array} \right] \quad (1)$$

$(p_n', q_n')$ and $(p_n, q_n)$ are linked by the following formula (2) on the basis of the formula (1).

$$p' = f \frac{R_{11}p + R_{21}q + R_{31}f}{R_{13}p + R_{23}q + R_{33}f} \quad (2)$$

$$q' = f \frac{R_{12}p + R_{22}q + R_{32}f}{R_{13}p + R_{23}q + R_{33}f}$$

$R_{11}$ to $R_{33}$ and $\theta$, $\Phi$, $\phi$ are linked by the following formulas (3), (4), and (5).

$$Rx = \begin{bmatrix} 1 & 0 & 0 \\ 0 & \cos\theta & \sin\theta \\ 0 & -\sin\theta & \cos\theta \end{bmatrix} \quad (3)$$

$$Ry = \begin{bmatrix} \cos\phi & 0 & -\sin\phi \\ 0 & 1 & 0 \\ \sin\phi & 0 & \cos\phi \end{bmatrix}$$

$$Rz = \begin{bmatrix} \cos\varphi & \sin\varphi & 0 \\ -\sin\varphi & \cos\varphi & 0 \\ 0 & 0 & 1 \end{bmatrix}$$

$$R = Rx \times Ry \times Rz \quad (4)$$

$$R = \begin{bmatrix} R_{11} & R_{12} & R_{13} \\ R_{21} & R_{22} & R_{23} \\ R_{31} & R_{32} & R_{33} \end{bmatrix} \quad (5)$$

In this embodiment, the calibrating marker 106 is constituted by six marking objects, however, the calibrating marker 106 may be constituted by two or more marking objects. On the other hand, the calibration value calculating section 180 can calculate $\theta$, $\Phi$, and $\phi$ if the calibrating marker 106 is constituted by two marking objects. Additionally, the calibration value calculating section 180 can calculate $\theta$, $\Phi$, and $\phi$ at a relatively high accuracy if the calibrating marker 106 is constituted by three or more marking objects.

Figure 11:
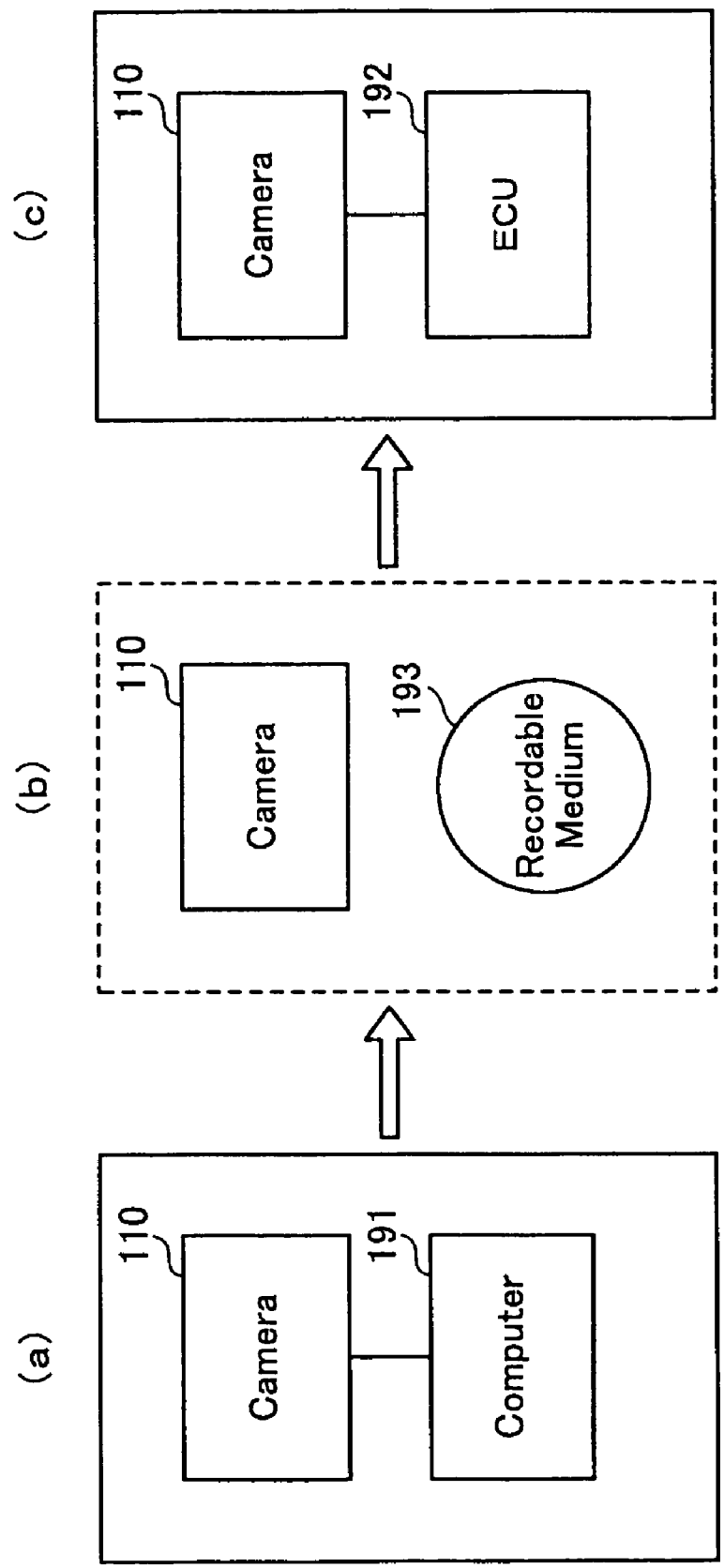
FIG. 11 is a block diagram showing a computer and ECU to ensure the camera calibrating apparatus shown in FIG. 1.

As shown in FIG. 11, the camera calibrating apparatus 100 thus constructed as previously mentioned can be realized by comprising the computer 191 for calibrating the camera 110, and an electronic control unit (hereinafter simply referred to as "ECU") 192 constituted as an image controlling apparatus for controlling the camera 110.

The computer 191 is shown in FIG. 11(*a*) as including a central processing unit (hereinafter simply referred to as "CPU"), a random access memory (hereinafter simply referred to as "RAM"), a read only memory (hereinafter simply referred to as "ROM"), an input/output interface, and other elements. The computer 191 is electrically connected to the camera 110 at the first working space. In this embodiment, the computer 191 constitutes each of the first housing position information storing section 115, the second housing position information storing section 116, the first optical position information producing section 117, the first optical position information storing section 118, the second optical position information producing section 120, the calibrating marker position information storing section 125, the calibrating marker position information storing section 126, the second optical position storing section 130, the estimated position information producing section 140, and the estimated position information storing section 150.

The ECU 192 is shown in FIG. 11(c) as including CPU, RAM, ROM, an input/output interface, and other elements. The ECU192 is mounted on the automotive vehicle 108 to be electrically connected to the camera 110 in the second working space. In this embodiment, the ECU 192 constitutes each of the second optical position information storing section 130, the estimated position information storing section 150, and the calibrating section 160.

As will be seen from FIG. 11(b), the camera 110 is transferred to the second working space from the first working space with a recordable medium 193 such as for example compact disk read only memory (hereinafter simply referred to as "CD-ROM" and a magnetic disk. The recordable medium 193 has stored therein each of the second optical position information and the estimated position information to ensure that the each of the second optical position information and the estimated position information is effectively transferred to the ECU 192 from the computer 191.

Figure 12:
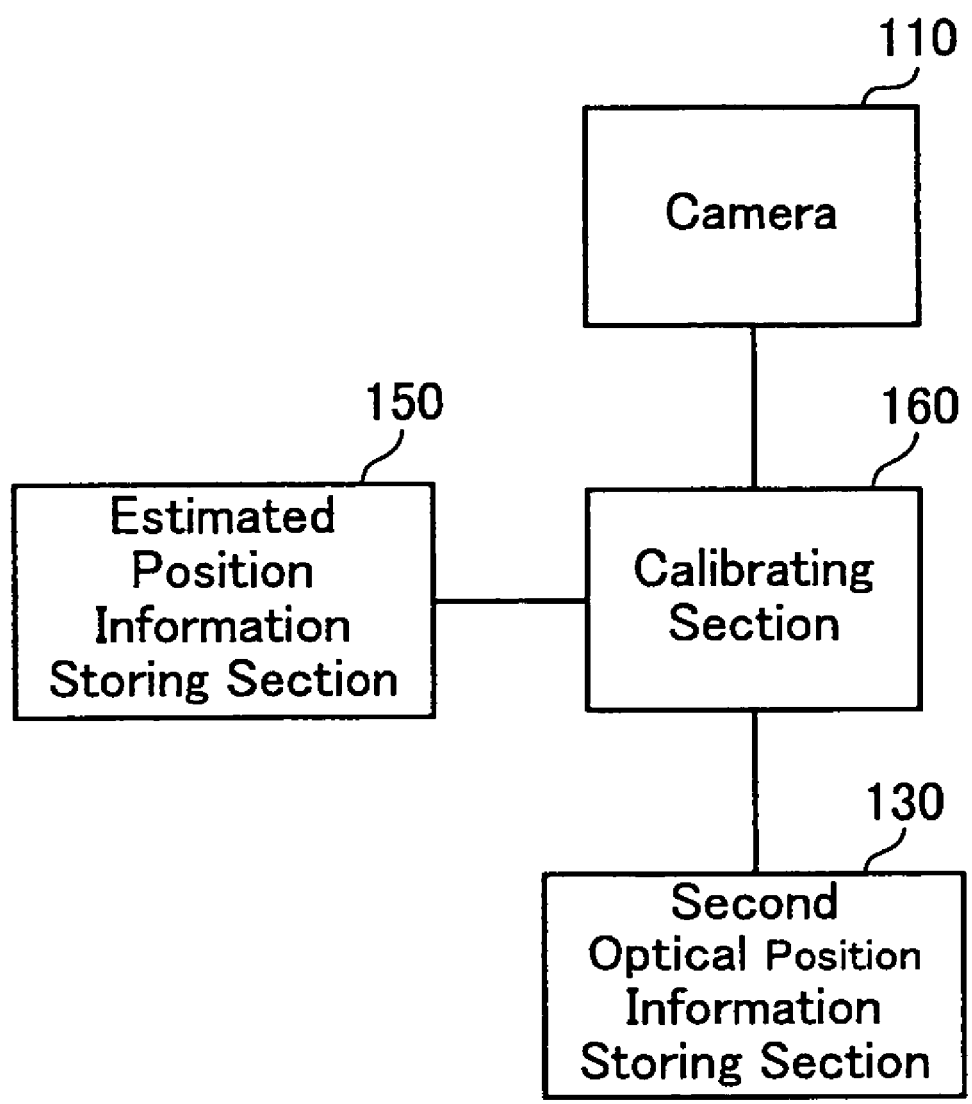
FIG. 12 is a block diagram showing a camera unit of the camera calibrating apparatus shown in FIG. 1.
Figure 13:
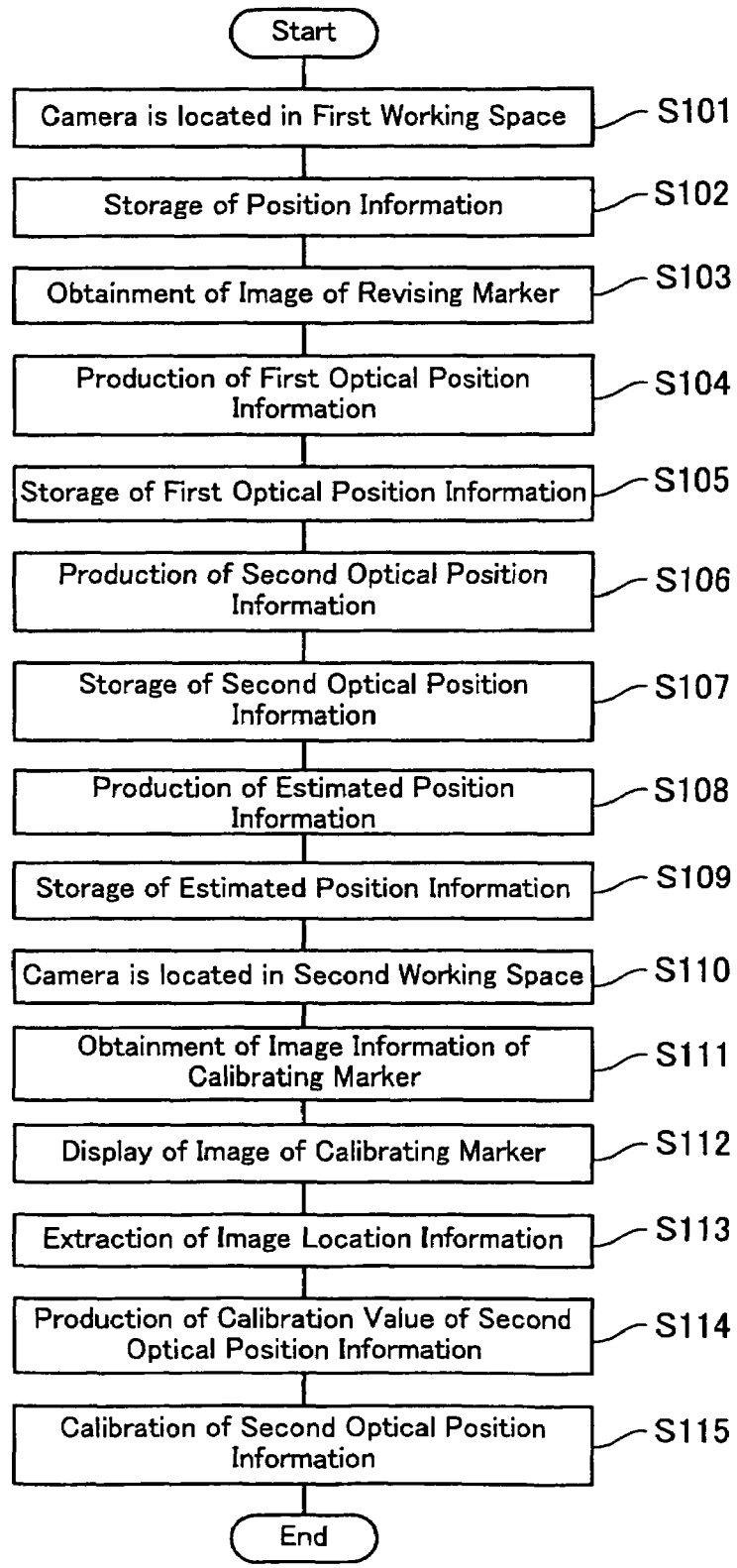
FIG. 13 is a flow chart showing a calibrating operation of the camera calibrating apparatus shown in FIG. 1.

In this embodiment, the camera 110 and the recordable medium 193 are transferred to the second working space from the first working space, however, the camera 110, the second optical position information storing section 130, the estimated position information storing section 150, and the calibrating section 160 may be collectively transferred as a camera assembly 194 to the second working space from the first working space as will be seen from FIG. 12.

The following description will be directed to the operation of the first embodiment of the camera calibrating apparatus according to the present invention. The second optical position information is calibrated by the camera calibrating apparatus 100 through the steps shown in the FIG. 13.

The camera 110 is firstly located at the predetermined position on the first coordinate system 101 in the first working space (in the step S101). The first housing position information, the second housing position information, the revising marker position information, and the calibrating marker position information are then stored in the first housing position information storing section 115, the second housing position information storing section 116, the revising marker position information storing section 125, and the calibrating marker position information storing section 126 (in the step S102), respectively. Here, the first housing position information, the second housing position information, the revising marker position information, and the calibrating marker position information are obtained on the basis of positions predetermined in the design process and measured by a measuring instrument.

The image information of the revising marker 105 is then obtained by the camera 110 (in the step S103). The first optical position information is then produced by the first optical position information producing section 117 from the revising marker position information storing section 125 on the basis of the image information of the revising marker 105 obtained by the camera 110 (in the step S104). The first optical position information produced by the first optical position information producing section 117 is then stored in the first optical position information storing section 118 (in the step S105).

The second optical position information is then produced by the second optical position information producing section 120 from the second housing position information stored in the second housing position information storing section 116 on the basis of the first housing position information stored in the first housing position information storing section 115 and the first optical position information stored in the first optical position information storing section 118 (in the step S106). The second optical position information produced by the second optical position information producing section 120 is then stored in the second optical position information storing section 130 (in the step S107).

The estimated position information indicative of the estimated location of the calibrating marker 106 is then produced by the estimated position information producing section 140 from the calibrating marker position information stored in the calibrating marker position information storing section 126 on the basis of the second optical position information produced by the second optical position information producing section 120 (in the step S108). The estimated position information produced by the estimated position information producing section 140 is stored in the estimated position information storing section 150 (in the step S109).

The camera 110 and the recordable medium 193 are then transferred to the second working space from the first working space. The camera 110 is then mounted to the automotive vehicle 108 to be located at the predetermined position on the second coordinate system 102 (in the step S10).

The image information of the calibrating marker 106 is then obtained by the camera 110 (in the step S111). The image information of the calibrating marker 106 obtained by the camera 110 is then displayed on the image displaying section 171 (in the step S112) as shown in FIG. 10. The image location Pn' of the calibrating marker is specified by the image location specifying section 172 (in the step S113). Here, the increment key 178a and the decrement key 178b are operated by an operator, while the number "n" of the marking object of the calibrating marker 106 displayed by the number displaying section 177 in response to the increment key 178a and the decrement key 178b. The up-arrow key 175a, the down-arrow key 175b, the left-arrow key 175c, and the right-arrow key 175d are operated by the operator, while the cursor 174 displayed on the image displaying section 171 is moved in response to each of the up-arrow key 175a, the down-arrow key 175b, the left-arrow key 175c, and the right-arrow key 175d. The enter key 176 is operated by the operator, while the position of the cursor 176 is decided as the image location Pn' of the number "n" of the calibrating marker 106 displayed on the number displaying section 177.

The calibration value of the second optical position information stored in the second optical position information storing section 130 is then calculated by the calibration value calculating section 180 on the basis of the image location information extracted by the image location information extracting section 170 and the estimated position information stored in the estimated position information storing section 150 (in the step S114).

The second optical position information stored in the second optical position information storing section 130 is finally calibrated by the optical position information calibrating section 190 on the basis of the calibration value calculated by the calibration value calculating section 180 (in the step S115). In this embodiment, the above mentioned steps 101 to 115 are executed as a program by a computer.

From the above detail description, it will be understood that the present embodiment of the camera calibrating apparatus 100 according to the present invention can calibrate the optical parameters of the camera 110 mounted on the automotive vehicle 108 to ensure an accurate position of an object located on the road is detected.

In this embodiment, the camera calibrating apparatus 100 according to the present invention can calibrate the second optical position by using the simple calibrating marker 106.

In this embodiment, the camera calibrating apparatus 100 according to the present invention can specify the image location of the calibrating marker 106 to ensure that the image location information indicative of the image location of the calibrating marker 106 is extracted.

Second Embodiment

Figure 14:
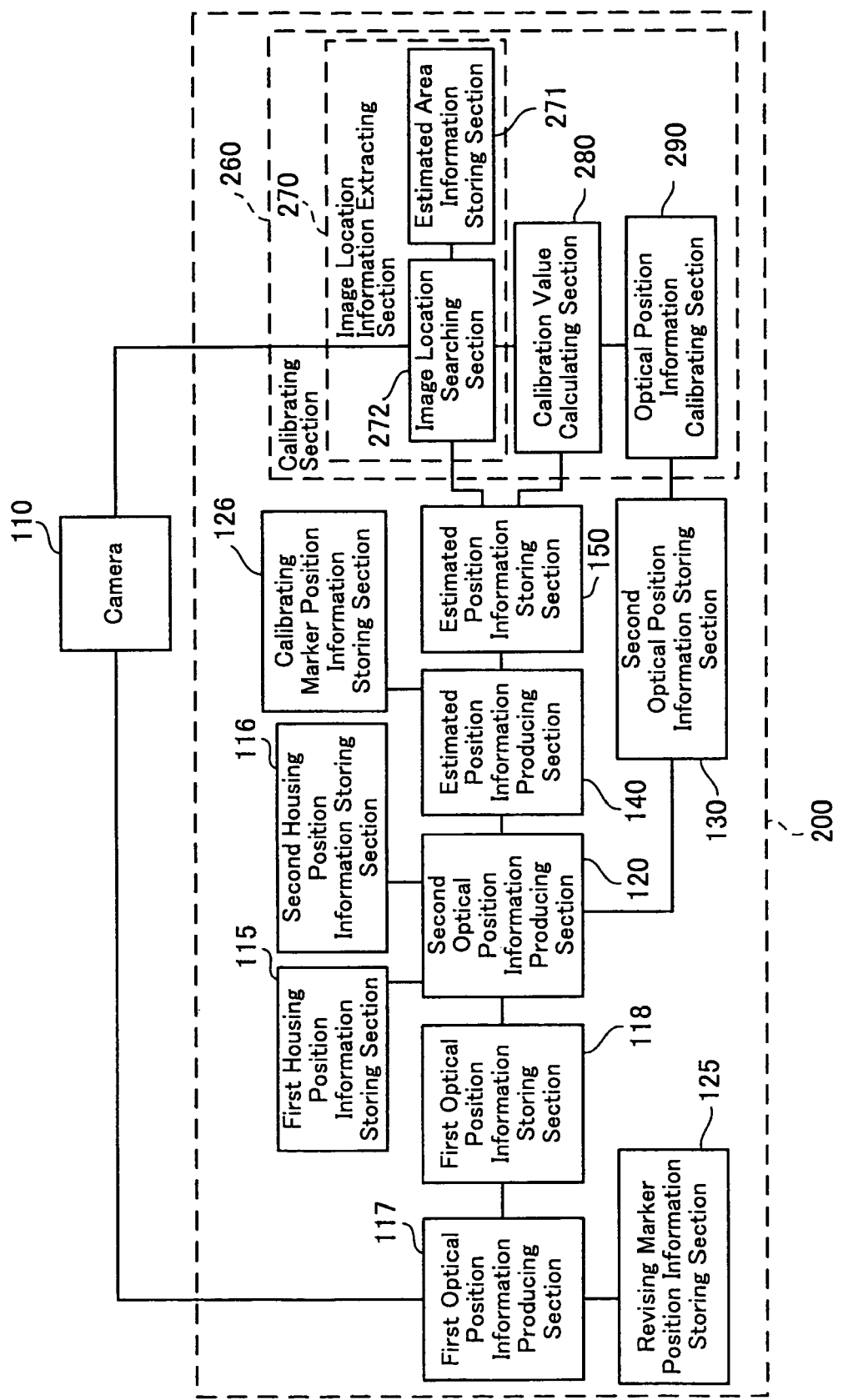
FIG. 14 is a block diagram showing a camera calibrating apparatus according to the second embodiment of the present invention and a camera exemplified as an imaging device.
Figure 15:
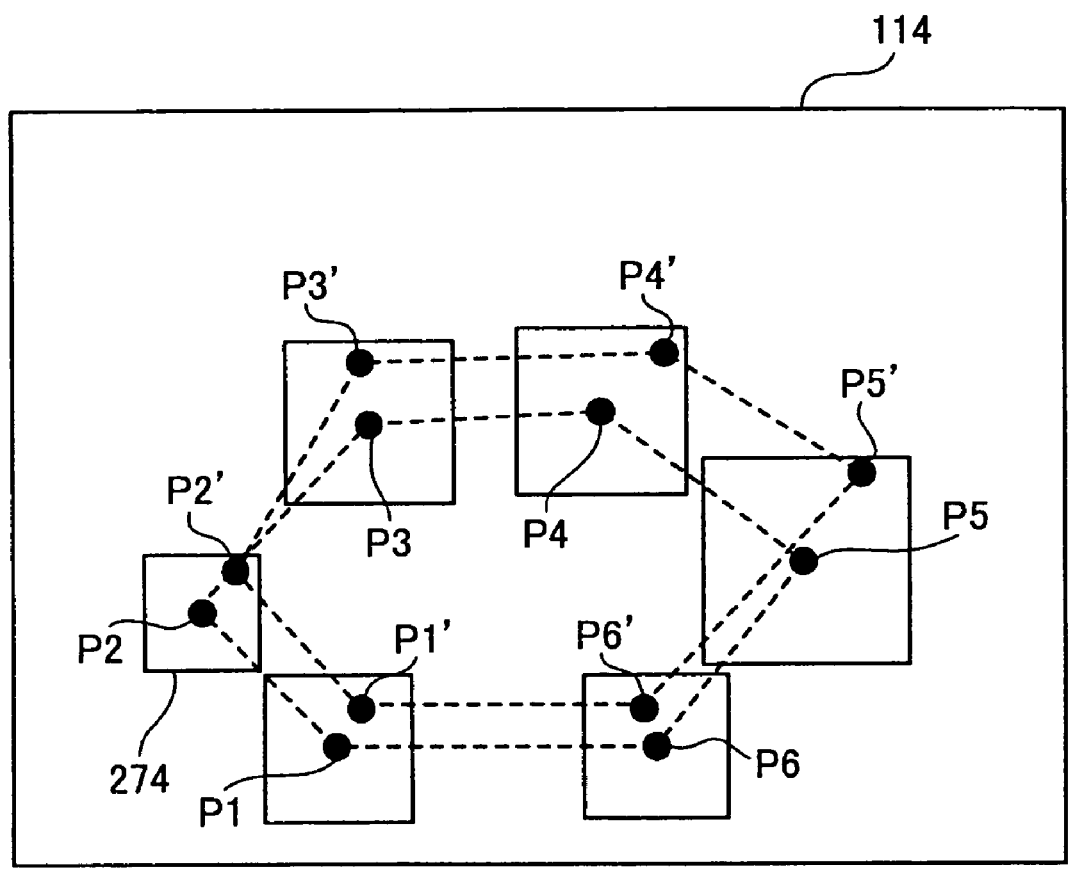
FIG. 15 a plan view showing an image coordinate system of the camera shown in FIG. 14.
Figure 16:
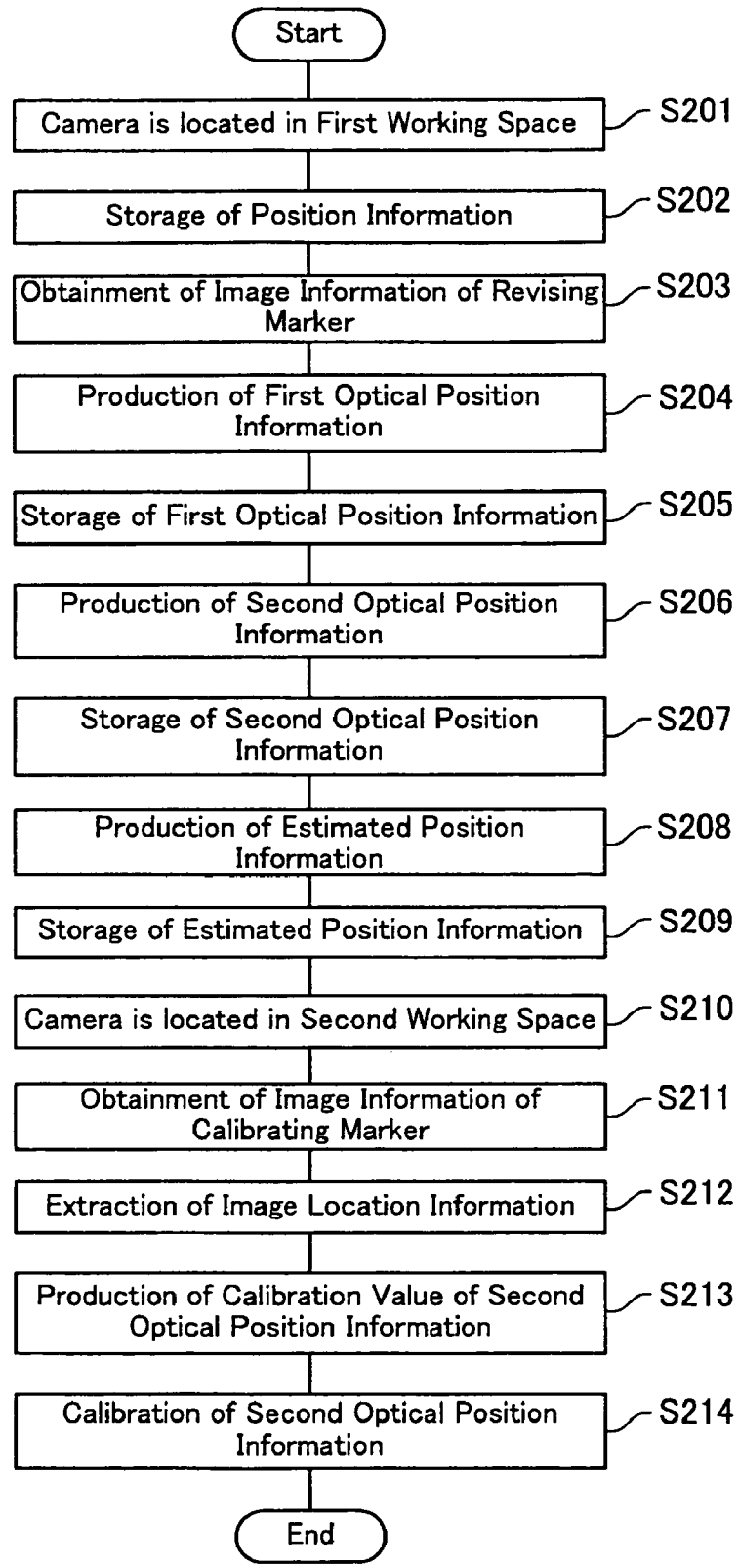
FIG. 16 is a flow chart showing a calibrating operation of the camera calibrating apparatus shown in FIG. 14.

Referring now to the drawings, in particular to FIGS. 14 to 16, there is shown a second embodiment of a camera calibrating apparatus according to the present invention.

The construction of the second embodiment of the camera calibrating apparatus according to the present invention will now be described hereinafter. The constitutional elements of the second embodiment of the camera calibrating apparatus the same as those of the first embodiment of the camera calibrating apparatus will not be described but bear the same reference numerals and legends as those of the first embodiment of the camera calibrating apparatus.

In FIG. 14, the camera calibrating apparatus 200 comprises a calibrating section 260 for calibrating the second optical position information stored in the second optical position information storing section 130.

The calibrating section 260 is adapted to calibrate the second optical position information stored in the second optical position information storing section 130 on the basis of the image information of the calibrating marker 106 obtained by the camera 110 and the estimated position information stored in the estimated position information storing section 150.

The calibrating section 260 includes an image location information extracting section 270 for extracting image location information indicative of an image location of the calibrating marker 106 to the image coordinate system 114 of the camera 110 on the basis of the image information of the calibrating marker 106 obtained by the camera 110, a calibration value calculating section 280 for calculating a calibration value to the second optical position information stored in the second optical position information storing section 130 on the basis of the image location information extracted by the image location information extracting section 270 and the estimated position information stored in the estimated position information storing section 150, and an optical position information calibrating section 290 for calibrating the second optical position information stored in the second optical position information storing section 130 on the basis of the calibration value calculated by the calibration value calculating section 280.

The image location information extracting section 270 includes an estimated area information storing section 271 for storing estimated area information (see FIG. 15) indicative of an estimated area 274 of the calibrating marker 106 to the image coordinate system 114 of the camera 110, and an image location searching section 272 for searching the image location Pn' of the calibrating marker 106 from the image information of the calibrating marker 106 obtained by the camera 110 on the basis of the estimated area information stored by the estimated area information storing section 271 and the estimated position information stored by the estimated location position information storing section 150 to ensure that the image location information is extracted.

The calibration value calculating section 280 is adapted to calculate the calibration value to the second optical position information on the basis of a method which is the same as the method of the calibration value calculating section 180 of the first embodiment.

The following description will be directed to the operation of the second embodiment of the camera calibrating apparatus according to the present invention. The second optical position information is calibrated by the camera calibrating apparatus 200 through the following steps shown in FIG. 16.

The camera 110 is firstly located at the predetermined position on the first coordinate system 101 in a first working space (in the step S201). The first housing position information, the second housing position information, the revising marker position information, and the calibrating marker position information are then stored in the first housing position information storing section 115, the second housing position information storing section 116, the revising marker position information storing section 125, and the calibrating marker position information storing section 126 (in the step S202), respectively. Here, the first housing position information, the second housing position information, the revising marker position information, and the calibrating marker position information are obtained on the basis of positions predetermined in the design process and measured by a measuring instrument.

The image information of the revising marker 105 is then obtained by the camera 110 (in the step S203). The first optical position information is then produced by the first optical position information producing section 117 from the revising marker position information stored in the revising marker position information storing section 125 on the basis of the image information of the revising marker 105 obtained by the camera 110 (in the step S204). The first optical position information produced by the first optical position information producing section 117 is then stored in the first optical position information storing section 118 (in the step S205).

The second optical position information is then produced by the second optical position information producing section 120 from the second housing position information stored in the second housing position information storing section 116 on the basis of the first housing position information stored in the first housing position information storing section 115 and the first optical position information stored in the first optical position information storing section 118 (in the step S206). The second optical position information produced by the second optical position information producing section 120 is then stored in the second optical position information storing section 130 (in the step S207).

The estimated position information indicative of the position of the calibrating marker 106 to the image coordinate system of the camera 110 is then produced by the estimated position information producing section 140 from the calibrating marker position information stored in the calibrating marker position information storing section 126 on the basis of the second optical position information produced by the second optical position information producing section 120 (in the step S208). The estimated position information produced by the estimated position information producing section 140 is stored in the estimated position information storing section 150 (in the step S209).

The camera 110 and the recordable medium 193 are then transferred to the second working space from the first working space. The camera 110 is then mounted to the automotive vehicle 108 to be located at the predetermined position on the second coordinate system 102 (in the step S210).

The image information of the calibrating marker 106 is then obtained by the camera 110 (in the step S211). As shown in FIG. 15, the image location Pn' is searched by the image location searching section 272 in the estimated area 274 at the estimated location Pn of the calibrating marker 106. The image location information is then extracted by the image location information extracting section 270.

The calibration value to the second optical position information stored in the second optical position information storing section 130 is then calculated by the calibration value calculating section 280 on the basis of the image location information extracted by the image location information extracting section 270 and the estimated position information stored in the estimated position information storing section 150 (in the step S213).

The second optical position information stored in the second optical position information storing section 130 is finally calibrated by the optical position information calibrating section 290 on the basis of the calibration value calculated by the calibration value calculating section 280 (in the step S214). In this embodiment, the above mentioned steps 101 to 115 may be executed as a program by a computer.

From the above detailed description, it will be understood that the second embodiment of the camera calibrating apparatus 200 can easily extract the image location information of the calibrating marker 106 by reason that the image location of the calibrating marker 106 is searched by the image location searching section 272.

Third Embodiment

Referring now to the drawings, in particular to FIGS. 17 to 28, there is shown a third embodiment of a camera calibrating apparatus according to the present invention.

The construction of the third embodiment of the camera calibrating apparatus according to the present invention will now be described hereinafter.

Figure 17:
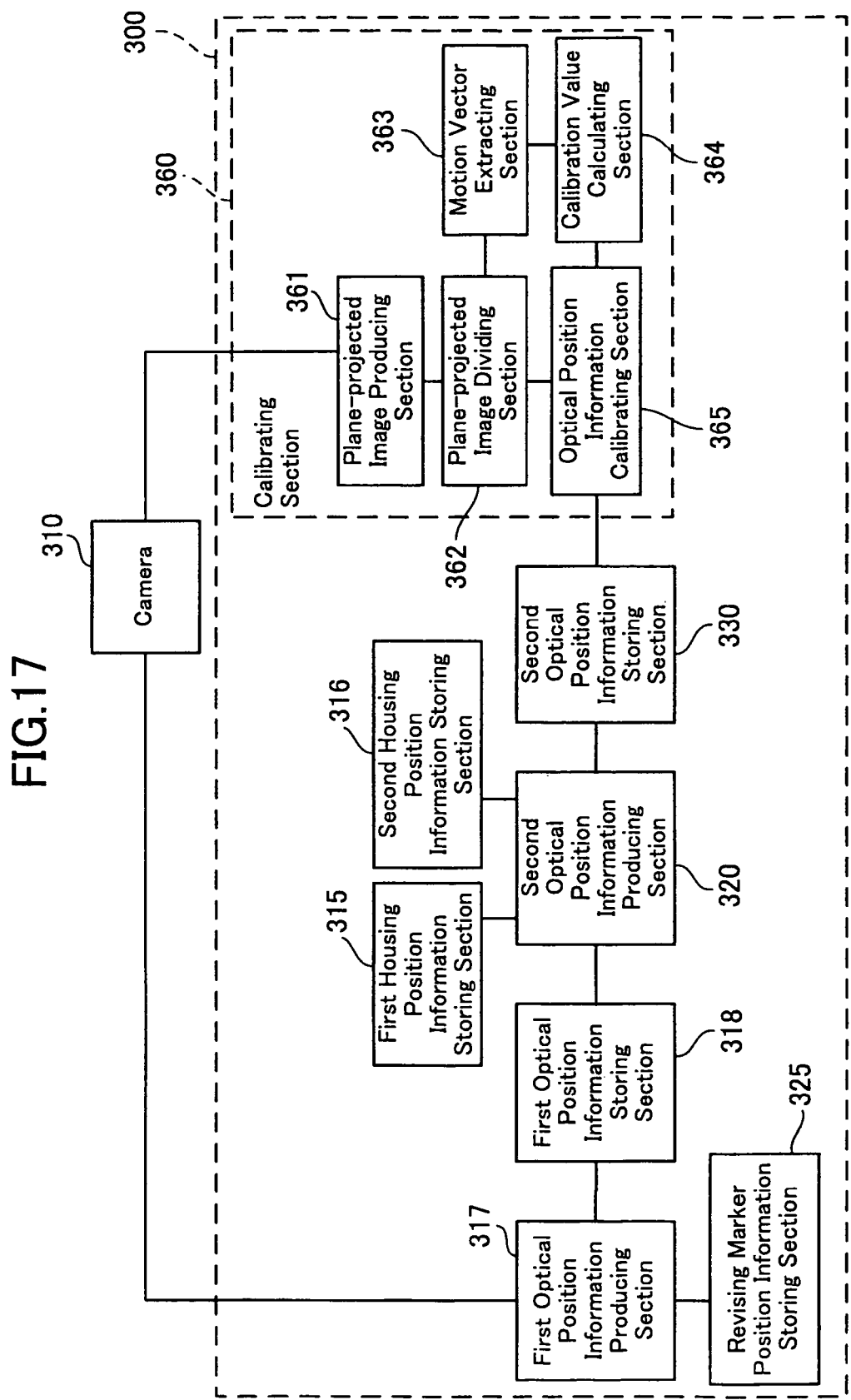
FIG. 17 is a block diagram showing the camera calibrating apparatus according to the third embodiment of the present invention and a camera exemplified as an imaging device.
Figure 18:
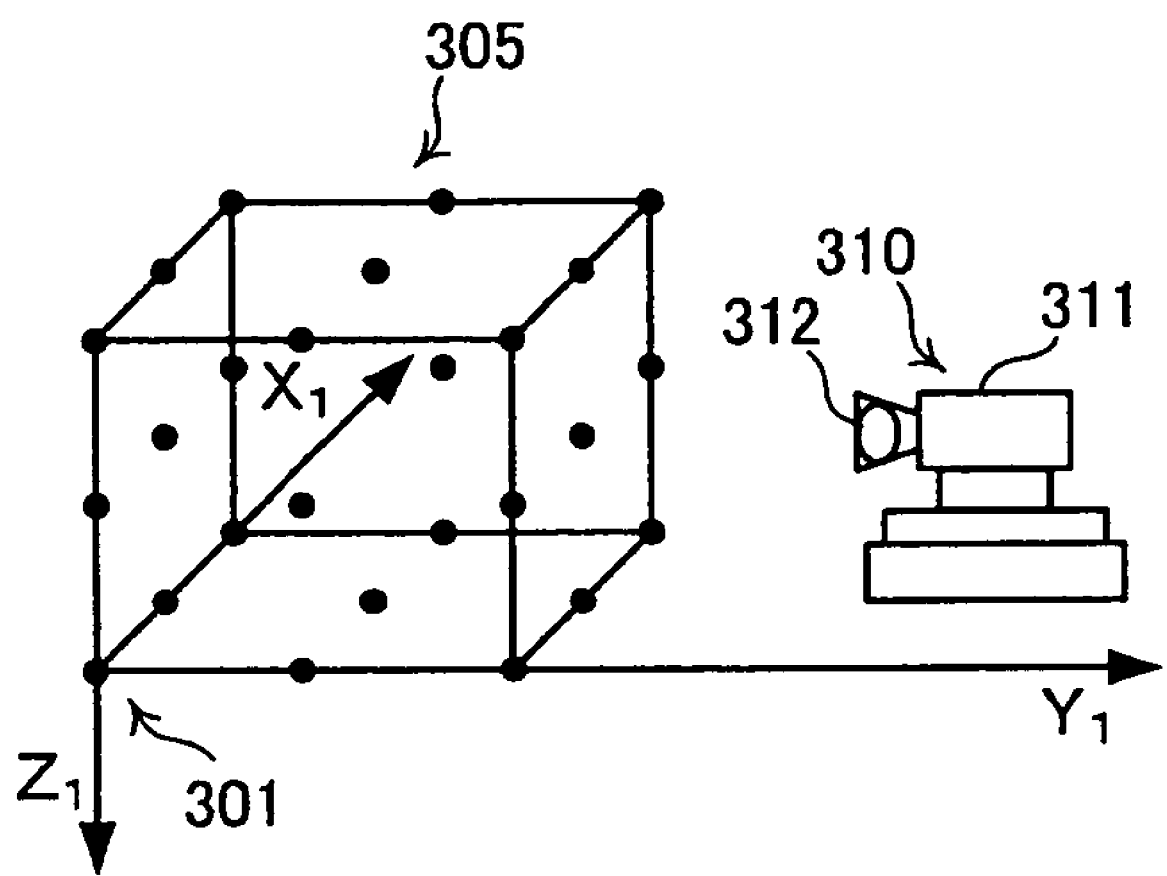
FIG. 18 is a perspective view showing the first coordinate system in which the camera shown in FIG. 17 is located.
Figure 19:
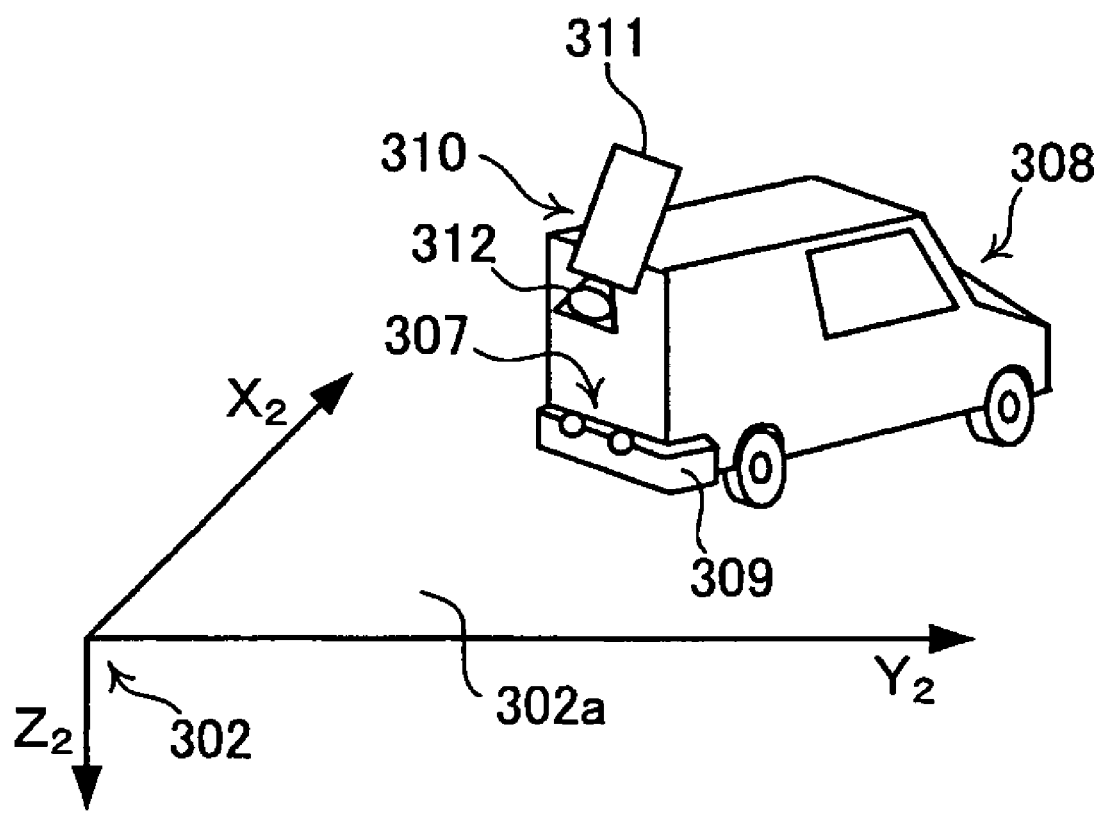
FIG. 19 is a perspective view showing the second coordinate system in which the camera shown in FIG. 17 is located.

As shown in FIGS. 17 to 19, the camera calibrating apparatus 300 is electrically connected to a camera 310 as an imaging device. The camera 310 includes a housing unit 311 and an optical section 312 supported by the housing unit 311 to obtain image information through the optical section 312.

The camera calibrating apparatus 300 comprises a first housing position information storing section 315 for storing first housing position information indicative of the position of the housing unit 311 to the first coordinate system 301, a second housing position information storing section 316 for storing second housing position information indicative of the position of the housing unit 311 in the second coordinate system 302, and a revising marker position information storing section 325 for storing revising marker position information indicative of the position of a revising marker 305 in the first coordinate system 301.

The first coordinate system 301 is defined in a first working space such as a camera production plant to have $X_1$-axis, $Y_1$-axis, and $Z_1$-axis, while the revising marker 305 laid out in the first working space causes the camera calibrating apparatus 300 to revise the camera 310 located in the first working space. The revising marker 305 is constituted by a plurality of marking objects which are respectively located at predetermined positions on the first coordinate system 301, and which are within a viewing field of the camera 310 located in the first working space.

The second coordinate system 302 is defined in a second working space such as an automotive vehicle production plant. The second coordinate system 302 has $X_2$-axis, $Y_2$-axis, and $Z_2$-axis. The $X_2$-axis and the $Y_2$-axis collectively define $X_2$-$Y_2$ plane to be represented by a road surface 302a on which an automotive vehicle 308 is located. The dividing marker 307 is located on a bumper 309 of the automotive vehicle 308. The dividing marker 307 is constituted by two marking objects which is within a viewing field of the camera 310 mounted on the automotive vehicle 308. The dividing marker 307 is located directly below the camera 310 mounted on the automotive vehicle 308.

The camera calibrating apparatus 300 is adapted to revise the camera 310 in the first working space. The camera 310 is located at a predetermined position on the first coordinate system 301, while the first housing position information storing section 315 is adapted to store first housing position information indicative of the position of the housing unit 311. Here, the term "the calibration of the camera 310" is intended to indicate the calculation of the accurate position of the optical section 312 of the camera 310 mounted on the automotive vehicle 308.

The camera 310 revised by the camera calibrating apparatus 310 is mounted on the automotive vehicle 308 to be located at a predetermined position on the second coordinate system 302 in the second working space, while the second housing position information storing section 316 is adapted to store second housing position information indicative of the position of the housing unit 311. Here, the second housing position information indicates an accurate position in which the housing unit 311 of the camera 310 is located when the camera 310 is mounted on the automotive vehicle 308.

The dividing marker 307 is located on the bumper 309 of the automotive vehicle 308 in spaced relationship with the position of the housing unit 311 represented by the second housing position information. This means that the dividing marker 307 is not moved with respect to the housing unit 311 when the automotive vehicle 308 is traveling on the road 302a.

The camera calibrating apparatus 300 further comprises a first optical position information producing section 317 for producing first optical position information indicative of the position of the optical section 312 to the first coordinate system 301, and a first optical position information storing section 318 for storing the first optical position information produced by the first optical position information producing section 317.

The first optical position information producing section 317 is adapted to calculate the position of the optical section 312 to the first coordinate system 301 from the revising marker position information stored in the revising marker position information storing section 325 on the basis of the image information of the revising marker 305 obtained by the camera 310. Here, the term "the position of the optical section 312" is intended to indicate an optical center of the optical section 312 and the position of an optical axis, and other optical parameters. The calculation of the position of the optical section 312 to the first coordinate system 301 is performed on the basis of the method disclosed in the document 1.

The camera calibrating apparatus 300 further comprises a second optical position information producing section 320 for producing second optical information indicative of the position of the optical section 312 in the second coordinate system 302, and a second optical position information storing section 330 for storing the second optical position information produced by the second optical position information producing section 320.

The second optical position information producing section 320 is adapted to produce second optical position information indicative of the position of the optical section 312 in the second coordinate system 302 from the second housing position information stored in the second housing position information storing section 316 on the basis of the first housing position information stored by the first housing position information storing section 315 and the first optical position information stored in the first optical position information storing section 318.

The second optical position information producing section 320 is adapted to calculate the position of the optical section 312 in the second coordinate system 302 on the basis of a method which is the same as the method of the second optical position information producing section 120 of the first embodiment.

Figure 20:
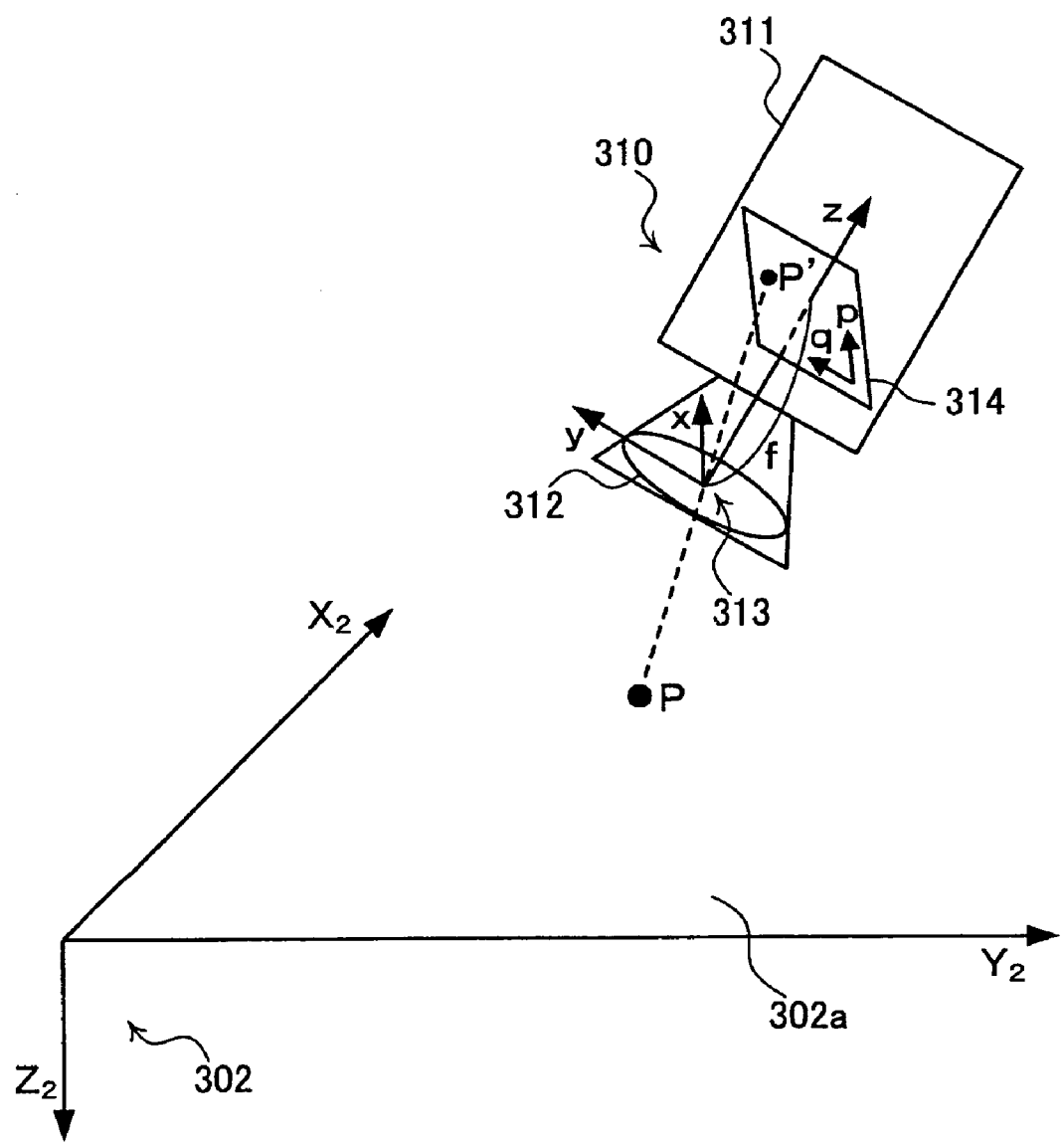
FIG. 20 is a perspective view showing a coordinate system of the camera shown in FIG. 17.

As shown in FIG. 20, the camera 310 mounted on the automotive vehicle 308 located in the second working space defines a camera coordinate system 313 having x-axis, y-axis, and z-axis on the basis of the second optical position information. The origin point of the camera coordinate system 313 is in register with the optical center of the optical section 312. The x-axis of the camera coordinate system 313 extends in a horizontal direction of the camera 310. The y-axis of the camera coordinate system 313 extends in a vertical direction of the camera 310. The z-axis of the camera coordinate system 313 is in axial alignment with the optical axis of the optical section 312.

The image coordinate system 314 is defined on a plane spaced apart from the origin point of the camera coordinate system 313 with a focal length "f" in the direction of the z-axis of the camera coordinate system 313. The image coordination system 314 has p-axis and q-axis. The camera 310 is adapted to obtain, as image information, an optical image focused on the image coordinate system 314 through the optical section 312.

The camera calibrating apparatus 300 further comprises a calibrating section 360 for calibrating the second optical position information stored in the second optical position information storing section 330 on the basis of the motion vector of the image information obtained by the camera 310 in the second coordinate system 302.

The calibrating section 360 includes a plane-projected image producing section 361 for producing a plane-projected image from the image information obtained by the camera 310 on the second coordinate system 302, a plane-projected image dividing section 362 for dividing the plane-projected image produced by the plane-projected image producing section 361 into a plurality of image segments, a motion vector extracting section 363 for extracting the motion vector from the image segments divided by the plane-projected image dividing section 362, a calibration value calculating section 364 for calculating a calibration value of the second optical position information stored by the second optical position information storing section 330 on the basis of the motion vector extracted by the motion vector extracting section 363, and an optical position information calibrating section 365 for calibrating the second optical position information stored by the second optical position information storing section 330 on the basis of the calibration value calculated by the calibration value calculating section 364.

Figure 21:
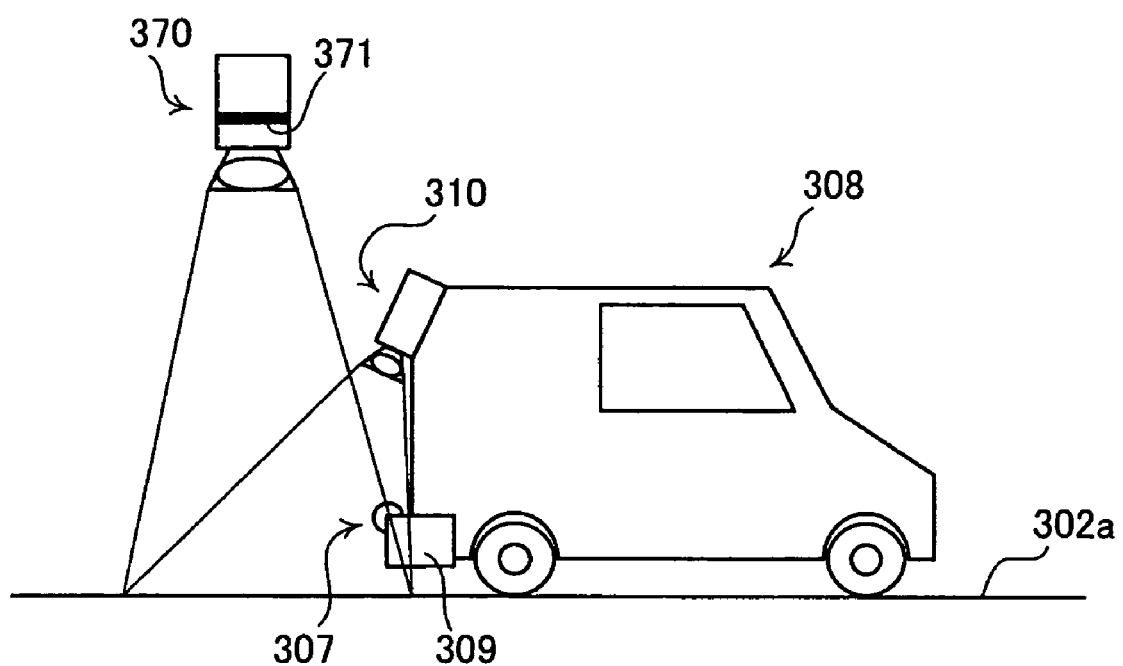
FIG. 21 is a side view showing an imaginary camera of the camera calibrating apparatus shown in FIG. 17.
Figure 23:
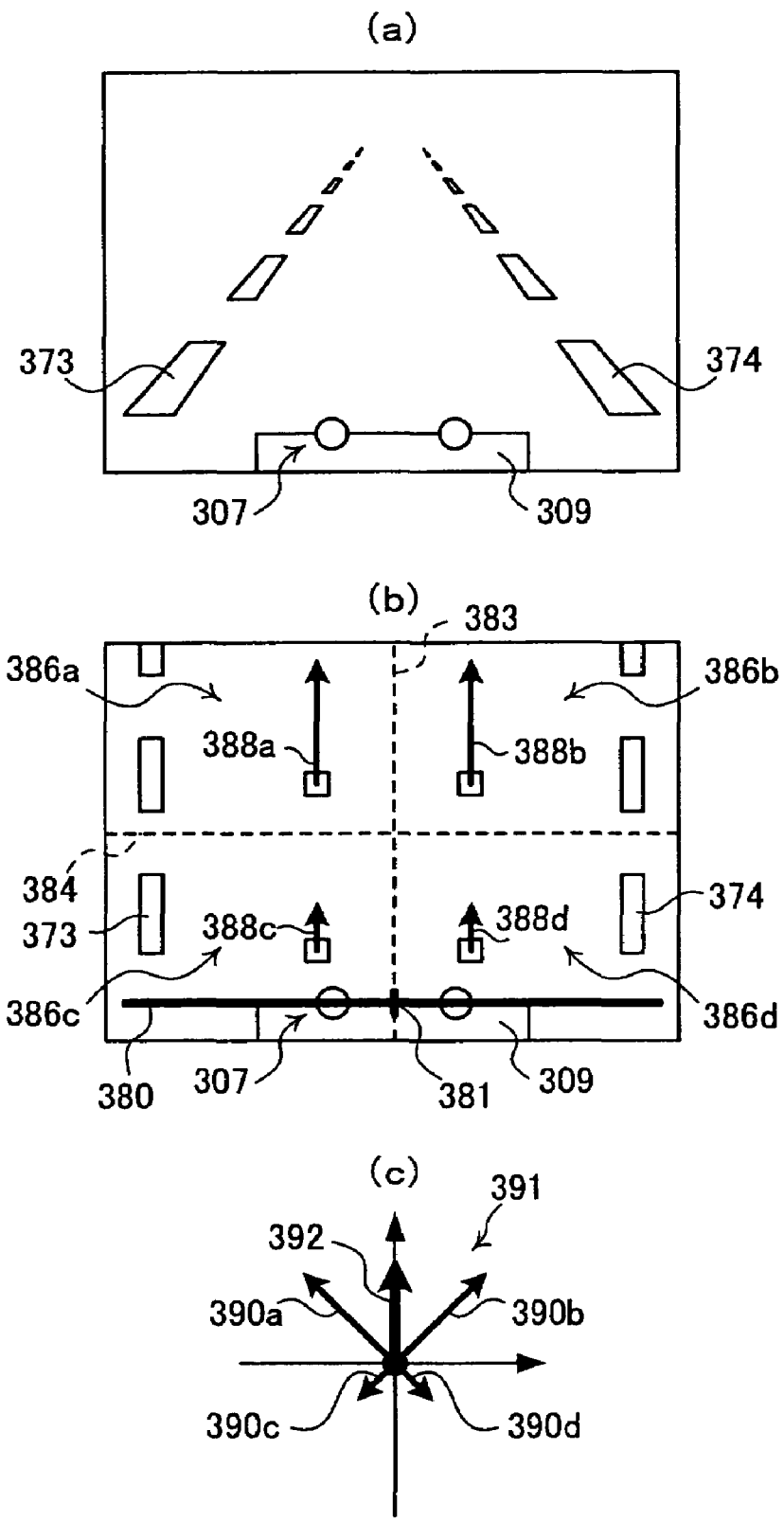
FIG. 23 is a schematic view showing an operation of the calibrating section of the camera calibrating apparatus shown in FIG. 17.
Figure 24:
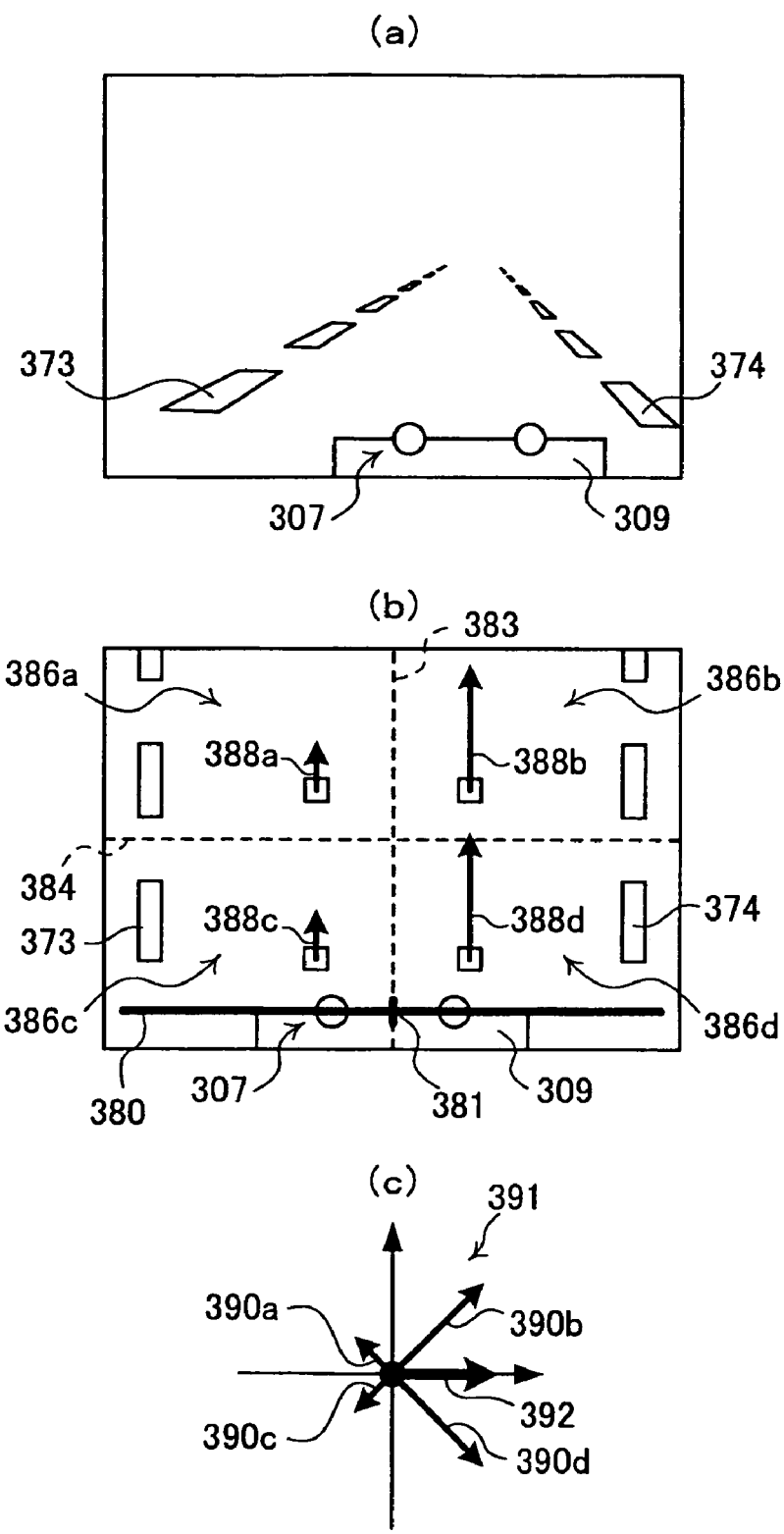
FIG. 24 is a schematic view showing an operation of the calibrating section of the camera calibrating apparatus shown in FIG. 17.

As shown in FIG. 21, the plane-projected image produced by the plane-projected image producing section 361 is the sama as an image taken by an imaginary camera 370 located on a plane which defines an image coordinate system 371 parallel to the road surface 302a. The image of the road surface 302a focused on the image coordinate system 371 is the same as the reduced-size road surface 302a.

The plane-projected image producing section 361 is adapted to produce plane-projected image on the basis of a following method.

In FIG. 20, the angle of the x-axis of the image coordinate system 313 to the road surface 302a is represented by a legend α. The angle of the y-axis of the image coordinate system 313 to the road surface 302a is represented by a legend β. The distance between the origin point of the camera coordinate system 313 and an intersecting point of the extension line of the z-axis of the camera coordinate system 313 to the road surface 302a is represented by a legend "c". The $X_2$-$Y_2$ surface of the second coordinate system 302, i.e., the road surface 302a is represented by following equations (6) and (7).

$$\begin{cases} a = \sin\alpha \\ b = \sin\beta \end{cases} \quad (6)$$

$$z = ax + by + c \quad (7)$$

The transformation to the camera coordinate system 313 from the image coordinate system 314 is represented by a following equation (8). Here, the legend (p, q) represents ordinate and abscissa of the image location P' to the image coordinate system 314.

$$\begin{cases} x = \dfrac{cp}{f - ap - bp} \\ y = \dfrac{cq}{f - ap - bp} \\ z = \dfrac{cf}{f - ap - bp} \end{cases} \quad (8)$$

$$\begin{bmatrix} X \\ Y \\ Z \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} x \\ y \\ z \end{bmatrix} + \begin{bmatrix} T_x \\ T_y \\ T_z \end{bmatrix} \quad (9)$$

In the equation (9), the translation vector "T" indicates a direction of the origin point of the second coordinate system 302 to the origin point of the camera coordination system 313 and a distance between the origin point of the second coordinate system 302 and the origin point of the camera coordinate system 313. The rotation matrix "R" represents a deviation between the second coordinate system 302 and the camera coordinate system 313 in the rotational direction. When the housing unit 311 is mounted on the slanted position on the automotive vehicle 308, the rotation matrix "R" is represented by the equations (3) to (5) shown in the first embodiment. Here, the legends θ, Φ, and φ represent the angle of the camera coordinate system 313 to the x-axis of the camera coordinate system 313, the angle of the camera coordinate system 313 to the y-axis of the camera coordinate system 313, and the angle of the camera coordinate system 313 to the z-axis of the camera coordinate system 313, respectively.

When the housing unit 311 is mounted on the accurate position on the automotive vehicle 308, the plane-projected image producing section 361 is adapted to produce a plane-projected image shown in FIG. 22(b) from the image information shown in FIG. 22(a). In this plane-projected image, the lines 373 and 374 are in parallel relationship with each other by reason that the plane-projected image is the same as the image taken by the imaginary camera 370 located in parallel relationship with the road surface 302a.

When the camera coordinate system 313 is moved around the x-axis under the condition that the housing unit 311 is downwardly slanted with respect to the automotive vehicle 308, the plane-projected image producing section 361 is adapted to produce a plane-projected image shown in FIG. 23(b) from the image information shown in FIG. 23(a).

When the camera coordinate system 313 is moved around the y-axis under the condition that the housing unit 311 is leftwardly panned with respect to the automotive vehicle 308, the plane-projected image producing section 361 is adapted to produce a plane-projected image shown in FIG. 24(b) from the image information shown in FIG. 24(a).

When the camera coordinate system 313 is moved around the z-axis under the condition that the housing unit 311 is leftwardly slanted with respect to the automotive vehicle 308, the plane-projected image producing section 361 is adapted to produce a plane-projected image shown in FIG. 25(b) from the image information shown in FIG. 25(a).

As shown in FIGS. 22(b), 23(b), 24(b), and 25(b), the plane-projected image dividing section 362 is adapted to divide the plane-projected image into a plurality of image segments on the basis of the image information of the dividing markers 307 obtained by the camera 310.

The plane-projected image dividing section 362 is adapted to superimpose dividing lines 383 and 384 on the plane-projected image on the basis of a base line 380 passing through the dividing markers 307. The dividing line 383 is in perpendicular relationship with the base line 380, and passes thought an intermediate point 381 defined between the dividing markers 307. On the other hand, the dividing line 384 is in parallel and spaced relationship with the base line 380.

When the housing unit 311 is mounted on the slanted position of the automotive vehicle 308, more specifically, the camera coordinate system 313 is moved around the z-axis, the base line 380 has a tilt to the right as will be seen from the plane-projected image shown in FIG. 25(b).

As shown in FIGS. 22(b), 23(b), 24(b), and 25(b), the motion vector extracting section 363 is adapted to extract the motion vectors 388a, 388b, 388c, and 388d from the four image segments 386a, 386b, 386c, and 386d divided by the plane-projected image dividing section 362.

The directions of the motion vectors 388a to 388d are equal to one another when the automotive vehicle 308 is linearly traveling by reason that the motion vectors 388a to 388d are calculated on the basis of the flow of the fragmental image of the image information obtained from the motion of the automotive vehicle 308, i.e., the motion of the camera 310 to the road. The following description will be directed to the motion vectors 388a to 388d extracted from the image information obtained under the automotive vehicle 308 is linearly traveling.

When the housing unit 311 is mounted on the accurate position of the automotive vehicle 308, the amplitudes of the motion vectors 388a, 388b, 388c, and 388d are equal to one another as shown in FIG. 22(b).

When the housing unit 311 is mounted on the downwardly slanted position of the automotive vehicle 308, more specifically, the camera coordinate system 313 is moved around the x-axis, the motion vectors 388a and 338b of the upper side fragmental image is larger than the motion vectors 388a and 338b of the lower side fragmental image as shown in FIG. 23(b).

When the housing unit 311 is mounted on the leftwardly slanted position of the automotive vehicle 308, more specifically, the camera coordinate system 313 is moved around the y-axis, the motion vectors 388b and 338d of the right side fragmental image is larger than the motion vectors 388a and 338c of the left side fragmental image as shown in FIG. 24(b).

The calibration value calculating section 364 is adapted to produce a calibration value of the second optical position information on the basis of a following method.

As shown in FIGS. 22(c), 23(c), and 24(c), the vector 390a equal in amplitude to the motion vector 388a, the vector 390b equal in amplitude to the motion vector 388b, the vector 390c equal in amplitude to the motion vector 388c, and the vector 390d equal in amplitude to the motion vector 388d are located on a composited vector calculating coordinate system 391.

Here, the vector 390a is located at the origin point of the composited vector calculating coordinate system 391 in the direction of an upper-leftward angle of 45 degrees. The vector 390b is located at the origin point of the composited vector calculating coordinate system 391 in the direction of an upper-rightward angle of 45 degrees. The vector 390c is located at the origin point of the composited vector calculating coordinate system 391 in the direction of a lower-leftward angle of 45 degrees. The vector 390a is located at the origin point of the composited vector calculating coordinate system 391 in the direction of a lower-rightward angle of 45 degrees.

The composition of the vectors 390a to 390d is performed on the composited vector calculating coordinate system 391.

When the housing unit 311 is mounted on the accurate position of the automotive vehicle 308, the amplitude of the composited vector 392 is equal to zero by reason that the amplitudes of the motion vectors 388a, 388b, 388c, and 388d are equal to one another as shown in FIG. 22(b). Here, each of the rotation angle θ to the x-axis, the rotation angle Φ to the y-axis, and the rotation angle φ to the z-axis is equal to zero on the camera coordinate system 313.

When the housing unit 311 is mounted on the downwardly slanted position of the automotive vehicle 308, and more specifically, the camera coordinate system 313 is moved around the x-axis, the composited vector 392 points upward by reason that the vectors 390a and 390b are respectively larger in amplitude than the vectors 390a and 390b as shown in FIG. 23(b). The rotation angle θ to the x-axis is calculated on the basis of the equation (9) under the condition that the calculated rotation matrix "R" leads to the fact that the composited vector 392 is equal to zero.

When the housing unit 311 is mounted on the leftwardly slanted position of the automotive vehicle 308, and more specifically, the camera coordinate system 313 is moved around the y-axis, the composited vector 392 points rightward by reason that the vectors 390b and 390d are respectively larger in amplitude than the vectors 390a and 390c as shown in FIG. 24(b). The rotation angle Φ to the y-axis is calculated on the basis of the equation (9) under the condition that the calculated rotation matrix "R" leads to the fact that the composited vector 392 is equal to zero.

When, on the other hand, the housing unit 311 is mounted on the slanted position of the automotive vehicle 308, and more specifically, the camera coordinate system 313 is moved around the z-axis, the rotation angle φ to the z-axis of the camera coordinate system 313 is calculated on the basis of the slope of the base line 380 on the image coordinate system 371 of the plane-projected image shown in FIG. 25(b).

Figure 26:
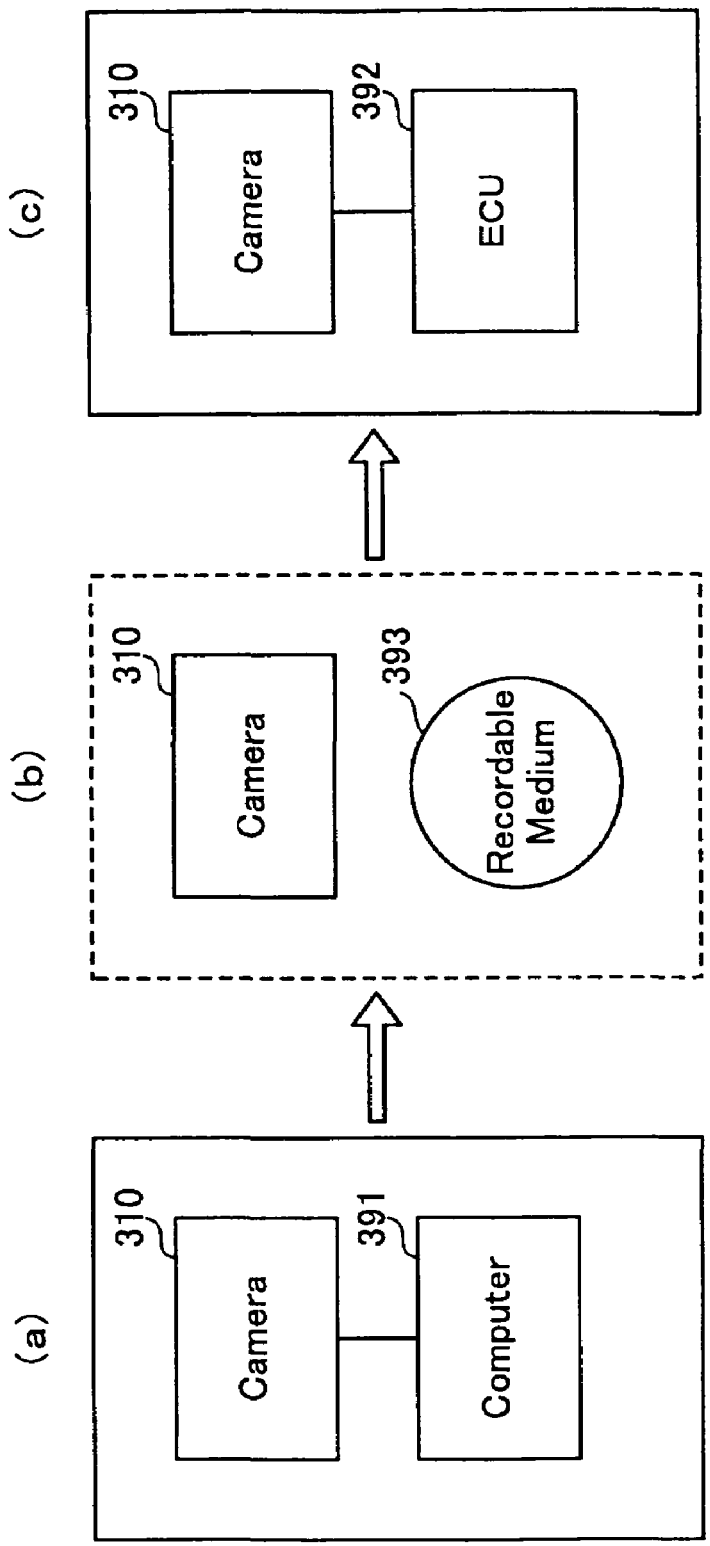
FIG. 26 is a block diagram showing a computer and ECU to ensure the camera calibrating apparatus shown in FIG. 17.

As shown in FIG. 26, the camera calibrating apparatus 300 thus constructed as previously mentioned can be realized by comprising a computer 391 for adjusting the camera 310, ECU 392 constituted as an image controlling apparatus for controlling the camera 310, and other elements.

The computer 391 is shown in FIG. 26(a) as including CPU, RAM, ROM, an input/output interface, and other units. The computer 391 is electrically connected to the camera 310 at the first working space. In this embodiment, the computer 391 constitutes each of the first housing position information storing section 315, the second housing position information storing section 316, the first optical position information producing section 317, the first optical position information storing section 318, the second optical position information producing section 320, the revising marker position information storing section 325, and the second optical position information storing section 330.

The ECU 392 is shown in FIG. 26(c) as including CPU, RAM, ROM, an input/output interface, and other elements. The ECU 392 is mounted on the automotive vehicle 308 to be electrically connected to the camera 310 in the second working space. In this embodiment, the ECU 392 constitutes each of the second optical position information storing section 330 and the calibrating section 360.

As shown in FIG. 26(b), the camera 310 is transferred to the second working space from the first working space with a recordable medium 393 such as for example CD-ROM and a magnetic disk. The recordable medium 393 has stored therein the second optical position information to ensure that the second optical position information is effectively transferred to the ECU 392 from the computer 391.

Figure 27:
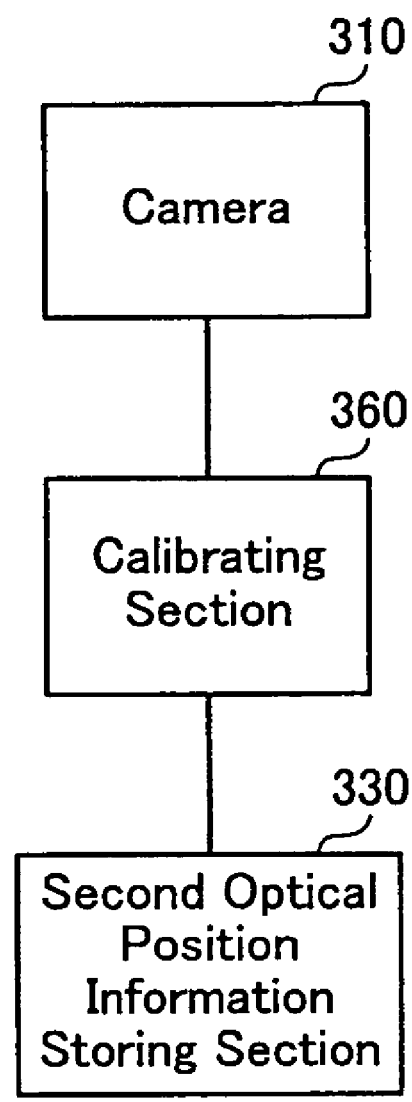
FIG. 27 is a block diagram showing a camera unit of the camera calibrating apparatus shown in FIG. 17.

In this embodiment, the camera 310 and the recordable medium 393 are transferred to the second working space from the first working space, however, the camera 310, the second optical position information storing section 330, and the calibrating section 360 may be collectively transferred as a camera unit 194 to the second working space from the first working space as shown in FIG. 27.

The following description will be directed to the operation of the third embodiment of the camera calibrating apparatus according to the present invention.

Figure 28:
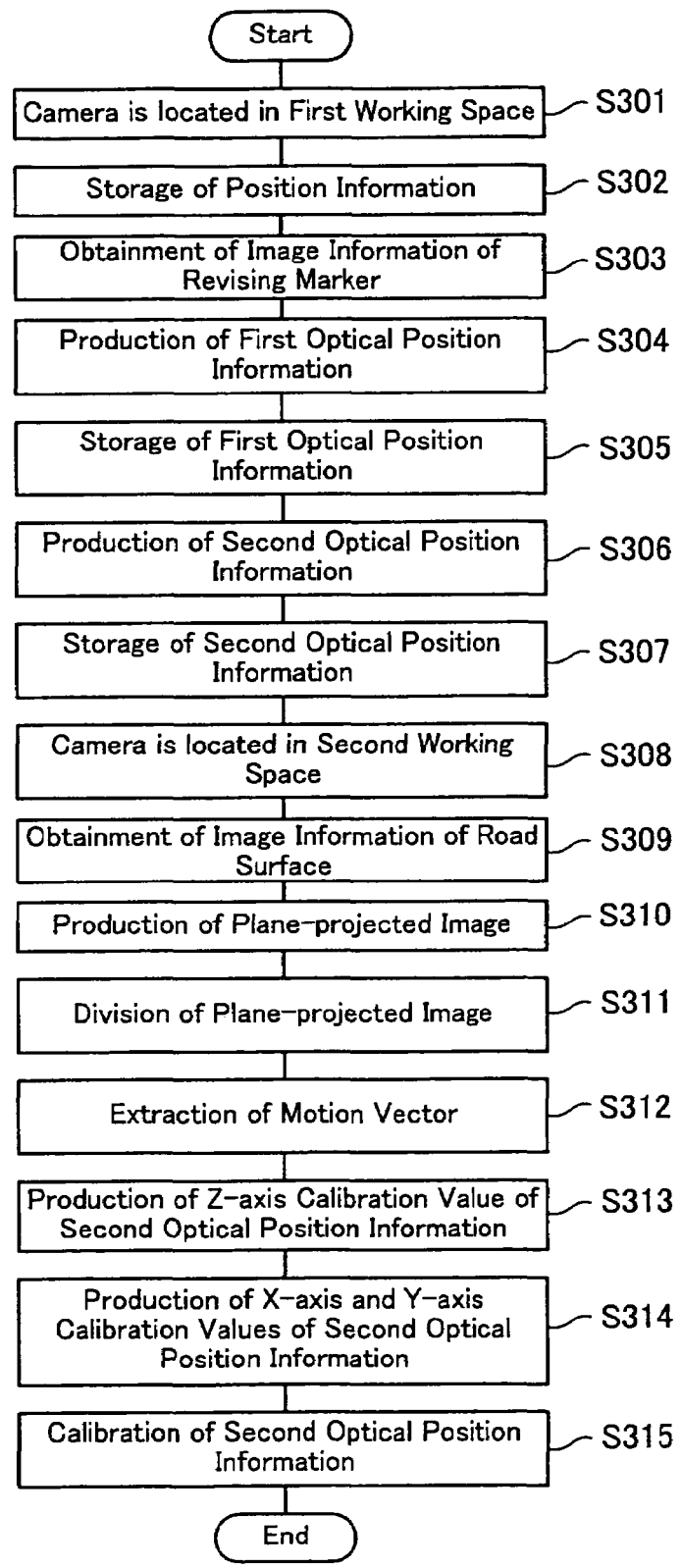
FIG. 28 is a flow chart showing a calibrating operation of the camera calibrating apparatus shown in FIG. 17.

The second optical position information is calibrated by the camera calibrating apparatus 300 through the steps shown in the FIG. 28.

The camera 310 is firstly located at the predetermined position on the first coordinate system 301 in the first working space (in the step S301). The first housing position information, the second housing position information, and the revising marker position information are then stored in the first housing position information storing section 315, the second housing position information storing section 316, and the revising marker position information storing section 325, respectively (in the step S302). Here, the first housing position information, the second housing position information, and the revising marker position information are obtained on the basis of positions predetermined in the design process and measured by a measuring instrument.

The image information of the revising marker 105 is then obtained by the camera 310 (in the step S303). The first optical position information is then produced by the first optical position information producing section 317 from the revising marker position information stored in the revising marker position information storing section 325 on the basis of the image information of the revising marker 305 obtained by the camera 310 (in the step S304). The first optical position information produced by the first optical position information producing section 317 is then stored in the first optical position information storing section 318 (in the step S305).

The second optical position information is then produced by the second optical position information producing section 320 from the second housing position information stored in the second housing position information storing section 316 on the basis of the first housing position information stored in the first housing position information storing section 315 and the first optical position information stored in the first optical position information storing section 318 (in the step S306). The second optical position information produced by the second optical position information producing section 320 is then stored in the second optical position information storing section 330 (in the step S307).

The camera 310 and the recordable medium 393 are then transferred to the second working space from the first working space. The camera 310 is then mounted to the automotive vehicle 308 to be located at a predetermined position on the second coordinate system 302 (in the step S308).

The image of the road surface 302a is then taken by the camera 310 (in the step S309). As shown in FIGS. 22(b), 23(b), 24(b), and 25(b), the plane-projected image is produced from the image information obtained by the camera 310 on the second coordinate system 302 (in the step S310).

As shown in FIGS. 22(b), 23(b), 24(b), and 25(b), the plane-projected image produced by the plane-projected image producing section 361 is divided into a plurality of image segments 386a to 386d by the plane-projected image dividing section 362 on the basis of the image information of the dividing markers 307 obtained by the camera 310 (in the step S311).

As shown in FIGS. 22(b), 23(b), 24(b), and 25(b), the motion vectors are extracted by the motion vector extracting section 363 from the image segments 386a to 386d divided by the plane-projected image dividing section 362 (in the step S312).

As shown in FIGS. 25(b), the calibration value on z-axis of the second optical position information stored in the second optical position information storing section 330 is then calculated by the calibration value calculating section 365 on the basis of the slope of the base line 380 on the image coordinate system 371 of the plane-projected image shown in FIG. 25(b) (in the step S313). As shown in FIGS. 22(c), 23(c), and 24(c), the calibration value on each of x-axis and y-axis of the second optical position information stored in the second optical position information storing section 330 is then calculated by the calibration value calculating section 365 on the basis of the motion vectors extracted by the motion vector extracting section 363 (in the step S314).

The second optical position information stored in the second optical position information storing section 330 is finally calibrated by the optical position information calibrating section 365 on the basis of the calibration value calculated by the calibration value calculating section 364

(in the step S315). In this embodiment, the above mentioned steps 301 to 315 may be executed as a program by a computer.

From the above detailed description, it will be understood that the camera calibrating apparatus 300 can calibrate the second optical position information by using the motion vectors 388a to 388d.

In this embodiment, the camera calibrating apparatus 300 can easily extract the motion vectors from the respective image segments 386a to 386d.

In this embodiment, the camera calibrating apparatus 300 can accurately divide the plane-projected image by using the dividing marker 307.

Fourth Embodiment

Referring now to the drawings, in particular to FIGS. 29 to 38, there is shown a fourth embodiment of a camera calibrating apparatus according to the present invention.

The construction of the fourth embodiment of the camera calibrating apparatus according to the present invention will now be described hereinafter.

Figure 29:
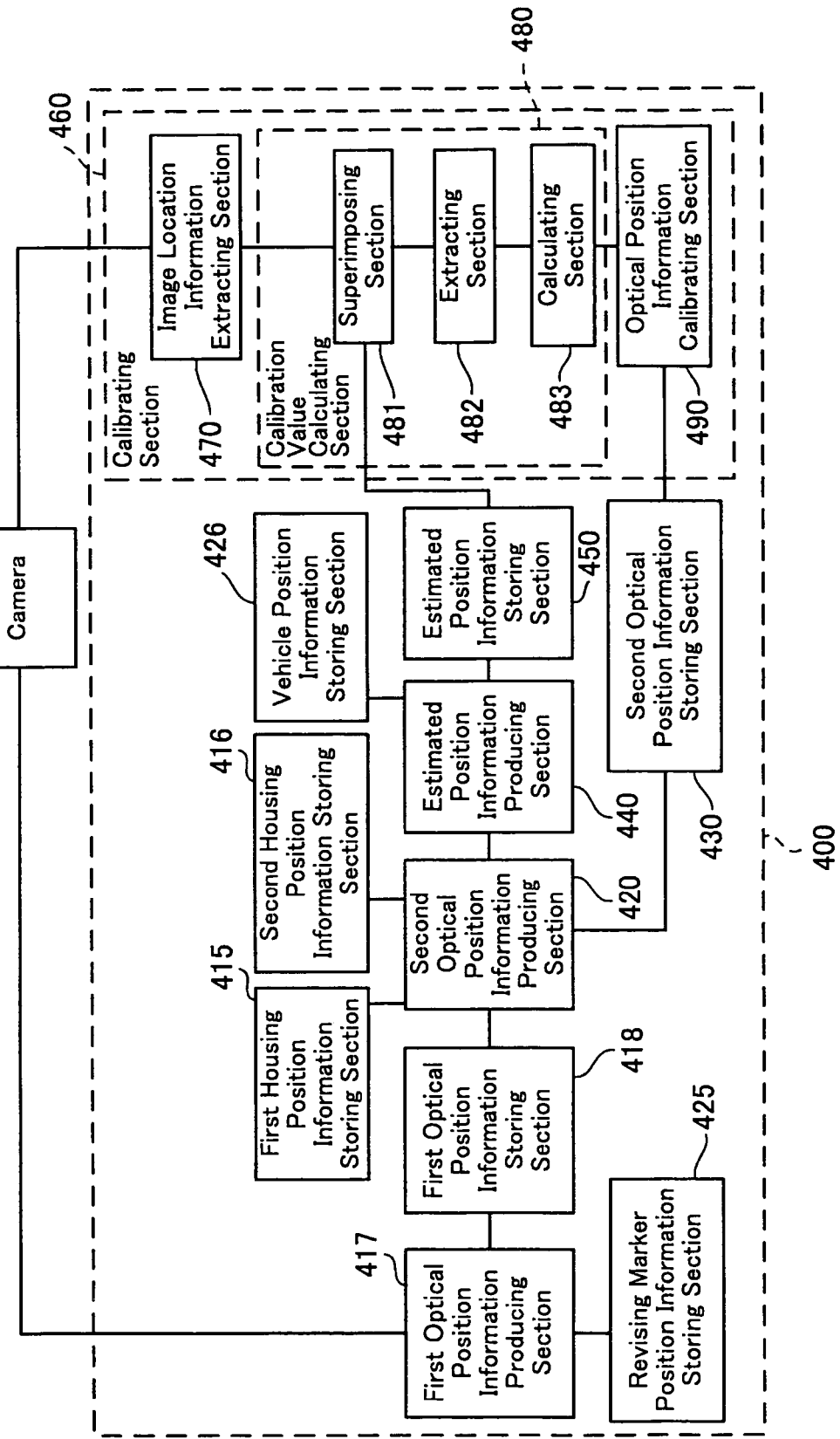
FIG. 29 is a block diagram showing a camera calibrating apparatus according to the fourth embodiment of the present invention and a camera exemplified as an image device.
Figure 30:
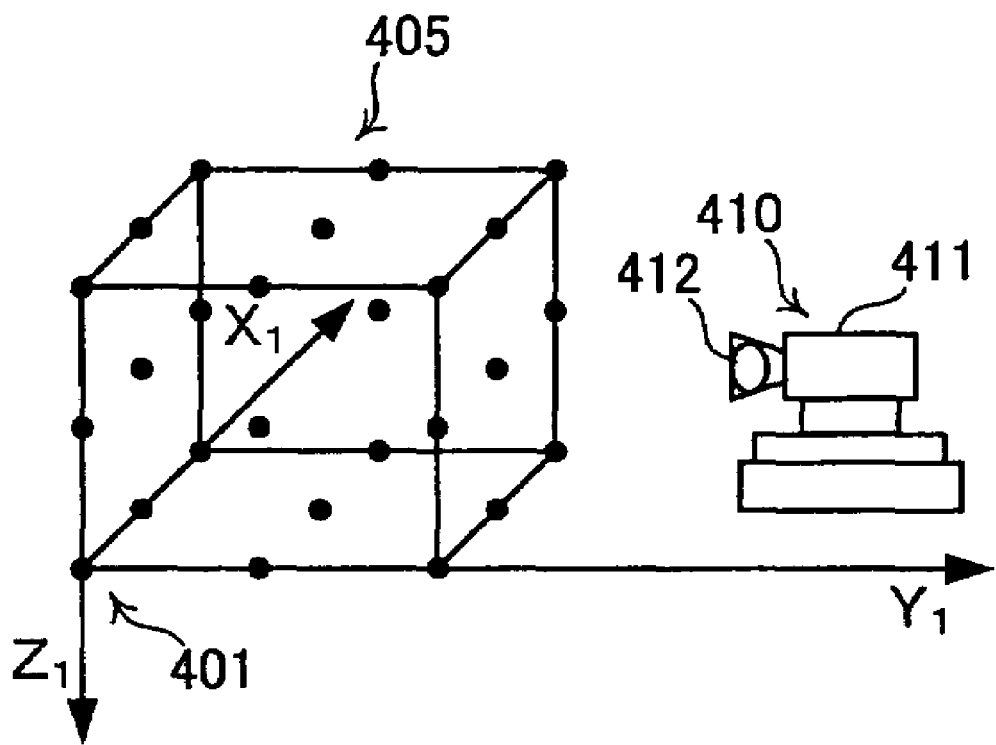
FIG. 30 is a perspective view showing the first coordinate system in which the camera shown in FIG. 29 is located.
Figure 31:
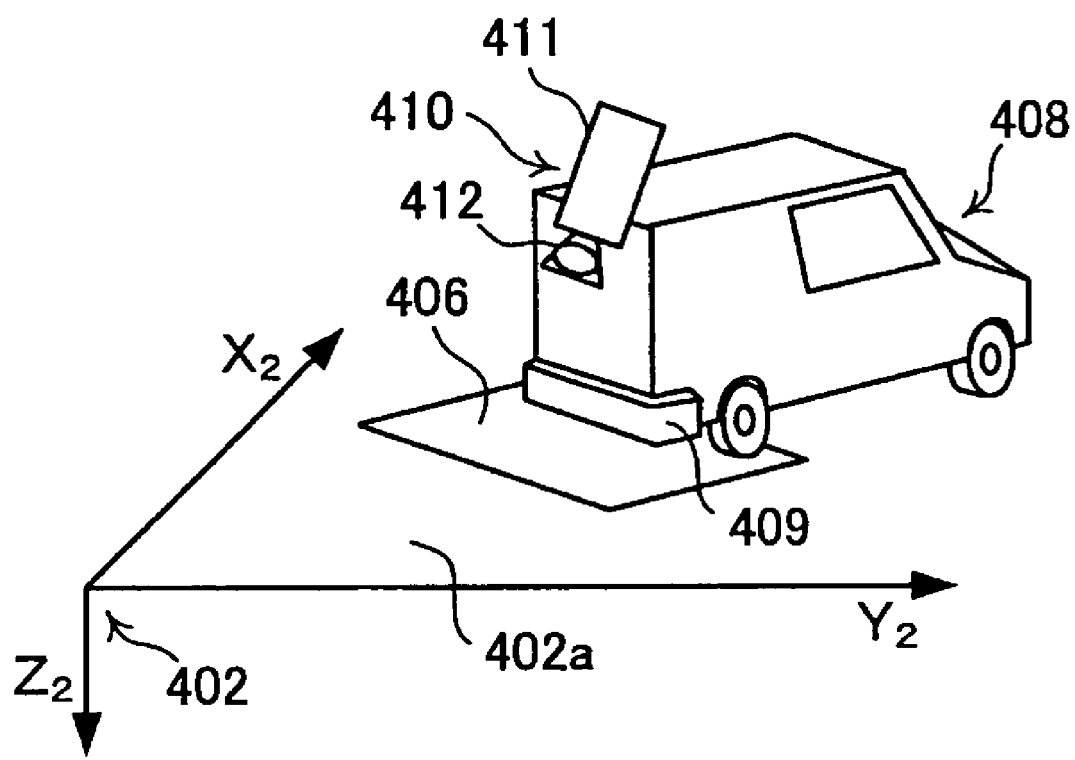
FIG. 31 is a perspective view showing the second coordinate system in which the camera shown in FIG. 29 is located.

As shown in FIGS. 29 to 31, the camera calibrating apparatus 400 is electrically connected to a camera 410 as an imaging device. The camera 410 includes a housing unit 411 and an optical section 412 supported by the housing unit 411 to obtain image information through the optical section 412.

The camera calibrating apparatus 400 comprises a first housing position information storing section 415 for storing first housing position information indicative of the position of the housing unit 411 to the first coordinate system 401, a second housing position information storing section 416 for storing second housing position information indicative of the position of the housing unit 411 in the second coordinate system 402, a revising marker position information storing section 425 for storing revising marker position information indicative of the position of a revising marker 405 to the first coordinate system 401, and a vehicle position information storing section 426 for storing vehicle position information indicative of the position of, for example, a rear bumper 409 of an automotive vehicle 408 in the second coordinate system 402.

The first coordinate system 401 is defined in a first working space such as a camera production plant to have $X_1$-axis, $Y_1$-axis, and $Z_1$-axis. The revising marker 405 laid out in the first working space causes the camera calibrating apparatus 400 is revise the camera 410 located in the first working space. The revising marker 405 is constituted by a plurality of marking objects which are respectively located at predetermined positions on the first coordinate system 401, and which are within a viewing field of the camera 410 located in the first working space.

The second coordinate system 402 is defined in a second working space such as an automotive vehicle production plant to have $X_2$-axis, $Y_2$-axis, and $Z_2$-axis, while $X_2$-axis and $Y_2$-axis collectively define $X_2$-$Y_2$ plane which is represented by a road surface 402a on which an automotive vehicle 408 is located. The calibrating plate 406 painted in a single color is located on the road surface 402a. The monochromatic calibrating plate 406 located directly below the automotive vehicle 408 is different in brightness, chromaticity, and saturation of color from the automotive vehicle 408.

The camera calibrating apparatus 400 is adapted to revise the camera 410 in the first working space. The camera 410 is located at a predetermined position on the first coordinate system 401, while the first housing position information storing section 415 is adapted to store first housing position information indicative of the position of the housing unit 411. Here, the term "the calibration of the camera 410" is intended to indicate the calculation of the accurate position of the optical section 412 of the camera 410 mounted on the automotive vehicle 408.

The camera 410 revised by the camera calibrating apparatus 410 is mounted on the automotive vehicle 408 to be located at a predetermined position on the second coordinate system 402 in the second working space, while the second housing position information storing section 416 is adapted to store second housing position information indicative of the position of the housing unit 411. Here, the second housing position information indicates an accurate position in which the housing unit 411 of the camera 410 is located when the camera 410 is mounted on the automotive vehicle 408.

The camera calibrating apparatus 400 further comprises a first optical position information producing section 417 for producing first optical position information indicative of the position of the optical section 412 to the first coordinate system 401, and a first optical position information storing section 418 for storing the first optical position information produced by the first optical position information producing section 417.

The first optical position information producing section 417 is adapted to calculate the position of the optical section 412 to the first coordinate system 401 from the revising marker position information stored in the revising marker position information storing section 425 on the basis of the image information of the revising marker 305 obtained by the camera 410. Here, the term "the position of the optical section 412" is intended to indicate an optical center of the optical section 412 and the position of an optical axis, and other optical parameters. The calculation of the position of the optical section 412 to the first coordinate system 401 is performed on the basis of the method disclosed in the document 1.

The camera calibrating apparatus 400 further comprises a second optical position information producing section 420 for producing second optical information indicative of the position of the optical section 412 in the second coordinate system 402, and a second optical position information storing section 430 for storing the second optical position information produced by the second optical position information producing section 420.

The second optical position information producing section 420 is adapted to produce second optical position information indicative of the position of the optical section 412 in the second coordinate system 402 from the second housing position information stored in the second housing position information storing section 416 on the basis of the first housing position information stored by the first housing position information storing section 415 and the first optical position information stored in the first optical position information storing section 418.

The second optical position information producing section 420 is adapted to calculate the position of the optical section 412 in the second coordinate system 402 on the basis of a method which is the same as the method of the second optical position information producing section 120 of the first embodiment.

Figure 32:
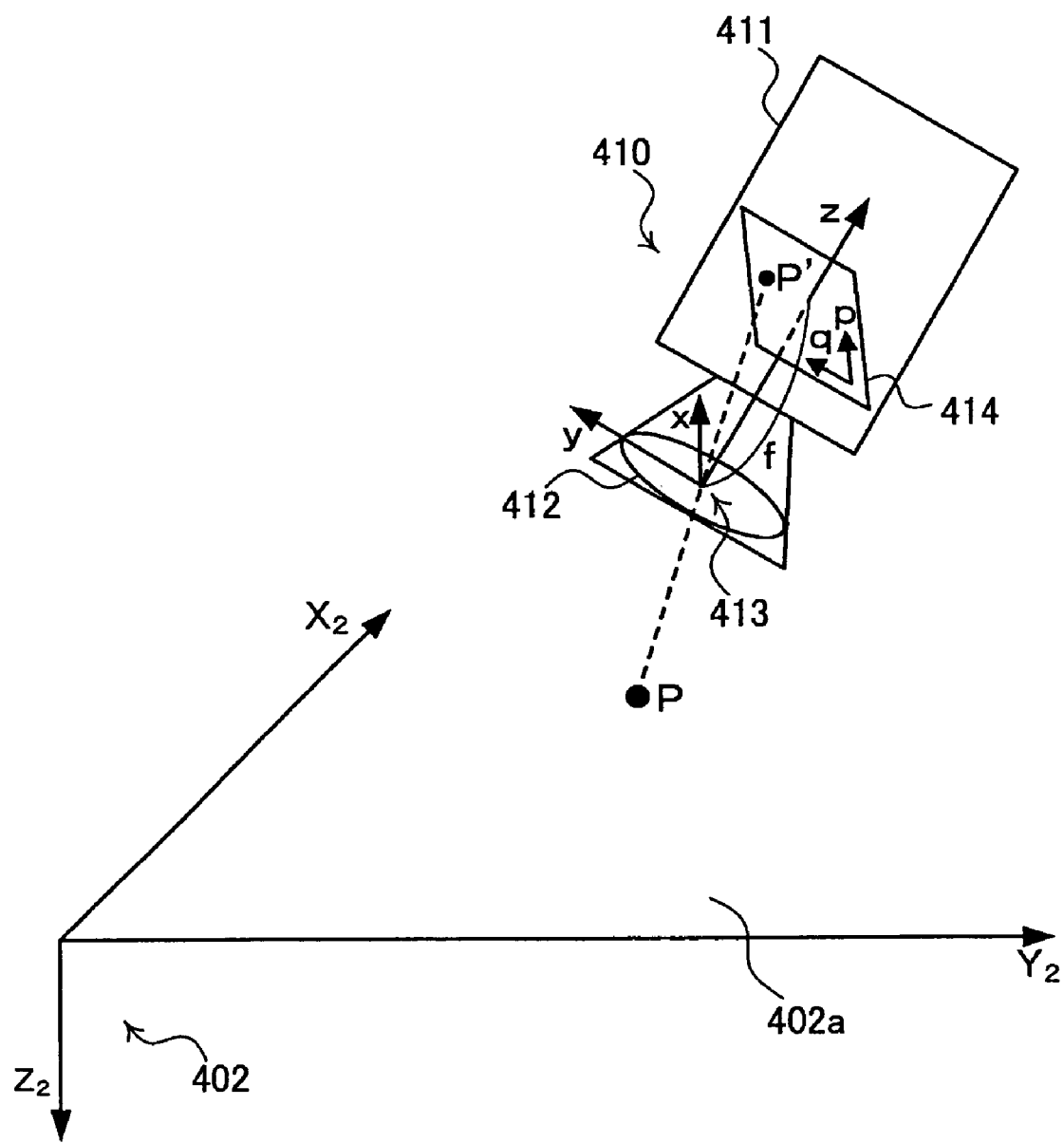
FIG. 32 is a perspective view showing a coordinate system of the camera shown in FIG. 29.

As shown in FIG. 32, the camera 410 mounted on the automotive vehicle 408 in the second working space defines a camera coordinate system 413 having x-axis, y-axis, and z-axis on the basis of the second optical position information. The origin point of the camera coordination system 413 is in register with the optical center of the optical section 412. The x-axis of the camera coordinate system 413 extends in a horizontal direction of the camera 410. The y-axis of the camera coordinate system 413 extends in a vertical direction of the camera 410. The z-axis of the camera coordinate system 413 is in axial alignment with the optical axis of the optical section 412.

The image coordinate system 414 is defined on a plane spaced apart from the origin point of the camera coordinate system 413 with a focal length "f" in the direction of the z-axis of the camera coordinate system 413. The image coordination system 414 has p-axis and q-axis. The camera 410 is adapted to obtain, as image information, an optical image focused on the image coordinate system 414 through the optical section 412.

The camera calibrating apparatus 400 further comprises an estimated position information producing section 440 for producing estimated position information of the bumper 409 of the automotive vehicle 408 to the image coordinate system 414 of the camera 410, and an estimated position information storing section 450 for storing the estimated position information produced by the estimated position information producing section 440.

The estimated position information producing section 440 is adapted to produce estimated position information of the calibrating marker 406 to the image coordinate system 414 of the camera 410 from the position information of the calibrating marker 406 stored in the vehicle position information storing section 426 on the basis of the second optical position information produced by the second optical position information producing section 420. The calculation of the estimated location of the calibrating marker 406 to the image coordinate system 414 of the camera 410 is performed on the basis of the above mentioned document 1.

Figure 33:
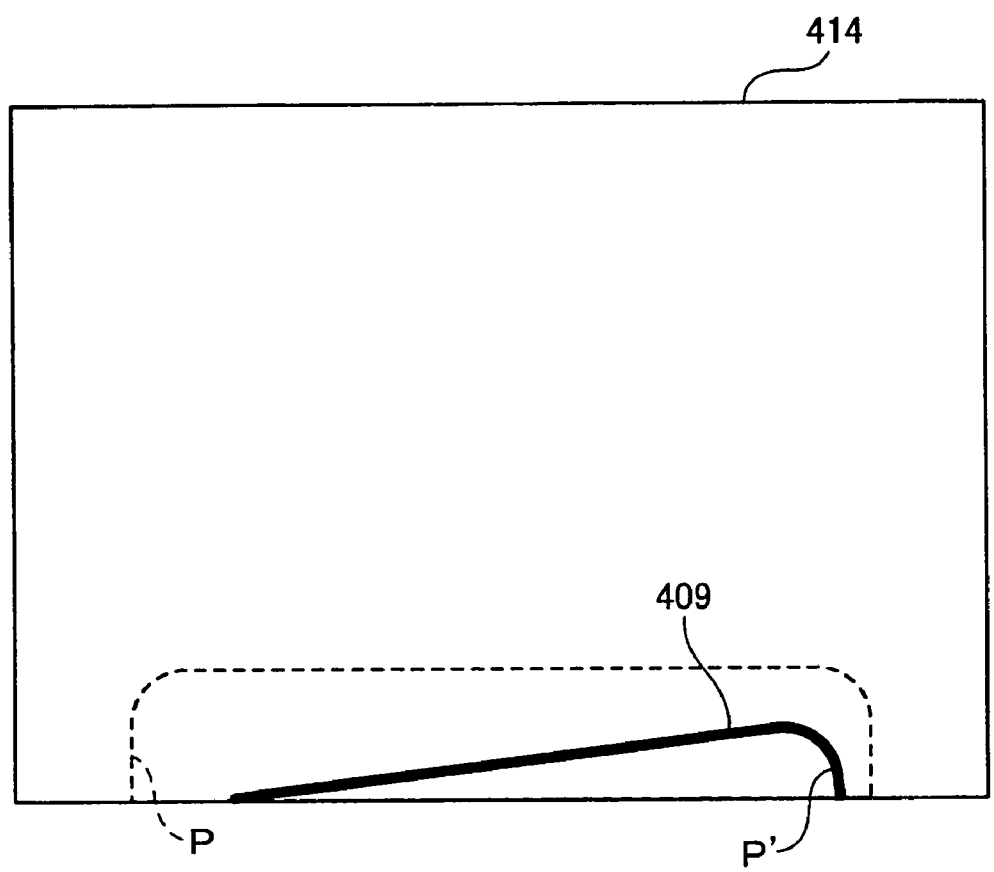
FIG. 33 is a plan view showing an image coordinate system of the camera shown in FIG. 29.

As shown in FIG. 33, the bumper 409 of the automotive vehicle 408 located on the second coordinate system 402 is focused on the image location Pn' of the image coordinate system 414 through the optical section 412. Here, the image location Pn' is in register with the estimated image location Pn calculated by the estimated image location calculating section 440 under the condition that the housing unit 411 is located on an accurate position of the automotive vehicle 408, more specifically, the housing unit 411 is located at the position represented by the second housing position information with no deviation to the accurate position. However, the housing unit 411, in general, is located at an inaccurate position with deviation to the accurate position. This leads to the fact that the second optical position information is produced with deviation to the accurate position. As a result, the estimated location Pn is spaced apart from the image location Pn' of the image coordinate system 414.

The camera calibrating apparatus 400 further comprises a calibrating section 460 for calibrating the second optical position information stored in the second optical position information storing section 430 to order to calibrate the above mentioned deviation of the second optical position information.

The calibrating section 460 is adapted to calibrate the second optical position information stored in the second optical position information storing section 430 on the basis of the image information of the bumper 409 obtained by the camera 410 and the estimated position information stored in the estimated position information storing section 450.

The calibrating section 460 includes an image location information extracting section 470 for extracting image location information indicative of an image location of the bumper 409 to the image coordinate system 414 of the camera 410 on the basis of the image information of the calibrating marker 406 obtained by the camera 110, a calibration value calculating section 480 for calculating a calibration value of the second optical position information stored in the second optical position information storing section 430 on the basis of the image location information extracted by the image location information extracting section 470 and the estimated position information stored in the estimated position information storing section 450, and an optical position information calibrating section 490 for calibrating the second optical position information stored in the second optical position information storing section 430 on the basis of the calibration value calculated by the calibration value calculating section 480.

The calibration value calculating section 480 includes a superimposing section 481 for superimposing one of a profile line of the bumper 409 of the image location information and a profile line of the bumper 409 of the estimated location information on the other of the profile line of the bumper 409 of the image location information and the profile line of the bumper 409 of the estimated location information, an extracting section 482 for extracting two or more points, for example points of end portions of the bumper, from the profile lines of the automotive vehicle superimposed by the superimposing section 481, and a calculating section 483 for calculating the calibration value of the second optical position information stored by the second optical position information by comparing the points of the image location information with the points of the estimated location information.

Figure 34:
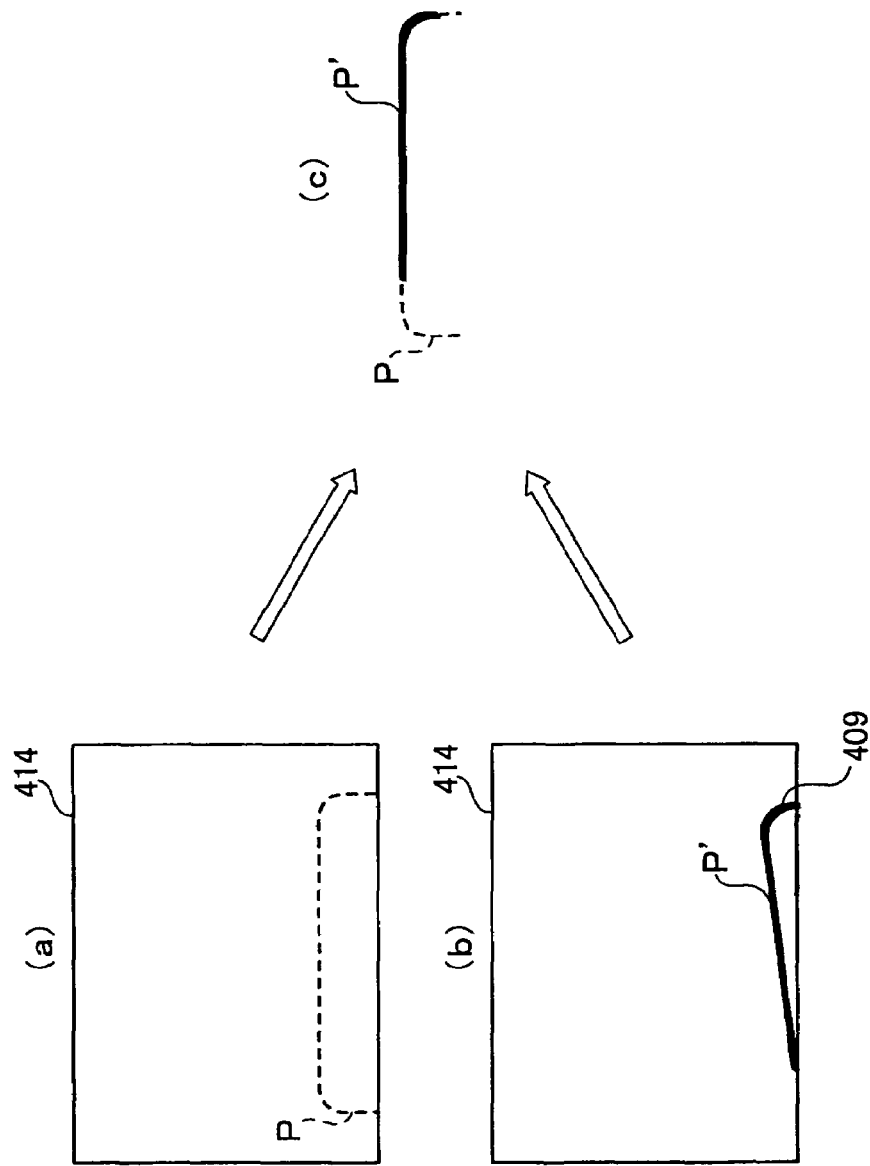
FIG. 34 is a schematic view showing an operation of the calibrating section of the camera calibrating apparatus shown in FIG. 29.

The superimposing section 481 is adapted to superimpose the profile line "P" (see FIG. 34($a$)) of the bumper 409 of the estimated location information on the profile line "P" (see FIG. 34($b$)) of the bumper 409 of the image location information by allowing the profile line "P'" of the bumper 409 of the estimated location information to be linearly and rotationally moved with respect to the profile line "P'" of the bumper 409 of the image location information (see FIG. 34($c$)).

Figure 35:
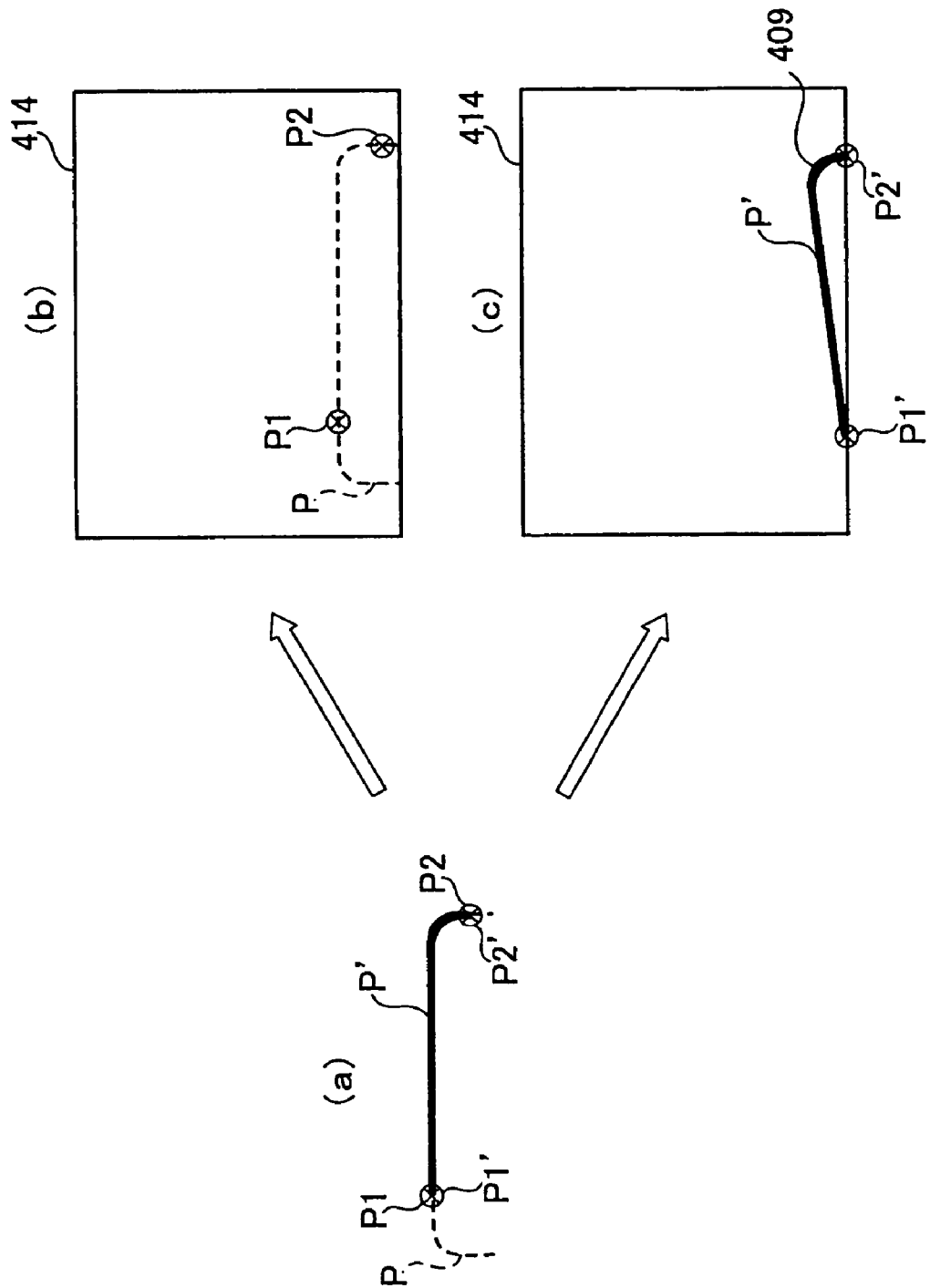
FIG. 35 is a schematic view showing an operation of the calibrating section of the camera calibrating apparatus shown in FIG. 29.

As shown in FIG. 35($a$), the extracting section 482 is adapted to extract two or more points ($P_1$, $P_2$) and ($P_1'$, $P_2'$) from the profile lines "P" and "P'" of the bumper 409 superimposed by the superimposing section 481.

The calculating section 483 is adapted to calculate a calibration value of the second optical position information on the basis of a method which is the same as the method of the calibration value calculating section 180 in the first embodiment by comparing the points ($P_1$, $P_2$) (see FIG. 35($b$)) of the estimated location information with the points ($P_1'$, $P_2'$) (see FIG. 35($b$)) of the image location information.

Figure 36:
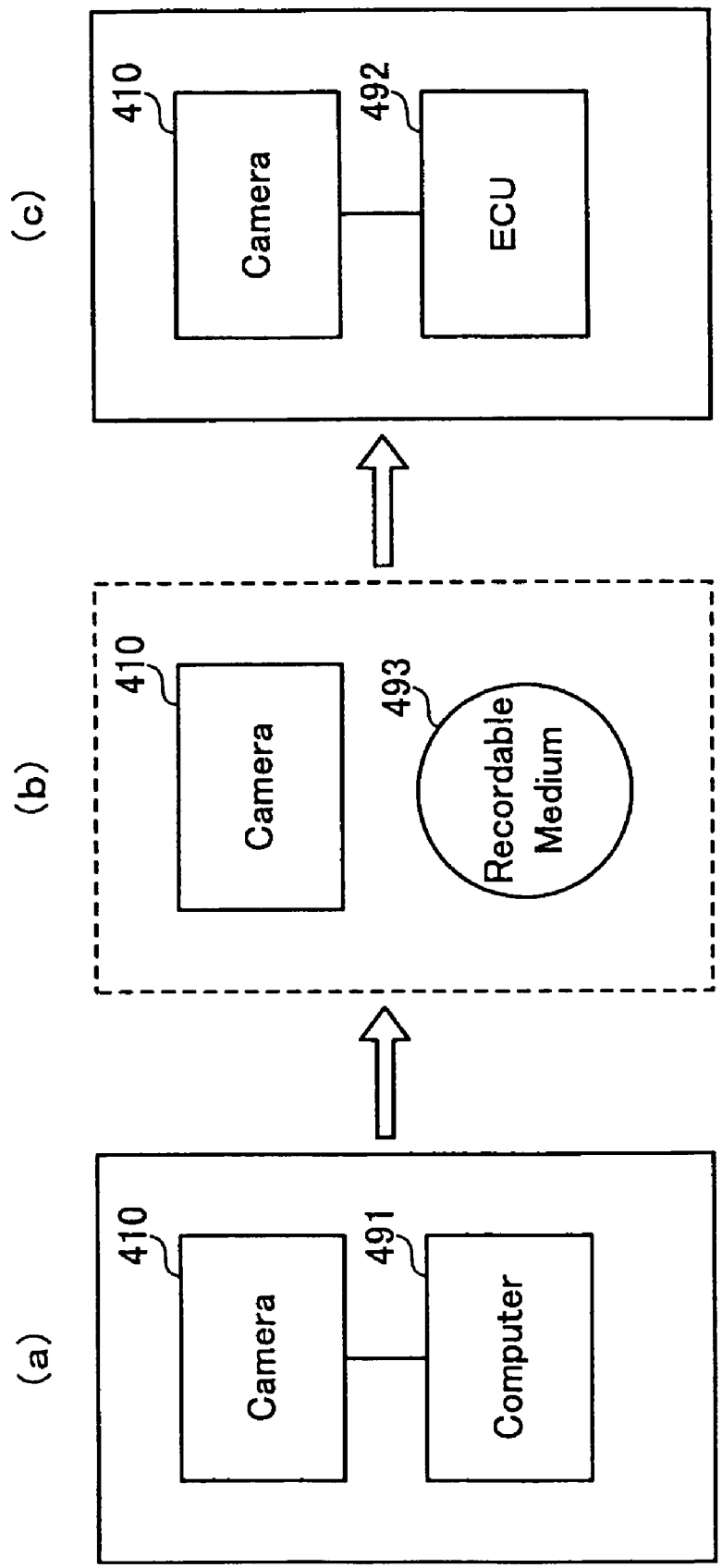
FIG. 36 is a block diagram showing a computer and ECU to ensure the camera calibrating apparatus shown in FIG. 29.

As shown in FIG. 36, the camera calibrating apparatus 400 thus constructed as previously mentioned can be realized by comprising a computer 491 for adjusting the camera 410, ECU 492 constituted as an image controlling apparatus for controlling the camera 410, and other elements.

The computer 491 is shown in FIG. 26($a$) as including CPU, RAM, ROM, an input/output interface, and other elements. The computer 491 is electrically connected to the camera 410 at the first working space. In this embodiment, the computer 491 constitutes each of the first housing position information storing section 415, the second housing position information storing section 416, the first optical position information producing section 417, the first optical position information storing section 418, the second optical position information producing section 420, the calibrating marker position information storing section 425, the calibrating marker position information storing section 426, the second optical position storing section 430, the estimated position information producing section 440, and the estimated position information storing section 450.

The ECU 492 is shown in FIG. 36(c) as including CPU, RAM, ROM, an input/output interface, and other elements. The ECU 492 is mounted on the automotive vehicle 408 to be electrically connected to the camera 410 in the second working space. In this embodiment, the ECU 492 constitutes each of the second optical position information storing section 430, the estimated position information storing section 450, and the calibrating section 460.

As shown in FIG. 36(b), the camera 410 is transferred to the second working space from the first working space with a recordable medium 493 such as for example CD-ROM and a magnetic disk. The recordable medium 493 has stored therein each of the second optical position information and the estimated location information to ensure that the each of the second optical position information and the estimated location information is effectively transferred to the ECU 492 from the computer 491.

Figure 37:
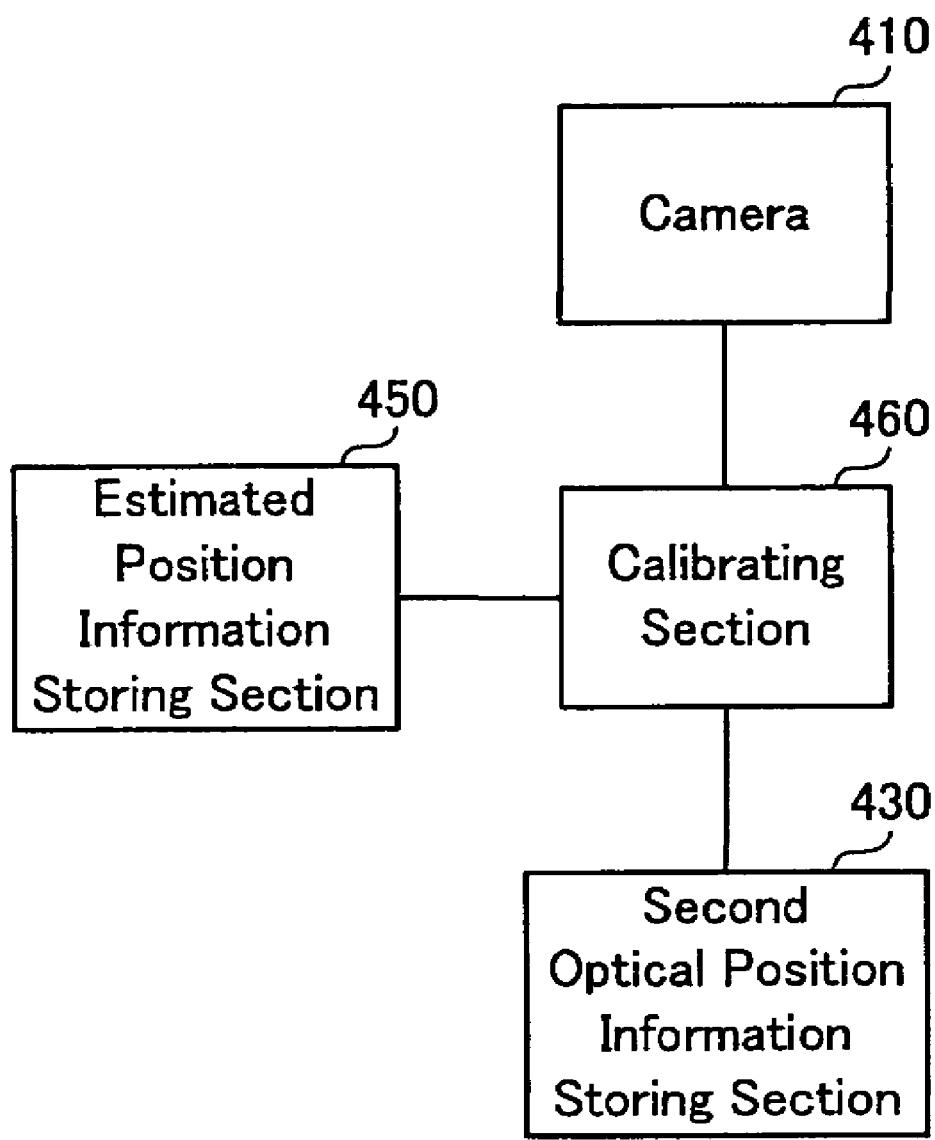
FIG. 37 is a block diagram showing a camera unit of the camera calibrating apparatus shown in FIG. 29.

In this embodiment, the camera 410 and the recordable medium 493 are transferred to the second working space from the first working space, however, the camera 410, the second optical position information storing section 430, and the calibrating section 460 may be collectively transferred as a camera unit 494 to the second working space from the first working space as shown in FIG. 37.

The following description will be directed to the operation of the fourth embodiment of the camera calibrating apparatus according to the present invention.

Figure 38:
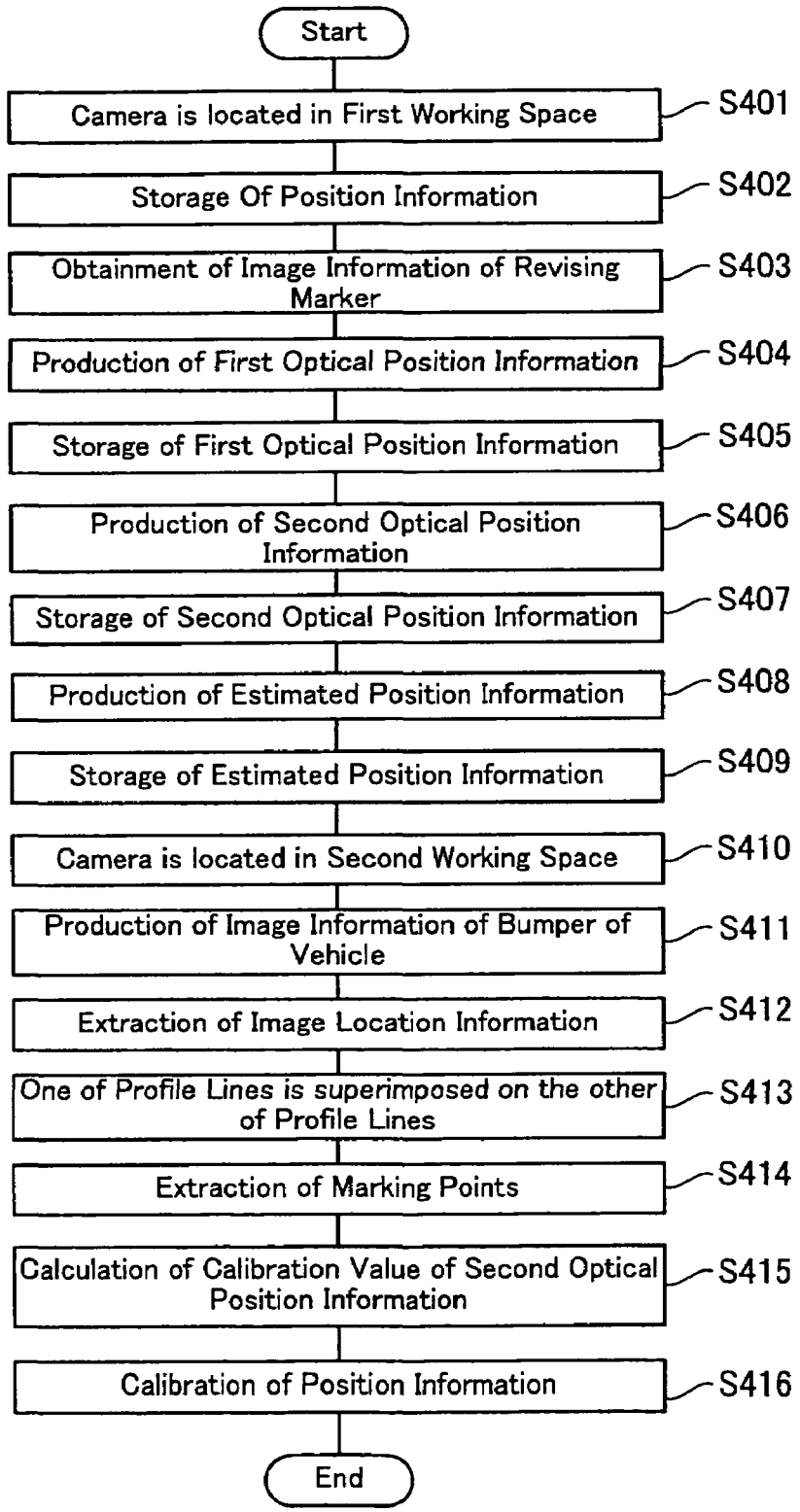
FIG. 38 is a flow chart showing a calibrating operation of the camera calibrating apparatus shown in FIG. 29.
Figure 39:
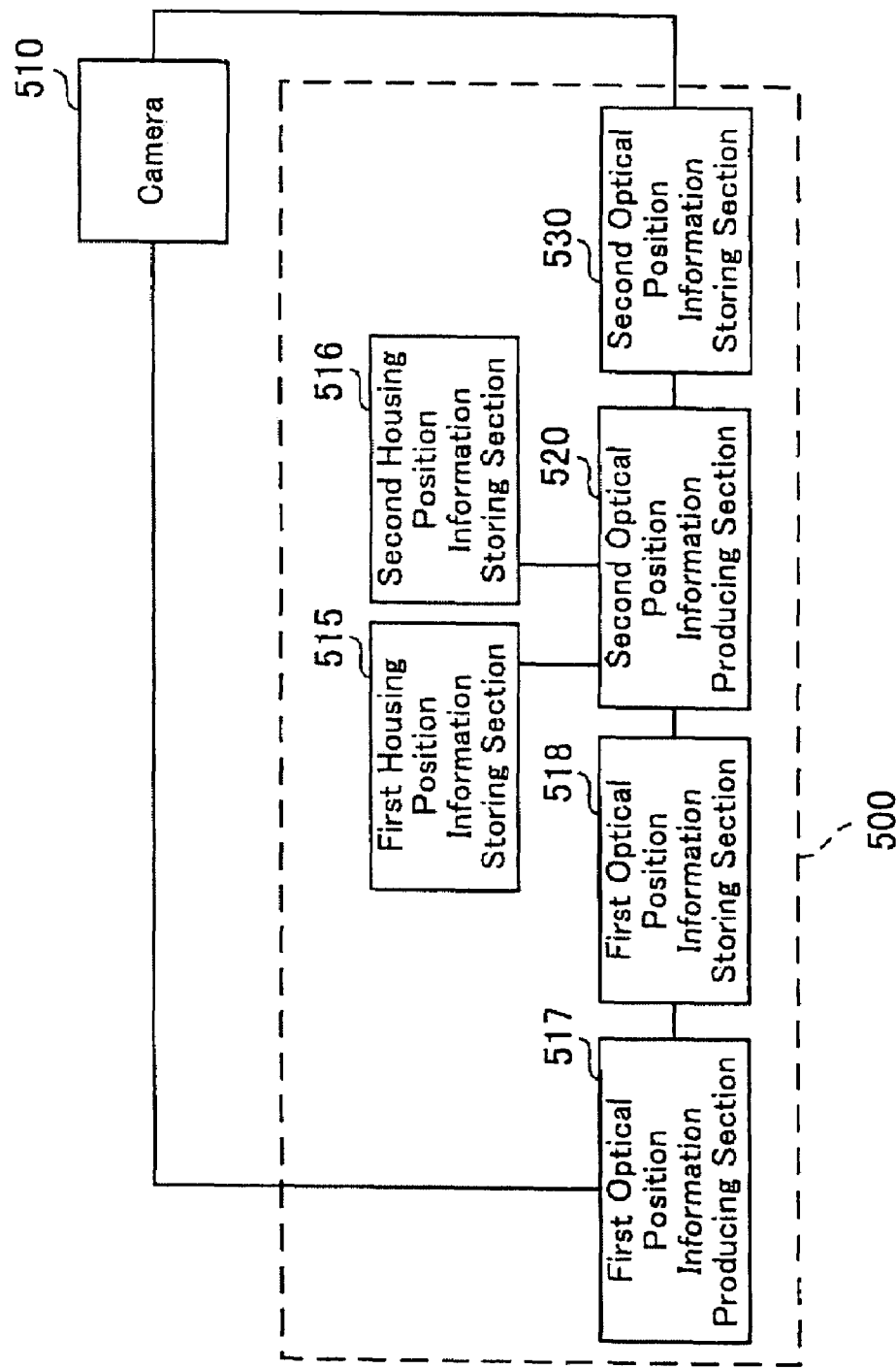
FIG. 39 is a block diagram of a conventional camera calibrating apparatus and a camera exemplified as an imaging device.
Figure 40:
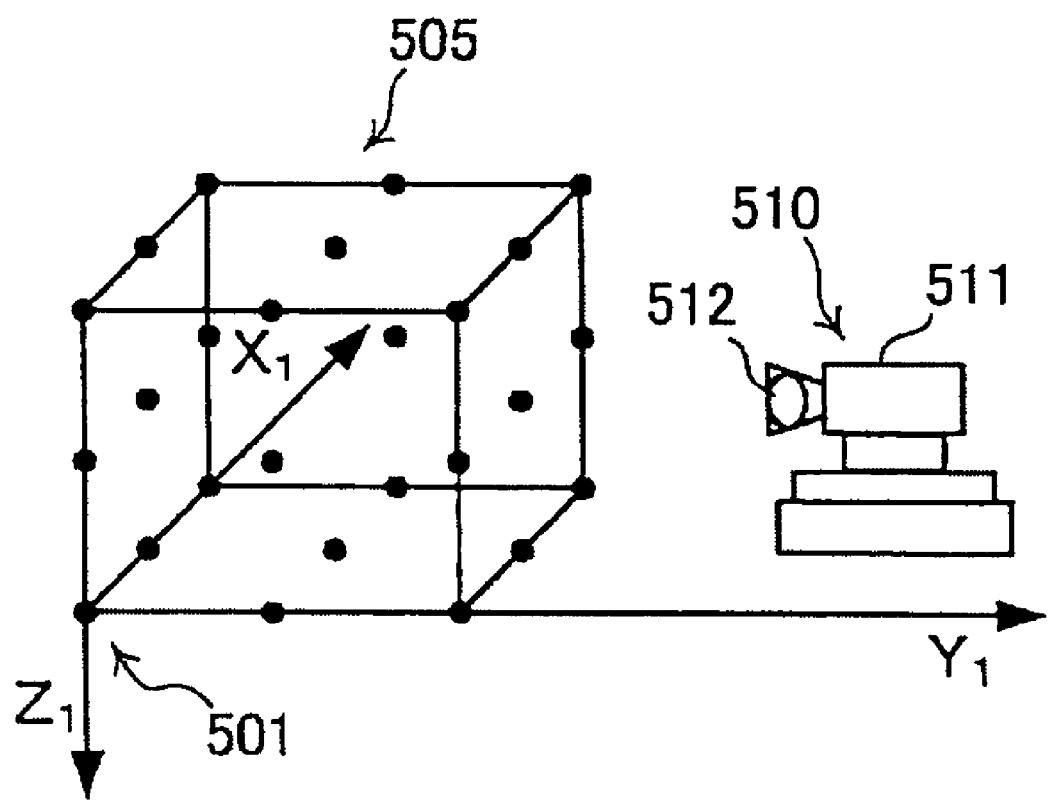
FIG. 40 is a perspective view showing the first coordinate system in which the camera shown in FIG. 39 is located.
Figure 41:
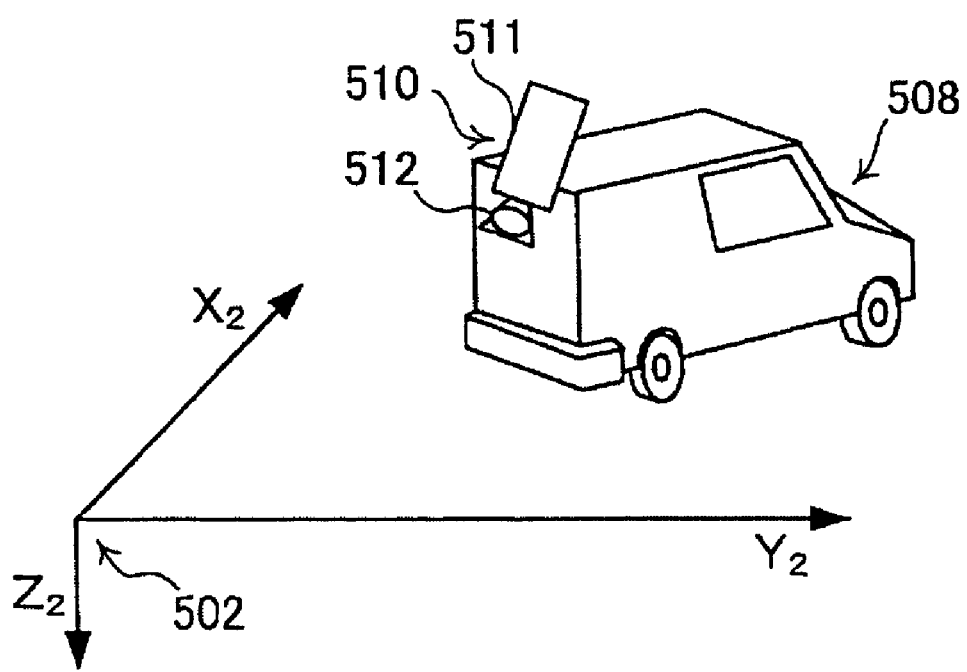
FIG. 41 is a perspective view showing the second coordinate system in which the camera shown in FIG. 39 is located.

The second optical position information is calibrated by the camera calibrating apparatus 400 through the steps shown in the FIG. 38.

The camera 410 is firstly located at the predetermined position on the first coordinate system 401 in the first working space (in the step S401). The first housing position information, the second housing position information, the revising marker position information, and the vehicle position information are then stored in the first housing position information storing section 415, the second housing position information storing section 416, the revising marker position information storing section 425, and the vehicle position information storing section 426, respectively (in the step S402). Here, the first housing position information, the second housing position information, the revising marker position information, and the vehicle position information are obtained on the basis of positions predetermined in the design process and measured by a measuring instrument.

The image information of the revising marker 405 is then obtained by the camera 410 (in the step S403). The first optical position information is then produced by the first optical position information producing section 417 from the revising marker position information stored in the revising marker position information storing section 425 on the basis of the image information of the revising marker 405 obtained by the camera 410 (in the step S404). The first optical position information produced by the first optical position information producing section 417 is then stored in the first optical position information storing section 418 (in the step S405).

The second optical position information is then produced by the second optical position information producing section 420 from the second housing position information stored in the second housing position information storing section 416 on the basis of the first housing position information stored in the first housing position information storing section 415 and the first optical position information stored in the first optical position information storing section 418 (in the step S406). The second optical position information produced by the second optical position information producing section 420 is then stored in the second optical position information storing section 430 (in the step S407).

The estimated location information indicative of the position of the bumper 409 to the image coordinate system 414 of the camera 410 is then produced by the estimated position information producing section 440 from the vehicle position information stored in the vehicle position information storing section 426 on the basis of the second optical position information produced by the second optical position information producing section 420 (in the step S408). The estimated position information produced by the estimated position information producing section 440 is stored in the estimated position information storing section 450 (in the step S409).

The camera 410 and the recordable medium 493 are then transferred to the second working space from the first working space. The camera 410 is then mounted to the automotive vehicle 408 to be located at the predetermined position on the second coordinate system 402 (in the step S410).

The image of the bumper 409 is then taken by the camera 310 against the calibrating plate 406 (in the step S411). As shown in FIG. 33, the image location information of the bumper 409 is extracted from the image information of the bumper 409 obtained by the camera 410 on the image coordinate system 414 of the camera 410 (in the step S412).

As shown in FIG. 34, the profile line P' of the bumper 409 of the image location information is superimposed on the profile line P of the bumper 409 of the estimated image information by the superimposing section 481 (in the step S413).

As shown in FIG. 35, two or more points ($P_1$, $P_2$) and ($P_1'$, $P_2'$) of the overlapped portion are then extracted from the profile lines "P" and "P'" of the bumper 409 by the extracting section 482 (in the step S414). The calibration value of the second optical position information is then calculated by the calculating section 483 by comparing the points ($P_1'$, $P_2'$) of the image location information with the points ($P_1$, $P_2$) of the estimated location information (in the step S415).

The second optical position information stored in the second optical position information storing section 430 is finally calibrated by the optical position information calibrating section 490 on the basis of the calibration value calculated by the calibration value calculating section 480 (in the step S416). In this embodiment, the above mentioned steps 401 to 415 may be executed as a program by a computer.

From the above detailed description, it will be understood that the camera calibrating apparatus 400 can calibrate the second optical position information by using the motion vectors 388a to 388d.

In this embodiment, the camera calibrating apparatus 400 can calibrate the second optical position information by using the bumper 409 forming part of the automotive vehicle 408.

In this embodiment, the camera calibrating apparatus 400 can accurately divide the plane-projected image by using the dividing marker 307.

As will be seen from the above detailed description, the camera calibrating apparatus according to the present invention can calibrate the optical parameter of the camera mounted to the automotive vehicle.

What is claimed is:

1. A camera calibrating apparatus to be operative in combination with an imaging device which includes a housing unit and an optical section supported by said housing unit to obtain image information through said optical section, and adapted to calibrate optical position information indicative of a position of said optical section, comprising:

first housing position information storing means for storing first housing position information indicative of a position of said housing unit in the first coordinate system in which a revising marker is located;

second housing position information storing means for storing second housing position information indicative of a position of said housing unit in the second coordinate system in which a calibrating marker is located;

first optical position information calculating means for calculating first optical position information indicative of a position of said optical section in said first coordinate system on the basis of said image information of said revising marker obtained by said imaging device;

first optical position information storing means for storing said first optical position information produced by said first optical position information producing means;

second optical position information calculating means for calculating second optical position information indicative of a position of said optical section to said second coordinate system from said second housing position information stored by said second housing position information storing means on the basis of said first housing position information stored by said first housing position information storing means and said first optical position information stored by said first optical position information storing means;

estimated position information calculating means for calculating estimated position information indicative of a position of said calibrating marker to an image coordinate system of said imaging device on the basis of said second optical position information produced by said second optical position information producing means;

second optical position information storing means for storing said second optical position information produced by said second optical position information producing means;

estimated position information storing means for storing said estimated position information produced by said estimated position information producing means; and calibrating means for calibrating said second optical position information stored by said second optical position information storing means on the basis of said image information of said calibrating marker obtained by said imaging device and said estimated position information stored by said estimated position information storing means.

2. A camera calibrating apparatus as set forth in claim 1, in which said calibrating means includes:

image location information extracting means for extracting an image location information indicative of an image location of said calibrating marker to said image coordinate system of said imaging device on the basis of said image information of said calibrating marker obtained by said imaging device;

calibration value calculating means for calculating a calibration value of said second optical position information stored by said second optical position information storing means on the basis of said image location information extracted by said image location information extracting means and said estimated position information stored by said estimated position information storing means; and optical position information calibrating means for calibrating said second optical position information stored by said second optical position information storing means on the basis of said calibration value calculated by said calibration value calculating means.

3. A camera calibrating apparatus as set forth in claim 2, in which said calibrating means is adapted to calibrate a deviation of a rotational component of said second optical position information.

4. A camera calibrating apparatus as set forth in claim 2, in which said image location information extracting means includes:

image displaying means for displaying an image of said calibrating marker obtained by said imaging device, and image location specifying means for specifying said image location of said calibrating marker on said image of said calibrating marker displayed by said image displaying means and to ensure that said image location information is extracted.

5. A camera calibrating apparatus as set forth in claim 2, in which said image location information extracting means includes:

estimated area information storing means for storing estimated area information indicative of said calibrating marker to said image coordinate system of said imaging device; and image location searching means for searching said image location of said calibrating marker from said image information of said calibrating marker obtained by said imaging device on the basis of said estimated area information stored by said estimated area information storing means and said estimated position information stored by said estimated position information storing means to ensure that said image location information is extracted.

6. A camera calibrating apparatus to be operative in combination with an imaging device which includes a housing unit and an optical section supported by said housing unit to obtain image information through said optical section, and adapted to calibrate optical position information indicative of a position of said optical section, comprising:

first housing position information storing means for storing first housing position information indicative of a position of said housing unit in the first coordinate system in which a revising marker is located;

second housing position information storing means for storing second housing position information indicative of a position of said housing unit in the second coordinate system;

first optical position information calculating means for calculating first optical position information indicative of a position of said optical section in said first coordinate system on the basis of said image information obtained by said imaging device and indicative of said revising marker;

first optical position information storing means for storing said first optical position information produced by said first optical position information producing means;

second optical position information calculating means for calculating second optical position information indicative of a position of said optical section to said second coordinate system from said second housing position information stored by said second housing position information storing means on the basis of said first housing position information stored by said first housing position information storing means and Said first optical position information stored by said first optical position information storing means;

second optical position information storing means for storing said second optical position information produced by said second optical position information producing means; and calibrating means for calibrating said second optical position information stored by said second optical position information storing means on the basis of a motion vector of said image information obtained by said imaging device in said second coordinate system, wherein said calibrating means includes:

plane-projected image producing means for producing a plane-projected image from said image information obtained by said imaging device in said second coordinate system:

plane-projected image dividing means for dividing said plane-projected image produced by said plane-projected image producing means into a plurality of image segments;

motion vector extracting means for extracting said motion vector from said image segments divided by said plane-projected image dividing means;

calibration value calculating means for calculating a calibration value of said second optical position information stored by said second optical position information storing means on the basis of said motion vector extracted by said motion vector extracting means; and optical position information calibrating means for calibrating said second optical position information stored by said second optical position information storing means on the basis of said calibration value calculated by said calibration value calculating means.

7. A camera calibrating apparatus as set forth in claim 6, in which a dividing marker is located in said second coordinate system in a predetermined relationship with said position of said housing unit represented by said second position information stored by said second position information storing means, and in which plane-projected image dividing means is adapted to divide said plane-projected image produced by said plane-projected image producing means into a plurality of image segments on the basis of said image information of said dividing marker obtained by said imaging device.

8. A camera calibrating apparatus to be operative in combination with an imaging device which includes a housing unit and an optical section supported by said housing unit to obtain image information through said optical section, and adapted to calibrate position information of said optical section, comprising:

first housing position information storing means for storing first housing position information indicative of a position of said housing unit in the first coordinate system in which a revising marker is located;

second housing position information storing means for storing second housing position information indicative of a position of said housing unit in the second coordinate system in which an automotive vehicle is located;

first optical position information producing calculating means for calculating first optical position information indicative of a position of said optical section in said first coordinate system on the basis of said image information of said revising marker obtained by said imaging device;

first optical position information storing means for storing said first optical position information produced by said first optical position information producing means;

second optical position information calculating means for calculating second optical position information indicative of a position of said optical section to said second coordinate system from said second housing position information stored by said second housing position information storing means on the basis of said first housing position information stored by said first housing position information storing means and said first optical position information stored by said first optical position information storing means;

estimated position information calculating means for calculating estimated position information indicative of a position of said automotive vehicle to an image coordinate system of said imaging device on the basis of said second optical position information produced by said second optical position information producing means;

second optical position information storing means for storing said second optical position information produced by said second optical position information producing means;

estimated position information storing means for storing said estimated position information produced by said estimated position information estimating means; and calibrating means for calibrating said second optical position information stored by said second optical position information storing means on the basis of said image information of said automotive vehicle obtained by said imaging device and said estimated position information stored by said estimated position information storing means.

9. A camera calibrating apparatus as set forth in claim 8, in which said calibrating means includes:

image location information extracting means for extracting an image location information indicative of an image location of said automotive vehicle in said image coordinate system of said imaging device on the basis of said image information of said automotive vehicle obtained by said imaging device;

calibration value calculating means for calculating a calibration value of said second optical position information stored by said second optical position information storing means on the basis of said image location information extracted by said image location information extracting means and said estimated position information stored by said estimated position information storing means; and optical position information calibrating means for calibrating said second optical position information stored by said second optical position information storing means on the basis of said calibration value calculated by said calibration value calculating means.

10. A camera calibrating apparatus as set forth in claim 9, in which
said calibration value calculating means includes:
superimposing means for superimposing a profile line of said automotive vehicle represented by said image location information on a profile line of said automotive vehicle represented by said estimated position information;
extracting means for extracting a plurality of points from said overlapped profile lines of said automotive vehicle superimposed by said superimposing means, and
calculating means for calculating a calibration value of said second optical position information by comparing said points of said image location information with said points of said estimated position information.

11. A camera calibrating apparatus as set forth in any one of claims 1 to 6 and 7 to 10, in which said imaging device is mounted on an automotive vehicle.

12. An imaging system comprises a camera calibrating apparatus as set forth in any one of claims 1 to 6 and 7 to 10.

13. An imaging control system comprises a camera calibrating apparatus as set forth in any one of claims 1 to 6 and 7 to 10.

14. A camera calibrating method of calibrating optical position information indicative of a position of an optical section supported by a housing unit of a camera for obtaining image information through said optical section, comprising:
a first housing position information storing step of storing first housing position information indicative of a position of said housing unit in the first coordinate system in which a revising marker is located;
a second housing position information storing step of storing second housing position information indicative of a position of said housing unit in the second coordinate system in which a calibrating marker is located;
a first optical position information calculating step of calculating first optical position information indicative of a position of said optical section in said first coordinate system on the basis of said image information of said revising marker obtained by said imaging device;
a first optical position information storing step of storing said first optical position information produced in said first optical position information producing step;
a second optical position information calculating step of calculating second optical position information indicative of a position of said optical section to said second coordinate system from said second housing position information stored in said second housing position information storing step on the basis of said first housing position information stored in said first housing position information storing step and said first optical position information stored in said first optical position information storing step;
an estimated position information calculating step of calculating estimated position information indicative of a position of said calibrating marker to an image coordinate system of said imaging device on the basis of said second optical position information produced in said second optical position information producing step;
a second optical position information storing step of storing said second optical position information produced in said second optical position information producing step;
an estimated position information storing step of storing said estimated position information produced in said estimated position information estimating step; and
a calibrating step of calibrating said second optical position information stored in said second optical position information storing step on the basis of said image information of said calibrating marker obtained by said imaging device and said estimated position information stored in said position information storing step.

15. A camera calibrating method of calibrating optical position information indicative of a position of an optical section supported by a housing unit of a camera for obtaining image information through said optical section, comprising:
a first housing position information storing step of storing first housing position information indicative of a position of said housing unit in the first coordinate system in which a revising marker is located;
a second housing position information storing step of storing second housing position information indicative of a position of said housing unit in the second coordinate system;
a first optical position information calculating step of calculating first optical position information indicative of a position of said optical section in said first coordinate system on the basis of said image information obtained by said imaging device and indicative of said revising marker;
a first optical position information storing step of storing said first optical position information produced in said first optical position information producing step;
a second optical position information calculating step of calculating second optical position information indicative of a position of said optical section to said second coordinate system from said second housing position information stored in said second housing position information storing step on the basis of said first housing position information stored in said first housing position information storing step and said first optical position information stored in said first optical position information storing step;
a second optical position information storing step of storing said second optical position information produced in said second optical position information producing step; and
a calibrating step of calibrating said second optical position information stored in said second optical position information storing step on the basis of a motion vector of said image information obtained by said imaging device in said second coordinate system,
wherein said calibrating step includes:
a plane-projected image producing step of producing a plane-projected image from said image information obtained by said imaging device in said second coordinate system;
a plane-projected image dividing step of dividing said plane-projected image produced by said plane-projected image producing step into a plurality of image segments;
a motion vector extracting step of extracting said motion vector from said image segments divided by said plane-projected image dividing step;
a calibration value calculating step of calculating a calibration value of said second optical position information stored by said second optical position information storing step on the basis of said motion vector extracted by said motion vector extracting step; and a optical position information calibrating step of calibrating said second optical position information stored by said second optical position information storing step on the basis of said calibration value calculated by said calibration value calculating step.

16. A camera calibrating method of calibrating optical position information indicative of a position of an optical section supported by a housing unit of a camera for obtaining image information through said optical section, comprising:
a first housing position information storing step of storing first housing position information indicative of a position of said housing unit in the first coordinate system in which a revising marker is located;
a second housing position information storing step of storing second housing position information indicative of a position of said housing unit in the second coordinate system in which an automotive vehicle is located;
a first optical position information calculating step of calculating first optical position information indicative of a position of said optical section in said first coordinate system on the basis of said image information of said revising marker obtained by said imaging device;
a first optical position information storing step of storing said first optical position information produced in said first optical position information producing step;
a second optical position information calculating step of calculating second optical position information indicative of a position of said optical section to said second coordinate system from said second housing position information stored in said second housing position information storing step on the basis of said first housing position information stored in said first housing position information storing step and said first optical position information stored in said first optical position information storing step;
an estimated position information calculating step of calculating estimated position information indicative of a position of said automotive vehicle to an image coordinate system of said imaging device on the basis of said second optical position information produced in said second optical position information producing step;
a second optical position information storing step of storing said second optical position information produced in said second optical position information producing step;
an estimated position information storing step of storing said estimated position information produced in said estimated position information estimating step; and
a calibrating step of calibrating said second optical position information stored in said second optical position information storing step on the basis of said image information of said automotive vehicle obtained by said imaging device and said estimated position information stored in said estimated position information storing step.

17. A camera calibrating method as set forth in any one of claims 14 to 16, in which said imaging device is mounted on an automotive vehicle.

* * * * *